(12) United States Patent
Fujimoto et al.

(10) Patent No.: US 11,945,053 B2
(45) Date of Patent: Apr. 2, 2024

(54) TAILORED BLANK, TAILORED BLANK MANUFACTURING METHOD, STAMPED PART, AND STAMPED PART MANUFACTURING METHOD

(71) Applicant: NIPPON STEEL CORPORATION, Tokyo (JP)

(72) Inventors: Hiroki Fujimoto, Tokyo (JP); Tasuku Zeniya, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 379 days.

(21) Appl. No.: 17/277,296

(22) PCT Filed: Sep. 19, 2019

(86) PCT No.: PCT/JP2019/036781
§ 371 (c)(1),
(2) Date: Mar. 18, 2021

(87) PCT Pub. No.: WO2020/059804
PCT Pub. Date: Mar. 26, 2020

(65) Prior Publication Data
US 2021/0354248 A1     Nov. 18, 2021

(30) Foreign Application Priority Data
Sep. 19, 2018    (JP) .............................. 2018-174781

(51) Int. Cl.
*B21D 22/02*     (2006.01)
*B23K 31/02*     (2006.01)
*B62D 25/04*     (2006.01)

(52) U.S. Cl.
CPC .............. *B23K 31/02* (2013.01); *B21D 22/02* (2013.01)

(58) Field of Classification Search
CPC ......................... B62D 25/04; B23K 2101/185
See application file for complete search history.

(56) References Cited

U.S. PATENT DOCUMENTS

| 2012/0319431 A1 | 12/2012 | Bodin et al. |
| 2012/0319432 A1 | 12/2012 | Bodin et al. |

(Continued)

FOREIGN PATENT DOCUMENTS

| JP | H11-104749 A | 4/1999 |
| JP | 2003-19516 A | 1/2003 |

(Continued)

OTHER PUBLICATIONS

JP2017-23553 Nippon Steel, English Translation obtained form EPO espacenet Aug. 9, 2023. (Year: 2023).*

*Primary Examiner* — Adam Krupicka
(74) *Attorney, Agent, or Firm* — SOLARIS Intellectual Property Group, PLLC

(57) ABSTRACT

A tailored blank including a first steel sheet having a carbon content of 0.27 mass % or more, and a second steel sheet that is butt welded to the first steel sheet and that has a carbon content of 0.20 mass % or less, wherein the tailored blank includes an elongated future top plate portion, a future sidewall portion, and a future flange portion, a first steel sheet region that is configured by the first steel sheet is formed spanning part or all of a length direction of the future top plate portion, and a second steel sheet region that is configured by the second steel sheet is formed at the future flange portion to be joined by welding to another member, and wherein part or all of a length direction of the first steel sheet region is positioned within a length direction range of the second steel sheet region.

19 Claims, 60 Drawing Sheets

(56) References Cited

U.S. PATENT DOCUMENTS

| | | |
|---|---|---|
| 2017/0350434 A1 | 12/2017 | Maruyama et al. |
| 2018/0099700 A1 | 4/2018 | Daigaku |
| 2019/0176211 A1 | 6/2019 | Otsuka et al. |

FOREIGN PATENT DOCUMENTS

| | | |
|---|---|---|
| JP | 2014-024080 A | 2/2014 |
| JP | 5894081 B2 | 3/2016 |
| JP | 5917409 B2 | 5/2016 |
| JP | 2017-25353 A | 2/2017 |
| JP | 6149522 B2 | 6/2017 |
| JP | 6191263 B2 | 9/2017 |
| JP | 2018-62204 A | 4/2018 |
| WO | 2016/080488 A1 | 5/2016 |
| WO | 2016/088665 A1 | 6/2016 |
| WO | 2017/217538 A1 | 12/2017 |

\* cited by examiner

TAILORED BLANK, TAILORED BLANK MANUFACTURING METHOD, STAMPED PART, AND STAMPED PART MANUFACTURING METHOD

TECHNICAL FIELD

The present invention relates to a tailored blank, a tailored blank manufacturing method, a stamped part, and a stamped part manufacturing method.

BACKGROUND ART

High-strength steel sheet with a tensile strength grade of, for example, 980 MPa and high-strength steel sheet with a tensile strength grade of, for example, 1180 MPa or more are increasingly being employed in vehicle framework components of passenger vehicles and the like. Such framework components are generally configured by combining plural stamped parts formed from a steel sheet, with flanges of the plural stamped parts being joined together by spot welding. Various research is currently being undertaken into the prevention of fractures originating at spot weld locations formed on such flanges in vehicle collisions.

For example, Patent Document 1 discloses the use of a laser beam or high frequency heating to form a tempered softened region, including the softest part of a HAZ of a spot weld location, such that the softest part of the HAZ does not act as a fracture origin. Patent Document 2 discloses a method for using a laser beam or high frequency heating to tempering and thus soften a region that does not include the softest part of the HAZ of a spot weld location in order to disperse strain that concentrates in a HAZ softened portion, such that the softest part of the HAZ does not act as a fracture origin.

Patent Documents 3 and 4 disclose press-hardening of locations other than a flange in order to impart a breaking strength in excess of 1400 MPa, and performing heat treatment to soften the flange so as to set the breaking strength of the flange to less than 1100 MPa.

Patent Documents 5 and 6 do not disclose technology relating to suppressing flange fracture originating at spot weld locations. However, Patent Document 5 discloses a tailored blank including a first sheet member and a second sheet member, in which an intensity ratio of the product of the tensile strength and the sheet thickness of the first sheet member and the product of the tensile strength and the sheet thickness of the second sheet member is set optimally for suppressing the occurrence of fracture of a welding bead at which the first sheet member and the second sheet member are joined together.

Moreover, Patent Document 6 discloses a tailored blank including a first steel sheet having a carbon content of from 0.07 mass % to 0.50 mass %, and a second steel sheet having a carbon content of 0.010 mass % or more but less than 0.070 mass %, the second steel sheet being butt welded to the first steel sheet. Patent Document 6 further discloses an elongated tailored blank and a stamped part (hot stamped part) with a hat-shaped cross-section profile formed using the tailored blank. The stamped part disclosed in Patent Document 6 is configured by butt joining the first steel sheet and the second steel sheet together in the length direction of the stamped part.

RELATED LITERATURE

Patent Documents

Patent Document 1: Japanese Patent No. 6191263
Patent Document 2: Japanese Patent No. 6149522
Patent Document 3: Japanese Patent No. 5894081
Patent Document 4: Japanese Patent No. 5917409
Patent Document 5: Japanese Patent Application Laid-Open (JP-A) No. 2003-19516
Patent Document 6: JP-A No. 2017-25353

SUMMARY OF INVENTION

Technical Problem

In addition to research relating to a high-strength steel sheet with a tensile strength grade of 980 MPa and a high-strength steel sheet with a tensile strength grade of 1180 MPa as described above, recent research is expanding into the application of a high-strength steel sheet with a carbon content of 0.27 mass % or more, for example a hot stamped steel sheet with a tensile strength grade of 1800 MPa or more or a TRIP steel sheet with a tensile strength grade of 1500 MPa or more, in vehicle framework components.

However, although a high-strength steel sheet with a carbon content of 0.27 mass % or more is problem-free under normal loading stresses, it is foreseen that in comparison to a high-strength steel sheet with a tensile strength grade of 980 MPa or a high-strength steel sheet with a tensile strength grade of 1180 MPa, there would be greater room for improvement with regard to the joint strength of spot weld locations on flanges when under extremely challenging conditions, for example during input of a heavy load accompanying a vehicle collision.

Hitherto, fracturing of a high-strength steel sheet with a carbon content of 0.27 mass % or more has been thought originate at flange spot weld locations due to a concentration of strain in a HAZ softened portion of the spot weld location, causing the HAZ softened portion to fracture. Hitherto, when working with a hot stamped steel sheet with a tensile strength grade of 1500 MPa or more, this has been remedied by for example applying heat to the flange to soften the flange and thus eliminate the HAZ softened portion in order to suppress the occurrence of such fracturing.

However, with a high-strength steel sheet with a carbon content of 0.27 mass % or more, such as a hot stamped steel sheet with a tensile strength grade of 1800 MPa or more or a TRIP steel sheet with a tensile strength grade of 1500 MPa or more, even if the HAZ softened portion can be eliminated in order to suppress the occurrence of fracturing, it is still envisaged that fracturing may occur following a bonding location of the spot weld location or within the nugget.

Note that the issues highlighted above are not limited to spot weld locations, and may conceivably similarly arise in weld locations formed by welding methods other than spot welding, for example laser weld locations.

Moreover, in cases in which one section of a length direction of a stamped part is configured by a second steel sheet with lower strength than a first steel sheet, as in the stamped part disclosed in Patent Document 6, there is room for improvement with respect to increasing the strength of a top plate in a section configured by the second steel sheet.

In consideration of the above circumstances, an object of the present invention is to provide a tailored blank, a tailored blank manufacturing method, a stamped part, and a stamped part manufacturing method capable of suppressing the occurrence of fracturing of a flange originating at a weld location during load input, while also improving the strength of a top plate within a length direction range of a flange join portion that is joined to another member at the weld location.

Solution to Problem

The inventors carried out careful investigation with respect to meeting the above objectives. It was found that when a high-strength steel sheet with a carbon content of 0.27 mass % or more is tempered by heat treatment or the like prior to welding in a region where welding is to be performed, although fracture of the HAZ softened portion is less liable to occur when input with load, in some cases it is not possible to suppress fracture inside the nugget at the spot weld location or fracture following a bonding location. It was also found that there are cases in which it is not possible to suppress fracture inside the nugget when employing a high-strength steel sheet with a carbon content of 0.21 mass % or more but less than 0.27 mass %.

The inventors arrived at the idea that lowering the carbon content of the steel sheet to a predetermined level or lower at locations where fracturing tends to occur might prove effective at suppressing the occurrence of both fracturing following the bonding location of the spot weld location and fracturing inside the nugget. Specifically, it was discovered that a carbon content of 0.20 mass % or less enables the occurrence of both fracturing following the bonding location of the spot weld location and fracturing inside the nugget to be suppressed.

The inventors further arrived at the idea that in order to suppress the occurrence of fracturing of the flange originating at spot weld locations when input with load, as well as to improve the strength of the top plate in a length direction range of a flange join portion configuring a join to another member at the spot weld locations in a stamped part including an elongated top plate, sidewalls extending along the top plate, and flanges extending along the sidewalls, the flange join portion should be formed from the second steel sheet with a carbon content of 0.20 mass % or less, and the top plate positioned inside the length direction range of the flange join portion should be formed from the first steel sheet with a carbon content of 0.27 mass % or more. The inventors considered that that this insight would also be applicable to weld locations formed not only by spot welding but also other welding methods.

A tailored blank according to a first aspect of the present invention is consistent with the insight discussed above. The tailored blank includes a first steel sheet having a carbon content of 0.27 mass % or more, and a second steel sheet that is butt welded to the first steel sheet and that has a carbon content of 0.20 mass % or less, wherein the tailored blank includes an elongated future top plate portion, a future sidewall portion positioned at a side of the future top plate portion, and a future flange portion positioned at a side of the future sidewall portion, a first steel sheet region that is configured by the first steel sheet and that is formed spanning part or all of a length direction of the future top plate portion, and a second steel sheet region that is configured by the second steel sheet and that is formed at the future flange portion to be joined by welding to another member, and wherein part or all of a length direction of the first steel sheet region is positioned within a length direction range of the second steel sheet region.

With this tailored blank, when a stamped part is formed using this tailored blank, a weld location to another member is formed on the second steel sheet region of a flange formed from the second steel sheet that has a carbon content of 0.20 mass % or less, thus enabling the occurrence of fracturing of the flange originating at the weld location when input with load to be suppressed. Moreover, in the stamped part formed using this tailored blank, the first steel sheet region configured by the first steel sheet is formed spanning part or all of the length direction of a top plate. In the flange, the second steel sheet region to be joined by welding to another member is formed from the second steel sheet, and part or all of the length direction of the first steel sheet region is positioned within the length direction range of the second steel sheet region. This enables the strength of the top plate to be improved within the length direction range of the second steel sheet region in comparison, for example, to cases in which the first steel sheet region of the top plate is not positioned within the length direction range of the second steel sheet region.

A tailored blank manufacturing method according to a second aspect of the present invention is also consistent with the insight discussed above. The tailored blank manufacturing method obtains a tailored blank that is configured by butt welding a second steel sheet having a carbon content of 0.20 mass % or less to a first steel sheet having a carbon content of 0.27 mass % or more, the tailored blank including an elongated future top plate portion, a future sidewall portion positioned at a side of the future top plate portion, and a future flange portion positioned at a side of the future sidewall portion. The tailored blank manufacturing method includes forming a first steel sheet region that is configured by the first steel sheet and that spans part or all of a length direction of the future top plate portion, and forming, at the future flange portion, a second steel sheet region that is configured by the second steel sheet such that part or all of a length direction of the first steel sheet region is positioned within a length direction range of the second steel sheet region to be joined by welding to another member.

According to this tailored blank manufacturing method, when a stamped part is formed using the obtained tailored blank, a weld location to another member is formed on the second steel sheet region of a flange formed from the second steel sheet that has a carbon content of 0.20 mass % or less, thereby enabling the occurrence of fracturing of the flange originating at the weld location when input with load to be suppressed. Moreover, in the stamped part formed using this tailored blank, the first steel sheet region configured by the first steel sheet is formed spanning part or all of the length direction of a top plate. In the flange, the second steel sheet region to be joined by welding to another member is formed from the second steel sheet, and part or all of the length direction of the first steel sheet region is positioned within the length direction range of the second steel sheet region. This enables the strength of the top plate to be improved within the length direction range of the second steel sheet region in comparison, for example, to cases in which the first steel sheet region of the top plate is not positioned within the length direction range of the second steel sheet region.

A stamped part according to a third aspect of the present invention is also consistent with the insight discussed above. The stamped part includes an elongated top plate, a sidewall extending along the top plate, and a flange extending along the sidewall, wherein the stamped part includes, a first steel sheet having a carbon content of at 0.27 mass % or more, a second steel sheet that is butt welded to the first steel sheet and that has a carbon content of 0.20 mass % or less, a first steel sheet region that is configured by the first steel sheet and that is formed spanning part or all of a length direction of the top plate, and a second steel sheet region that is configured by the second steel sheet and that is formed at the flange, to be joined by welding to another member, and wherein part or all of a length direction of the first steel sheet region is positioned within a length direction range of the second steel sheet region.

In this stamped part, a weld location to another member is formed in the second steel sheet region of the flange configured by the second steel sheet that has a carbon content of 0.20 mass % or less, thus enabling the occurrence of fracturing of the flange originating at the weld location when input with load to be suppressed. Moreover, in the stamped part, the first steel sheet region configured by the first steel sheet is formed spanning part or all of the length direction of the top plate. In the flange, the second steel sheet region to be joined by welding to another member is formed from the second steel sheet, and part or all of the length direction of the first steel sheet region is positioned within the length direction range of the second steel sheet region. This enables the strength of the top plate to be improved within the length direction range of the second steel sheet region in comparison, for example, to cases in which the first steel sheet region of the top plate is not positioned within the length direction range of the second steel sheet region A stamped part manufacturing method according to a fourth aspect of the present invention is also consistent with the insight discussed above. The stamped part manufacturing method includes a tailored blank a tailored blank forming process of butt welding a second steel sheet having a carbon content of 0.20 mass % or less to a first steel sheet having a carbon content of 0.27 mass % or more, to obtain a tailored blank including an elongated future top plate portion, a future sidewall portion positioned at a side of the future top plate portion, and a future flange portion positioned at a side of the future sidewall portion, and a stamping process of stamping the tailored blank to obtain a stamped part including a top plate formed from the future top plate portion, a sidewall formed from the future sidewall portion, and a flange formed from the future flange portion. The tailored blank formation process includes forming a first steel sheet region that is configured by the first steel sheet and that spans part or all of a length direction of the future top plate portion, and forming, at the future flange portion, a second steel sheet region that is configured by the second steel sheet such that part or all of a length direction of the first steel sheet region is positioned within a length direction range of the second steel sheet region to be joined by welding to another member.

In the stamped part obtained using the stamped part manufacturing method, a weld location to another member is formed in the second steel sheet region in the flange formed from the second steel sheet having a carbon content of 0.20 mass % or less, thereby enabling the occurrence of fracturing of the flange originating at the weld location when input with load to be suppressed. Moreover, in the stamped part, the first steel sheet region configured by the first steel sheet is formed spanning part or all of the length direction of the top plate. In the flange, the second steel sheet region to be joined by welding to another member is formed from the second steel sheet, and part or all of the length direction of the first steel sheet region is positioned within the length direction range of the second steel sheet region. This enables the strength of the top plate to be improved within the length direction range of the second steel sheet region in comparison, for example, to cases in which the first steel sheet region of the top plate is not positioned within the length direction range of the second steel sheet region.

Advantageous Effects of Invention

As described in detail above, the present invention is capable of providing a tailored blank, a tailored blank manufacturing method, a stamped part, and a stamped part manufacturing method capable of suppressing the occurrence of fracturing of a flange originating at a weld location during load input, while also improving the strength of a top plate within a length direction range of a flange join portion that is joined to another member at the weld location.

DESCRIPTION OF EMBODIMENTS

First, explanation follows regarding specific investigations undertaken by the inventors.

Figure 1:
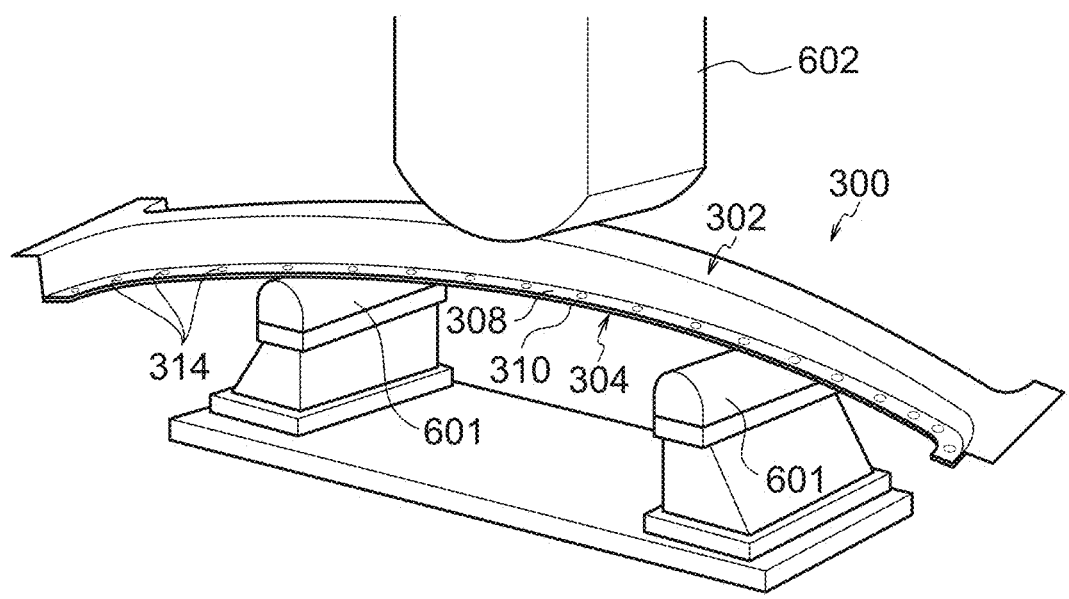
FIG. 1 is a perspective view illustrating an example of component testing during careful investigation carried out by the inventors.

FIG. 1 is a perspective view illustrating an example of component testing carried out during these investigations. A vehicle center pillar 300 was employed in this component testing. Note that although a side panel outer of the center pillar 300 is omitted from illustration in FIG. 1 and FIG. 2, the center pillar 300 employed in this component testing is configured by a combination of outer reinforcement 302, inner reinforcement 304, and the side panel outer disposed at the outer side of the outer reinforcement 302.

The outer reinforcement 302 and the inner reinforcement 304 respectively include a flange 308 and a flange 310, each extending along a length direction of the center pillar 300. The flange 308 and the flange 310 are joined to each other at plural spot weld locations 314 arranged in a row along the length direction of the center pillar 300. In this component testing, the center pillar 300 was placed on a pair of support members 601 with the inner reinforcement 304 facing downward, and downward load was input to a central section of the length direction of the center pillar 300 from above using an impactor 602.

Figure 2:
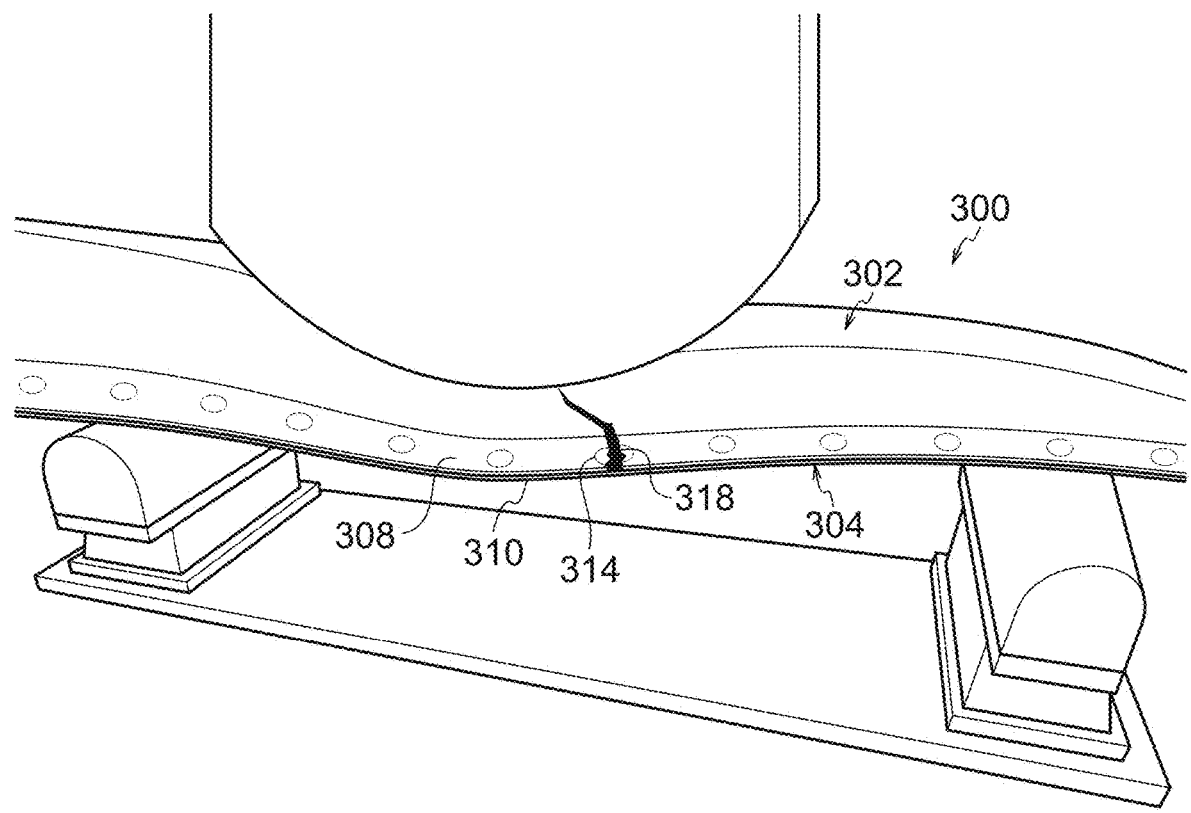
FIG. 2 is a perspective view illustrating an example of a fracture originating at a flange during component testing.

FIG. 2 is a perspective view illustrating an example of fracturing of the flange 308 of the outer reinforcement 302 during the component testing. When load is applied to the center pillar 300, once this load exceeds a specific load, a fracture 318 arises in the flange 308 of the outer reinforcement 302, originating at one of the spot weld locations 314. As described below, it was found that the fracture 318 originating at this spot weld location 314 may occur according to various modes, depending on the steel sheet material employed.

FIG. 3 to FIG. 6 are cross-sections illustrating respective examples of the fracture 318 originating at the spot weld location 314. FIG. 3 to FIG. 6 each illustrate a state in which the center pillar 300 includes a side panel outer 306. The respective flanges 308, 310, 312 of the outer reinforcement 302, the inner reinforcement 304, and the side panel outer 306 are joined together at the spot weld locations 314. A nugget 316 is formed at each of the spot weld locations 314.

Figure 3:
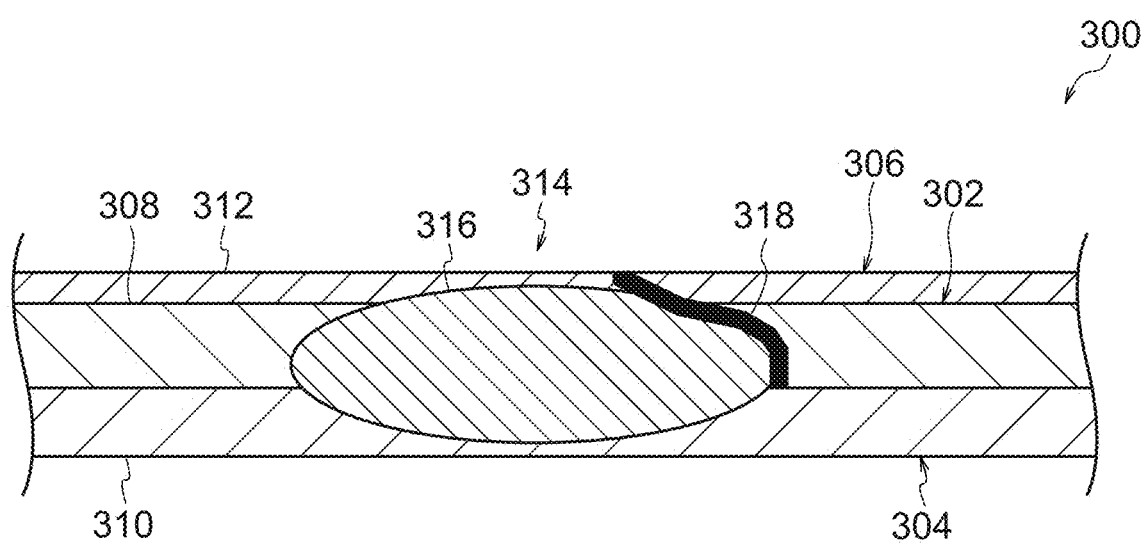
FIG. 3 is a cross-section illustrating an example of a fracture following a bonding location of a spot weld location.
Figure 4:
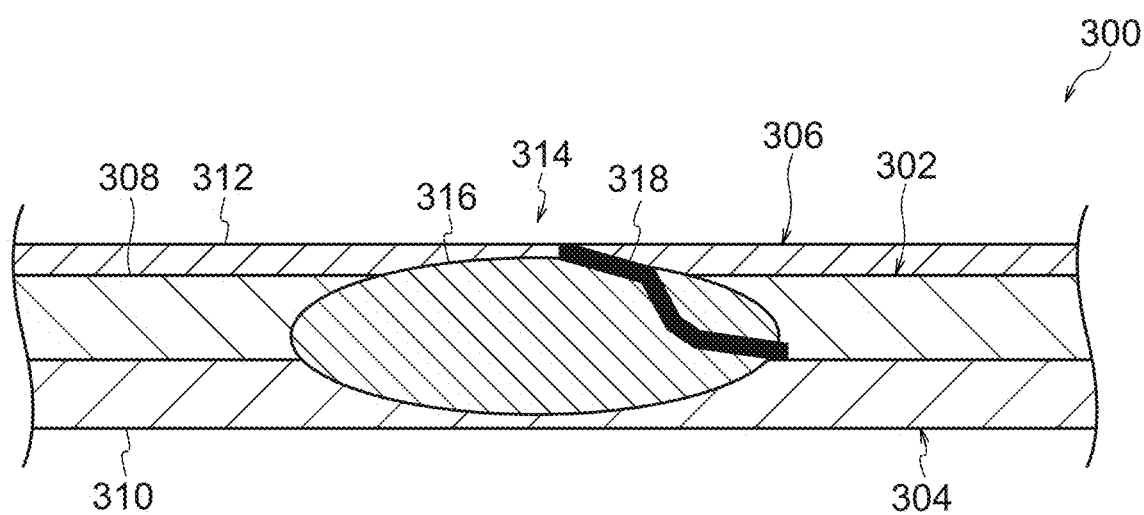
FIG. 4 is a cross-section illustrating an example of a fracture propagating obliquely inside a nugget.
Figure 5:
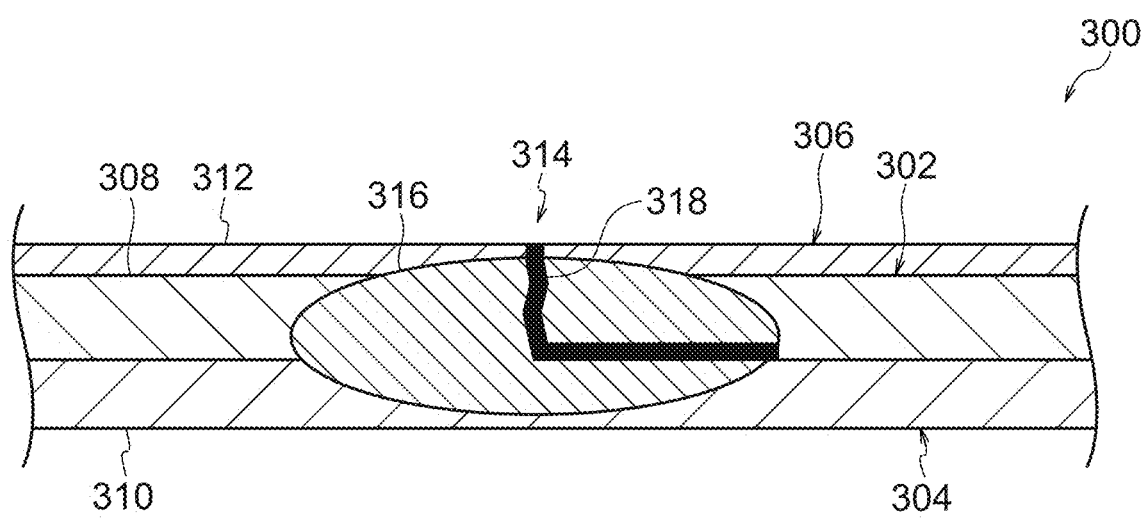
FIG. 5 is a cross-section illustrating an example of a fracture passing through the center of a nugget and propagating at a right angle.
Figure 6:
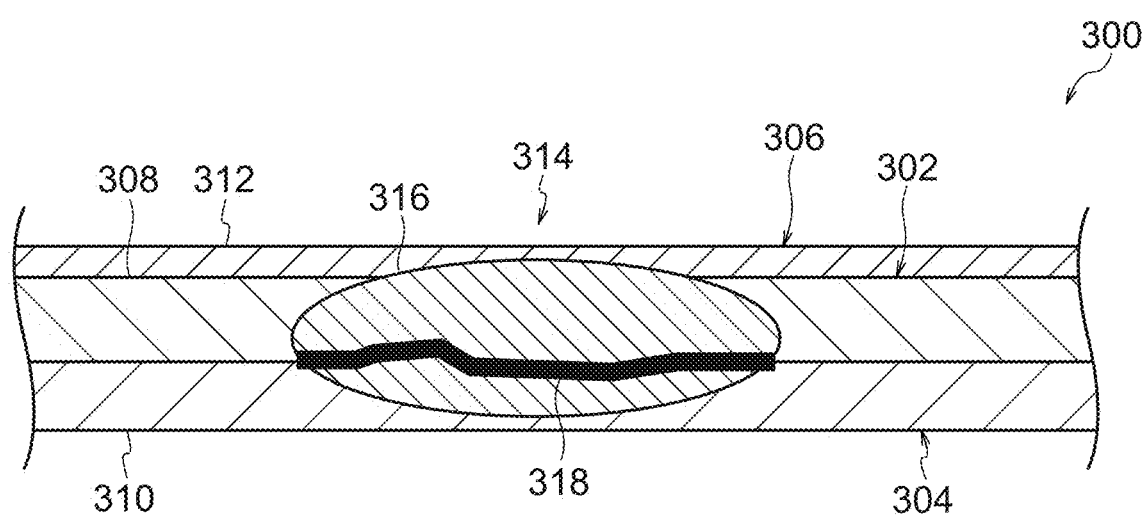
FIG. 6 is a cross-section illustrating an example of a fracture propagating following an interface between a nugget interior and flanges.
Figure 7:
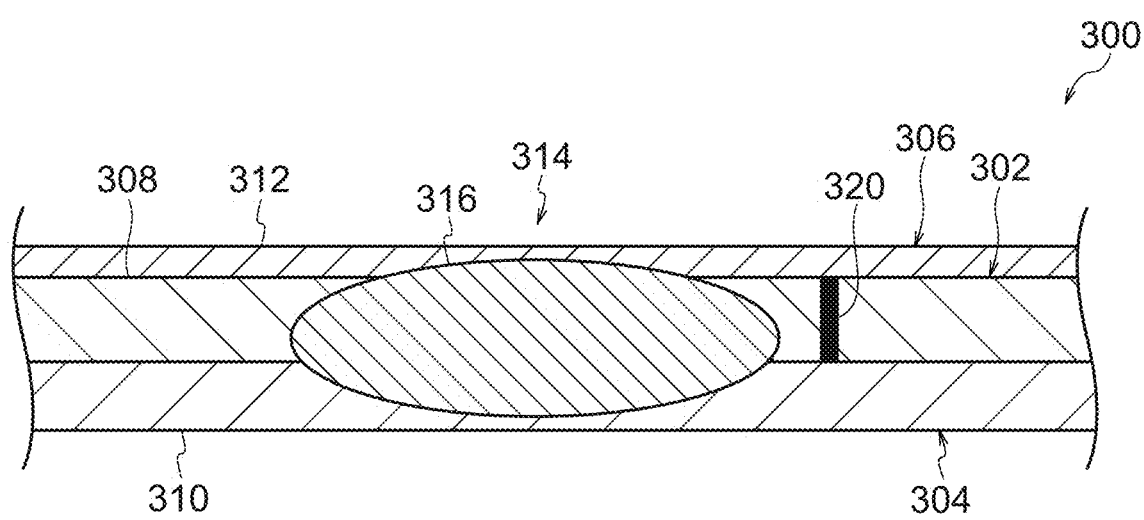
FIG. 7 is a cross-section illustrating an example of a fracture in a HAZ softened portion.

It was found that the fracture 318 originating at the spot weld location 314 may be a fracture following a bonding location (specifically, a melting boundary of the nugget 316) of the spot weld location 314 as illustrated in FIG. 3, or may be a fracture inside the nugget 316 as illustrated in FIG. 4 to FIG. 6. Specifically, it was found that fractures inside the nugget 316 include fractures that propagate obliquely inside the nugget 316 as illustrated in FIG. 4, fractures that pass through the center of the nugget 316 interior and propagate at a right angle as illustrated in FIG. 5, and fractures that propagate inside the nugget 316 following an interface between the flanges 308, 310 as illustrated in FIG. 6. For reference purposes, FIG. 7 illustrates an example of a fracture 320 in a HAZ softened portion.

Figure 8:
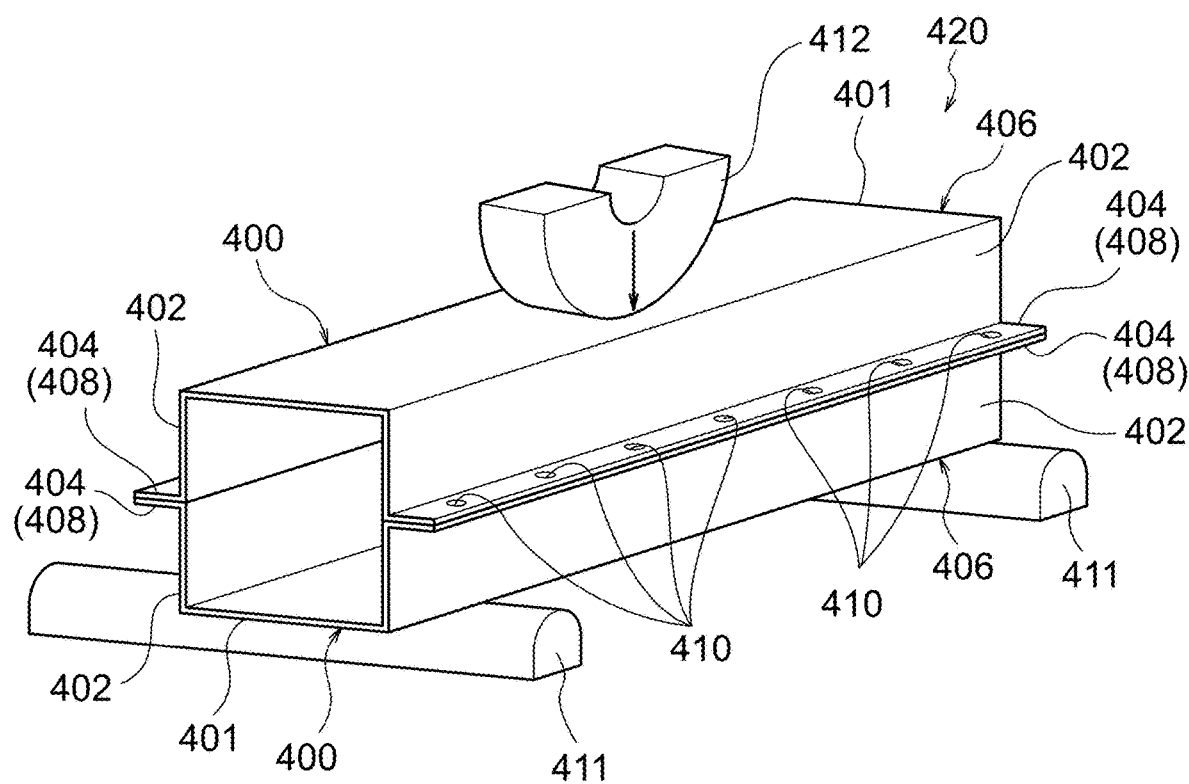
FIG. 8 is a perspective view illustrating an example of bending testing carried out in order to evaluate spot weld characteristics.

FIG. 8 is a perspective view illustrating an example of bending testing used to evaluate spot weld characteristics in members being subjected to investigation. This evaluation testing employs a structural body 420 configured from a pair of test pieces 400. Each of the test pieces 400 is stamped into a hat-shaped cross-section profile. Each of the test pieces 400 is configured by a first steel sheet 406 and second steel sheets 408, and is a stamped part configured from a tailored blank of a hot stamped steel sheet that has been quenched by hot stamping. A top plate 401 and sidewalls 402 of each of the test pieces 400 are configured by the first steel sheet 406. Flanges 404 of each of the test pieces 400 are configured by the second steel sheets 408. The flanges 404 are joined together in pairs at spot weld locations 410.

In this bending testing, the structural body 420 was placed on a pair of support members 411, and the structural body 420 was input with load from above using an impactor 412 so as to apply three-point bending load to the paired testing samples 400. In this bending testing, the speed of the impactor 412 was set to 10 mm/min, the sheet thickness of both the first steel sheets 406 and the second steel sheets 408 was set to 1.2 mm, and the nugget diameter at the spot weld locations 410 was set to 5.5 mm. Table 1 illustrates examples of the results of this bending testing. Note that the carbon equivalents of the first steel sheets 406 and the second steel sheets 408 were determined using Equation (1) below.

$$Ceq = C + Si/90 + Mn/100 + Cr/100 + 2P + 3S \qquad \text{Equation (1)}$$

Note that in Equation (1), C represents the carbon content (mass %) of the steel sheet. Similarly, Si, Mn, Cr, P, and S respectively represent the silicon content, manganese content, chromium content, phosphor content, and sulphur content of the steel sheet (all in mass %).

resistance spot-welded joints in high-strength steel sheet in an in-plane tensile test (Quarterly Journal of the Japan Welding Society Vol. 34, No. 4, pp. 285-294, 2016) found that in cases in which the carbon content of the second steel sheet 408 was 0.27 mass % or more, performing heat treatment or the like to temper and soften the periphery of the spot weld locations 410 prior to welding discouraged the occurrence of fracturing in the HAZ softened portion (see FIG. 7).

However, as illustrated in Table 1, in the bending testing illustrated in FIG. 8, it was found that in cases in which the carbon content of the second steel sheet 408 was 0.27 mass % or more, fracturing of the spot weld location 410 occurred following the bonding location (see FIG. 3) before reaching the maximum load (78 kN). It was also found that in cases in which the carbon content of the second steel sheet 408 was 0.21 mass % or more but less than 0.27 mass %, fracturing occurred inside the nugget formed at the spot weld location 410 (see FIG. 4 to FIG. 6).

On the other hand, it was discovered that if the carbon content of the second steel sheet 408 was 0.20 mass % or lower, fracturing following the bonding location of the spot weld location 410 (see FIG. 3) and fracturing inside the nugget formed at the spot weld location 410 (see FIG. 4 to FIG. 6) could be suppressed. It was also found that in cases in which the carbon equivalent as expressed by Equation (1) was 0.25 mass % or lower, fracturing originating at the spot weld location 410 could be suppressed even more stably. It was also found that a carbon content of 0.16 mass % or less and a carbon equivalent as expressed by Equation (1) of 0.21 mass % or less are even more preferable.

As a result of their careful investigations, the inventors discovered the critical importance of the carbon content and carbon equivalent in a steel sheet capable of suppressing flange fracturing originating at spot weld locations. Note that this insight was also expected to be applicable to weld locations formed not only by spot welding but also other welding methods.

Explanation follows regarding exemplary embodiments of the present invention, consistent with the insight outlined above.

Figure 9:
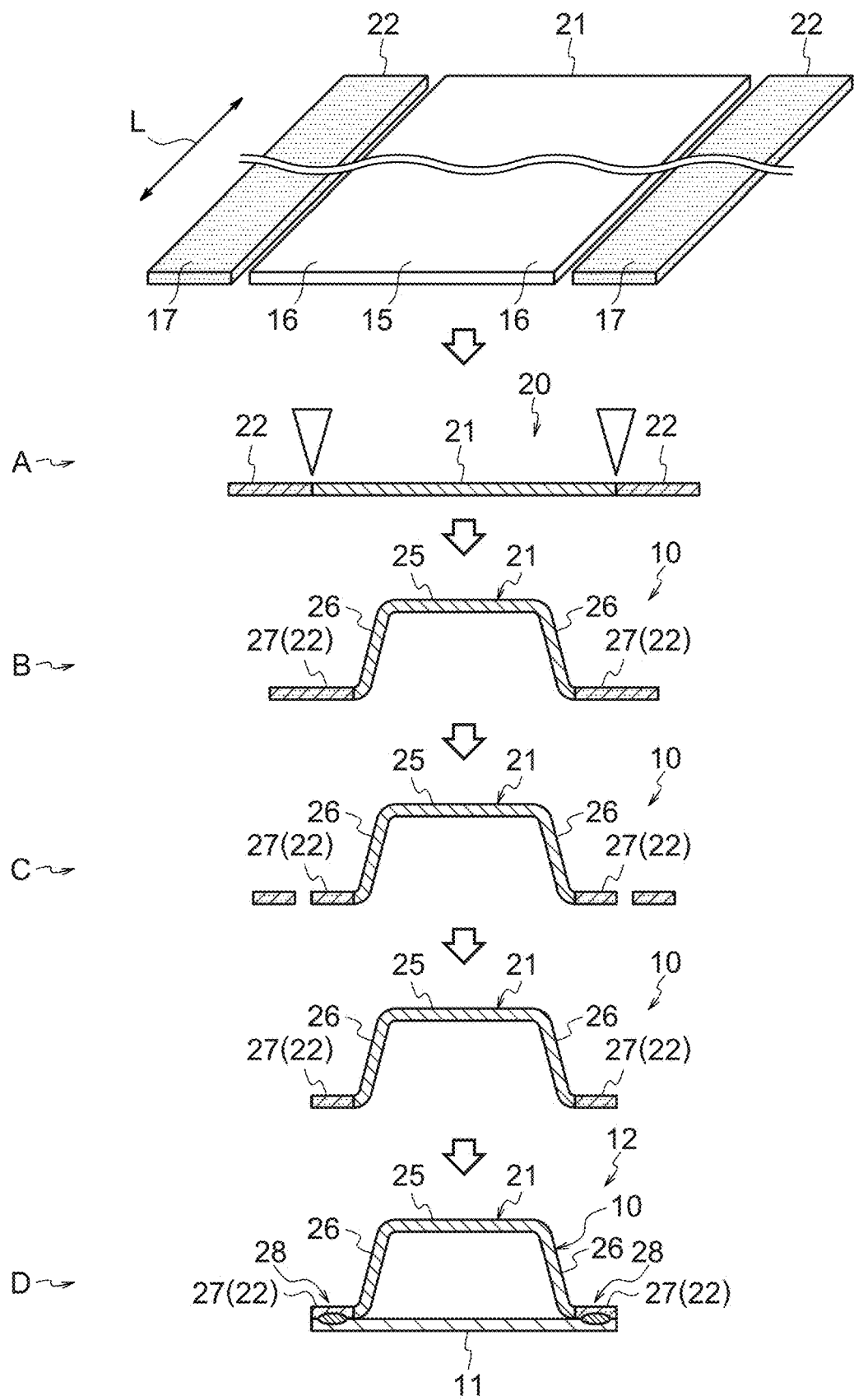
FIG. 9 is a diagram to explain a vehicle framework component manufacturing method according to an exemplary embodiment of the present invention.

First, explanation follows regarding a manufacturing method for a vehicle framework component according to an exemplary embodiment of the present invention, with reference to FIG. 9.

As an example, the vehicle framework component manufacturing method according to the present exemplary embodiment of the present invention is applied to manufacture of a framework component 12 including a stamped part 10 and a flat plate member 11. The stamped part 10 is formed

TABLE 1

|  | First steel sheet carbon content (mass %) | First steel sheet carbon equivalent (mass %) | Second steel sheet carbon content (mass %) | Second steel sheet carbon equivalent (mass %) | Test result (fracture present?) |
| --- | --- | --- | --- | --- | --- |
| First test example | 0.27 | 0.34 | 0.27 | 0.34 | Present |
| Second test example | 0.27 | 0.34 | 0.21 | 0.29 | Present |
| Third test example | 0.27 | 0.34 | 0.20 | 0.25 | Absent |

The in-plane tensile testing described in for example *Effects of HAZ softening on the strength and elongation of* from a tailored blank 20. The tailored blank 20 includes a first steel sheet 21 and a pair of second steel sheets 22. The first steel sheet 21 and the second steel sheets 22 will be described in more detail later. The first steel sheet 21 is configured from a high-strength steel sheet with a carbon content of 0.27 mass % or more, and the second steel sheets 22 are configured from a steel sheet with lower strength than the first steel sheet 21 and have a carbon content of 0.20 mass % or less.

In the vehicle framework component manufacturing method according to the present exemplary embodiment of the present invention, first the pair of second steel sheets 22 are butt welded to the first steel sheet 21 in a tailored blank formation process, illustrated as process A. This butt welding is performed by laser welding or plasma welding. In cases of hot stamped steel sheet applied with an aluminum-based coating, since introducing aluminum into the butt weld location could result in a decrease in the join strength at the butt weld location, such an aluminum coating layer is preferably removed by machine abrasion or laser abrasion prior to performing the butt welding.

The tailored blank 20 including the first steel sheet 21 and the pair of second steel sheets 22 is obtained by the tailored blank formation process illustrated as process A. The tailored blank 20 includes a future top plate portion 15, future sidewall portions 16, and future flange portions 17. The future top plate portion 15 is a portion that will later be formed into a top plate 25, the future sidewall portions 16 are portions that will later be formed into sidewalls 26, and the future flange portions 17 are portions that will later be formed into flanges 27.

The future top plate portion 15 is elongated in an arrow L direction, this being the length direction of the tailored blank 20. The future sidewall portions 16 are positioned to the sides of the future top plate portion 15, and the future flange portions 17 are positioned to the sides of the future sidewall portions 16. The future top plate portion 15 and the future sidewall portions 16 are formed from the first steel sheet 21, and the future flange portions 17 are formed from the second steel sheets 22. The process A corresponds to a tailored blank manufacturing method according to the present exemplary embodiment of the present invention.

Next, the tailored blank 20 is stamped in a stamping process illustrated as process B. This stamping may be implemented by either hot or cold stamping. In order to obtain a high strength stamped part, a steel sheet suitable for hot stamping is preferably employed for the stamped part 10, and hot stamping is preferably performed in the stamping process.

In cases in which a TRIP steel sheet is employed in the stamped part 10, the stamping process may be implemented by cold stamping. In cases in which an uncoated hot stamped steel sheet is employed in the stamped part 10 and in cases in which the stamping process is implemented by hot stamping, scale may be removed by shot blasting following stamping.

The stamping process illustrated as the process B forms the top plate 25 from the future top plate portion 15, forms the sidewalls 26 from the future sidewall portions 16, and forms the flanges 27 from the future flange portions 17. The stamped part 10 with a hat-shaped cross-section profile including the top plate 25, the pair of sidewalls 26, and the pair of flanges 27 is thereby obtained. In the stamped part 10, the top plate 25 and the pair of sidewalls 26 are formed from the first steel sheet 21, and the flanges 27 are configured by the second steel sheets 22. The process A and process B described above correspond to a stamped part manufacturing method according to the present exemplary embodiment of the present invention.

A trimming process, illustrated as process C, may be performed as required to trim the pair of flanges 27 to appropriate lengths. This trimming process may be implemented by either mechanical trimming or laser trimming. Alternatively, the trimming process may be omitted.

Next, in a spot welding process, illustrated as process D, the pair of flanges 27 are joined to both end sections of the flat plate member 11 by spot welding in a state in which both end sections of the flat plate member 11, this being an example of "another member" are superimposed on the pair of flanges 27 formed to the stamped part 10. Spot weld locations 28 are thus formed to the pair of flanges 27. The framework component 12 is manufactured in the manner described above.

Note that although the framework component 12 is configured from two members, namely the stamped part 10 and the flat plate member 11, in the vehicle framework component manufacturing method according to the present exemplary embodiment of the present invention described above, the framework component 12 may be configured by three or more members. In cases in which the framework component 12 is configured by three or more members, for example, flanges of the third member onward may be interposed between the pair of flanges 27 and the flat plate member 11 formed to the stamped part 10. A maximum of four steel sheets may be joined together at such flanges.

Next, more specific explanation follows regarding the steel sheets employed as the first steel sheet 21 and the second steel sheets 22 described above.

The steel sheets employed as the first steel sheet 21 and the second steel sheets 22 are selected based on the insight discussed above relating to the mechanical properties of steel sheets. Note that as an example, explanation regarding the tailored blank 20 and the stamped part 10 according to the present exemplary embodiment of the present invention envisages application to a vehicle framework component. Specifically, the first steel sheet 21 is configured by carbon steel with a carbon content of 0.27 mass % or more, and although the first steel sheet 21 is capable of securing strength, for example in a vehicle collision, the steel sheet configuring the first steel sheet 21 exhibits marked brittleness at spot weld locations. The upper limit of the carbon content of the first steel sheet 21 is preferably set to 0.50 mass %. Since the first steel sheet 21 is required to secure strength in a vehicle collision, a steel sheet with tensile strength of 1470 MPa or more (a Vickers hardness of 440) is preferable. Although there is no particular upper limit to the tensile strength of the first steel sheet 21, as an example the first steel sheet 21 is configured by a hot stamped steel sheet having tensile strength of 2700 MPa or less (a Vickers hardness of 790). The Vickers load used to measure the Vickers hardness is 9.8 N.

A hot stamped steel sheet with a tensile strength grade of from 1800 MPa to 2200 MPa (Vickers hardness of 540 to 670), or a high strength cold-rolled steel sheet such as a TRIP steel sheet with a tensile strength grade of 1470 MPa (Vickers hardness of 440 or more) are representative examples of the first steel sheet 21. Although the carbon equivalent of the first steel sheet 21 is not particularly limited, a steel sheet in which the carbon equivalent as expressed by Equation (2) below is 0.30 mass % or more is capable of securing strength in a vehicle collision, but tends to become brittle, in particular at the spot weld locations 28. Accordingly, such a steel sheet may be applied to good effect as the first steel sheet 21. Note that Equation (2) is the same as Equation (1) above.

$$Ceq = C + Si/90 + Mn/100 + Cr/100 + 2P + 3S \quad \text{Equation (2)}$$

In order for the second steel sheets 22 to suppress the occurrence of fracturing originating at the spot weld locations 28, the second steel sheets 22 are configured by carbon steel with a carbon content of 0.20 mass % or less. The second steel sheets 22 preferably have a carbon equivalent as expressed by Equation (2) of 0.25 mass % or less, and more preferably have a carbon content of 0.16 mass % or less and a carbon equivalent as expressed by Equation (2) of 0.21 mass % or less.

An upper limit of the tensile strength of the second steel sheets 22 is preferably 1500 MPa or less (Vickers hardness of 450). Although not particularly limited, a lower limit of the tensile strength of the second steel sheets 22 is preferably 590 MPa or more (Vickers hardness of 180) since collision performance will suffer if the tensile strength is excessively low. For example, values of the tensile strength of the second steel sheets 22 are ideally 1350 MPa or less (Vickers hardness of 420) and 980 MPa or more (Vickers hardness of 290).

The surfaces of the first steel sheet 21 and the second steel sheets 22 may be unplated or may have an aluminum-based coating (Al—Si), a zinc-based coating (GA, GI, Zn—Ni, Zn—Al—Mg, Zn—Mg), or the like. Although the sheet thicknesses of the first steel sheet 21 and the second steel sheets 22 are not particularly limited, they may for example be set at from 0.7 mm to 3.2 mm, and more preferably from 1.0 mm to 2.3 mm.

As described in detail above, in the present exemplary embodiment of the present invention the tailored blank 20 is obtained. The tailored blank 20 includes the first steel sheet 21 with a carbon content of 0.27 mass % or more and the second steel sheets 22 with a carbon content of 0.20 mass % or less that are butt welded to the first steel sheet 21. The stamped part 10 formed from the tailored blank 20 is capable of suppressing the occurrence of fracturing originating at the spot weld locations 28 when input with load accompanying a vehicle collision due to the forming the spot weld locations 28 to the flat plate member 11 on the second steel sheets 22 that have a carbon content of 0.20 mass % or less. Moreover, due to being configured by the first steel sheet 21 with a carbon content of 0.27 mass % or more at locations where strength is required, the stamped part 10 formed from the tailored blank 20 is capable of securing strength and thus securing the collision performance of the framework component 12 (stamped part 10).

Note that although the tailored blank 20 and the stamped part 10 according to the present exemplary embodiment of the present invention are preferably applied to a vehicle framework component, application may also be made to components other than vehicle framework components. The stamped part 10 according to the present exemplary embodiment of the present invention may be stamped into a profile other than a hat-shaped cross-section profile.

Next, explanation follows regarding various arrangements of the first steel sheet 21 and the second steel sheets 22 in the tailored blank 20 and the stamped part 10.

As described above, the inventors discovered that in order to suppress the occurrence of fracturing of the flange originating at spot weld locations when input with load, as well as to improve the strength of the top plate in a length direction range of a flange join portion configuring a join to another member at the spot weld locations in a stamped part including an elongated top plate, sidewalls extending along the top plate, and flanges extending along the sidewalls, the flange join portions should be formed from the second steel sheet with a carbon content of 0.20 mass % or less, and the top plate positioned inside the length direction range of the flange join portions should be formed from the first steel sheet with a carbon content of 0.27 mass % or more.

Figure 10:
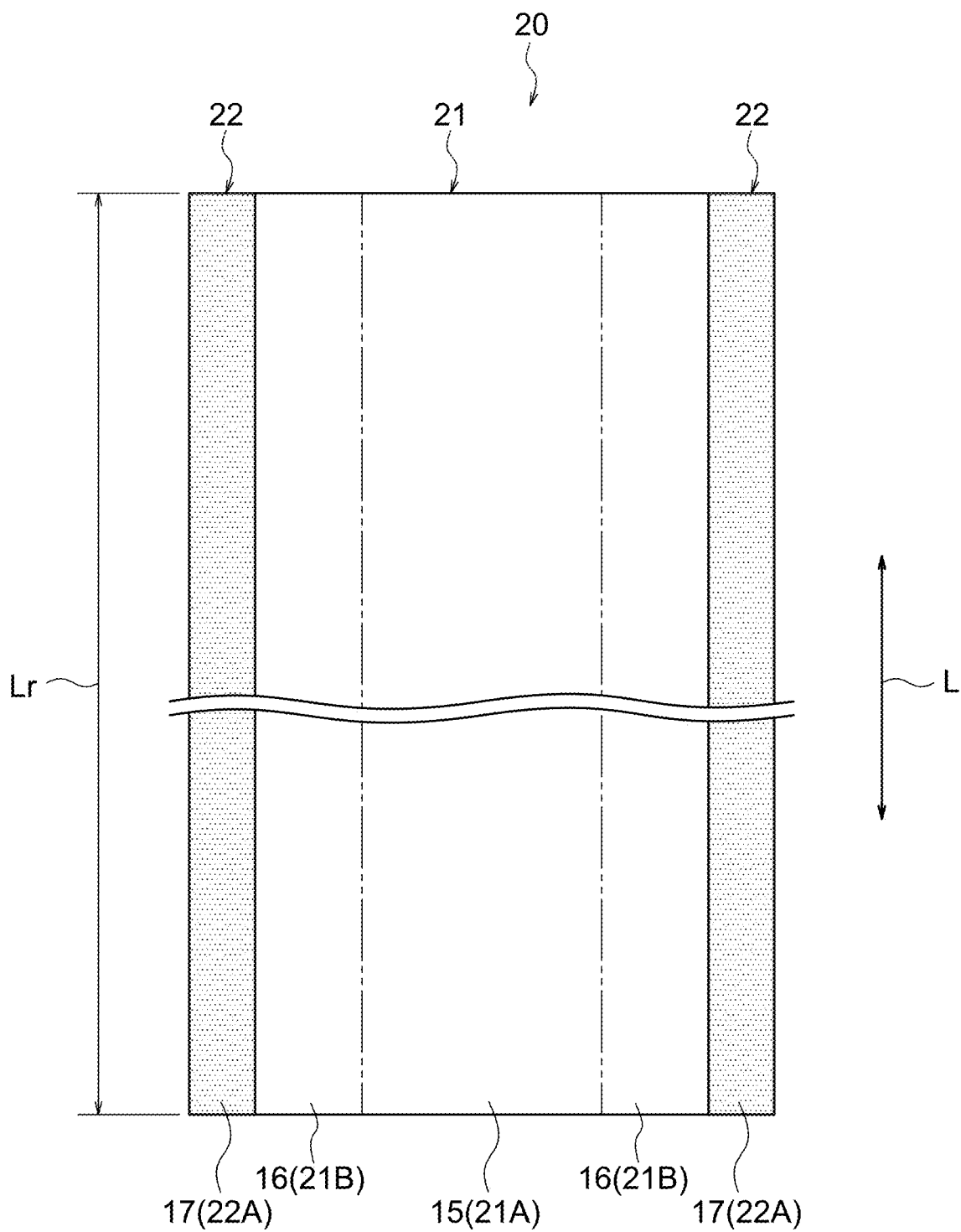
FIG. 10 is a plan view illustrating a tailored blank from FIG. 9.

FIG. 10 is a plan view illustrating the tailored blank 20 illustrated in FIG. 9. The arrow L direction corresponds to the length direction of the tailored blank 20, this also being the length direction of the future top plate portion 15. The tailored blank 20 illustrated in FIG. 10 is consistent with the insight discussed above relating to the placement of the first steel sheet 21 and the second steel sheets 22, and the future top plate portion 15 is formed from the first steel sheet 21 along the entire length direction length of the future top plate portion 15. Similarly, the future sidewall portions 16 are formed from the first steel sheet 21 along the entire length direction of the future sidewall portions 16. Namely, the entire length direction of the future top plate portion 15 corresponds to a first steel sheet region 21A formed from the first steel sheet 21, and the entire length directions of the future sidewall portions 16 correspond to first steel sheet regions 21B formed from the first steel sheet 21.

On the other hand, the future flange portions 17 are formed from the second steel sheets 22 along the entire length direction length of the future flange portions 17. Namely, the entire length directions of the future flange portions 17 correspond to second steel sheet regions 22A formed from the second steel sheets 22. The overall lengths of the first steel sheet region 21A and the first steel sheet regions 21B are the same as the overall length of the second steel sheet regions 22A, and the entire length direction of the first steel sheet region 21A described above is positioned within a length direction range Lr of the second steel sheet regions 22A. Note that the entire length direction is understood to correspond to the entire length of a region spanning from one end to the other end in the length direction.

Figure 11:
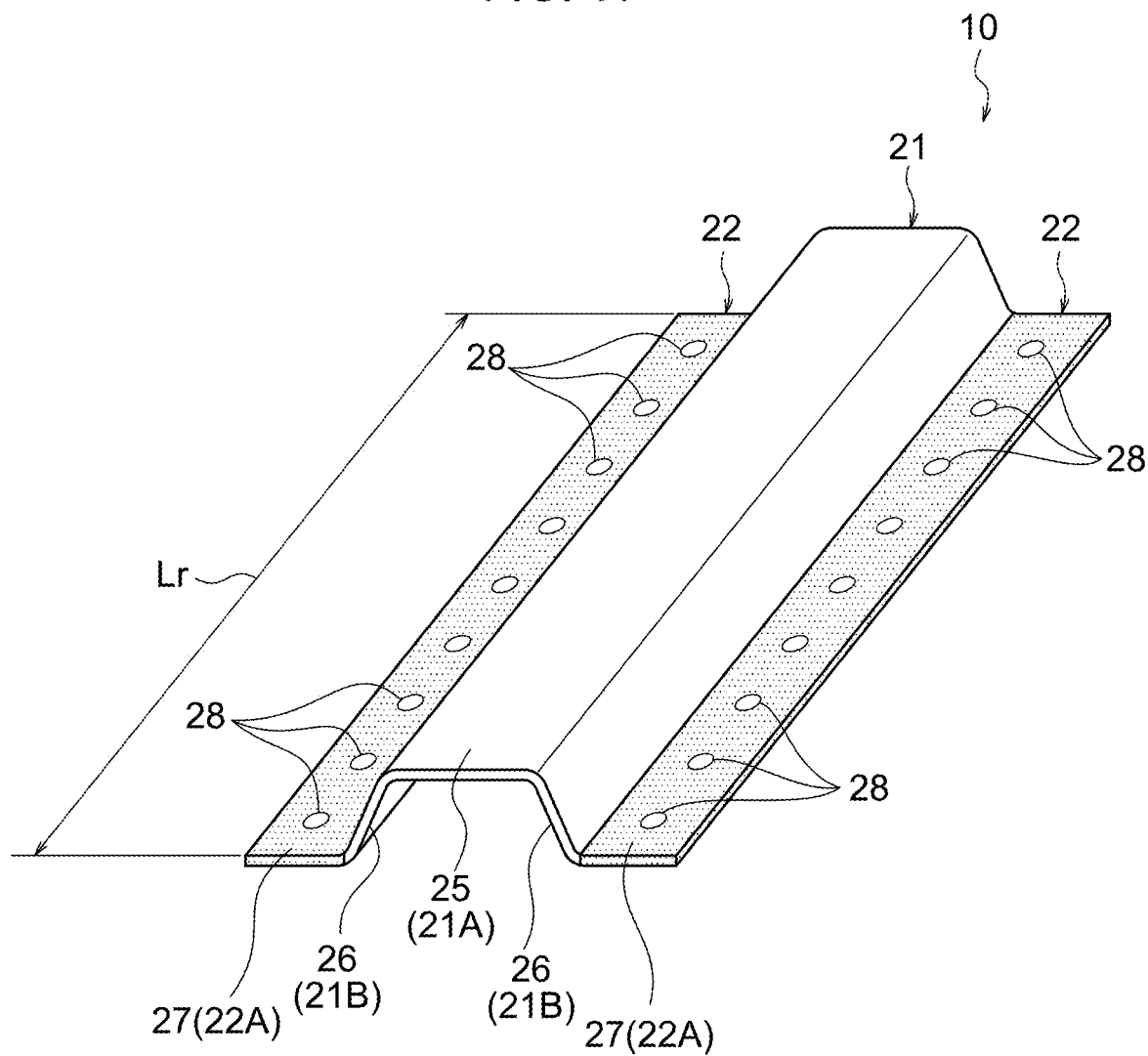
FIG. 11 is a perspective view illustrating a stamped part with a hat-shaped cross-section profile formed from the tailored blank in FIG. 10.

The tailored blank 20 obtains the following operation and advantageous effects. FIG. 11 is a perspective view illustrating the stamped part 10 with a hat-shaped cross-section profile when formed from the tailored blank 20 in FIG. 10. In the stamped part 10, the flanges 27 (second steel sheet regions 22A) formed from the second steel sheets 22 with a carbon content of 0.20 mass % or less are formed with the spot weld locations 28, enabling the occurrence of fracturing of the flanges 27 originating at the spot weld locations 28 when input with load to be suppressed. Moreover, in the stamped part 10, the entire length direction of the top plate 25 is formed from the first steel sheet 21 with a carbon content of 0.27 mass % or more, and the entire length direction of the first steel sheet region 21A formed from the first steel sheet 21 is positioned within the length direction range Lr of the second steel sheet regions 22A that form the flanges 27. Accordingly, the stamped part 10 is better capable of improving the strength of the top plate 25 within the length direction range Lr of the second steel sheet regions 22A than in cases in which the first steel sheet region 21A corresponding to the top plate 25 is not positioned within the length direction range Lr of the second steel sheet regions 22A, such as in a case in which the stamped part 10 is configured by butt joining the first steel sheet 21 and the second steel sheets 22 together in the length direction of the stamped part 10.

Figure 12:
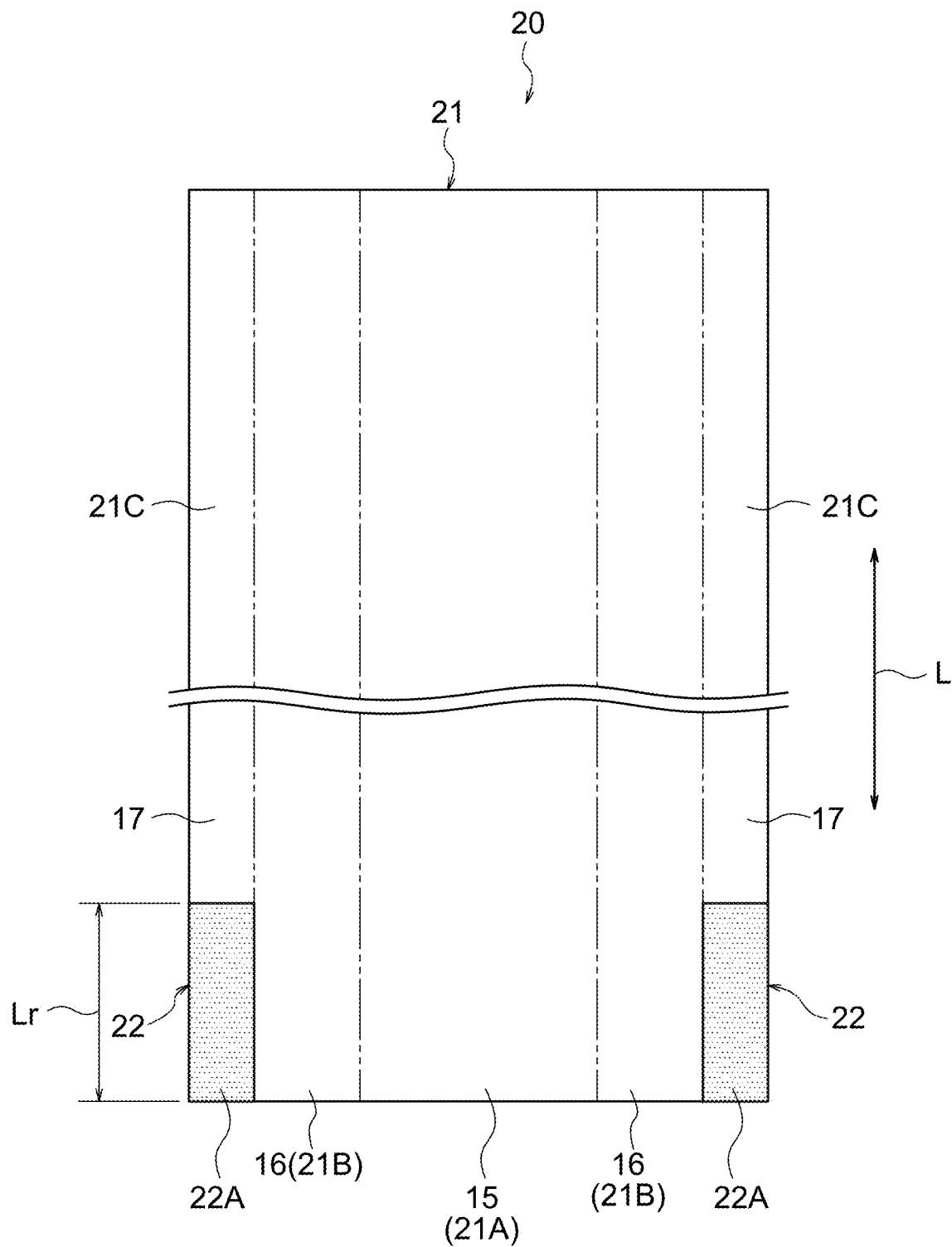
FIG. 12 is a plan view illustrating a first modified example of the tailored blank in FIG. 10.

FIG. 12 is a plan view illustrating a first modified example of the tailored blank 20 illustrated in FIG. 10. The tailored blank 20 illustrated in FIG. 12 is modified from the tailored blank 20 in FIG. 10 in that one length direction end sections of the future flange portions 17 are formed from the second steel sheets 22, and sections of the future flange portions 17 other than the one length direction end sections are formed from the first steel sheet 21. Namely, the one length direction end sections of the future flange portions 17 correspond to second steel sheet regions 22A formed from the second steel sheets 22, and sections of the future flange portions 17 other than the one length direction end sections correspond to first steel sheet regions 21C formed from the first steel sheet 21. One length direction end section of the first steel sheet region 21A that forms the top plate 25 is positioned within the length direction range Lr of the second steel sheet regions 22A that form the flanges 27. The one length direction end section of the first steel sheet region 21A corresponds to "one length direction section of the first steel sheet region".

Figure 13:
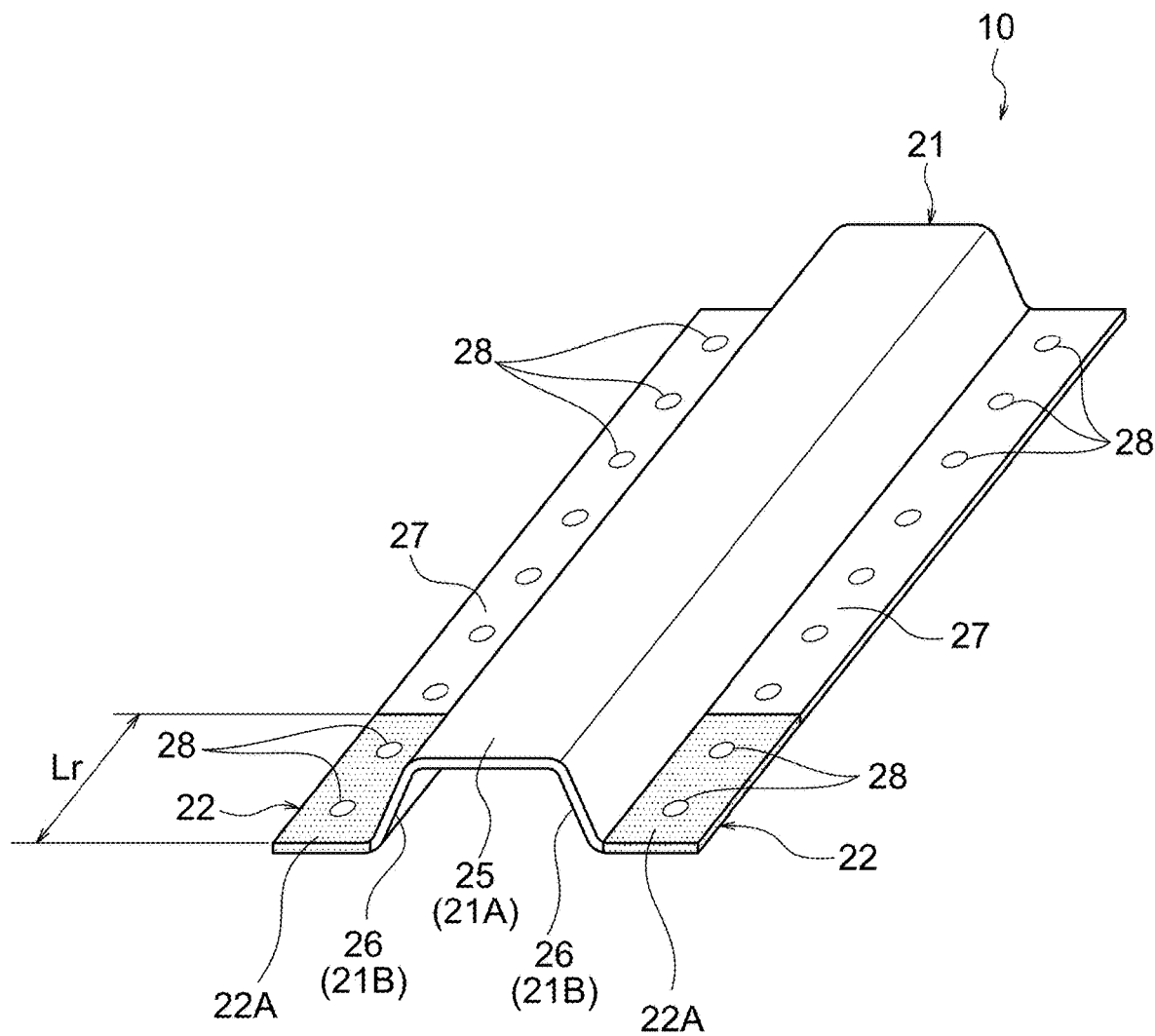
FIG. 13 is a perspective view illustrating a stamped part with a hat-shaped cross-section profile formed from the tailored blank in FIG. 12.

This tailored blank 20 obtains the following operation and advantageous effects. FIG. 13 is a perspective view illustrating the stamped part 10 with a hat-shaped cross-section profile when formed from the tailored blank 20 in FIG. 12. In this stamped part 10, the second steel sheet regions 22A corresponding to the flanges 27 formed from the second steel sheets 22 with a carbon content of 0.20 mass % or less are formed with the spot weld locations 28, enabling the occurrence of fracturing of the flanges 27 originating at the spot weld locations 28 in the second steel sheet regions 22A to be suppressed, even when these spot weld locations 28 in the second steel sheet regions 22A are input with load. Moreover, in the stamped part 10, the entire length direction of the top plate 25 corresponds to the first steel sheet region 21A formed from the first steel sheet 21 with a carbon content of 0.27 mass % or more, and the one length direction end section of the first steel sheet region 21A is positioned within the length direction range Lr of the second steel sheet regions 22A that form the flanges 27. Accordingly, the stamped part 10 is better capable of improving the strength of the top plate 25 within the length direction range Lr of the second steel sheet regions 22A than in cases in which the first steel sheet region 21A corresponding to the top plate 25 is not positioned within the length direction range Lr of the second steel sheet regions 22A, such as in a case in which the stamped part 10 is configured by butt joining the first steel sheet 21 and the second steel sheets 22 together in the length direction of the stamped part 10.

Figure 14:
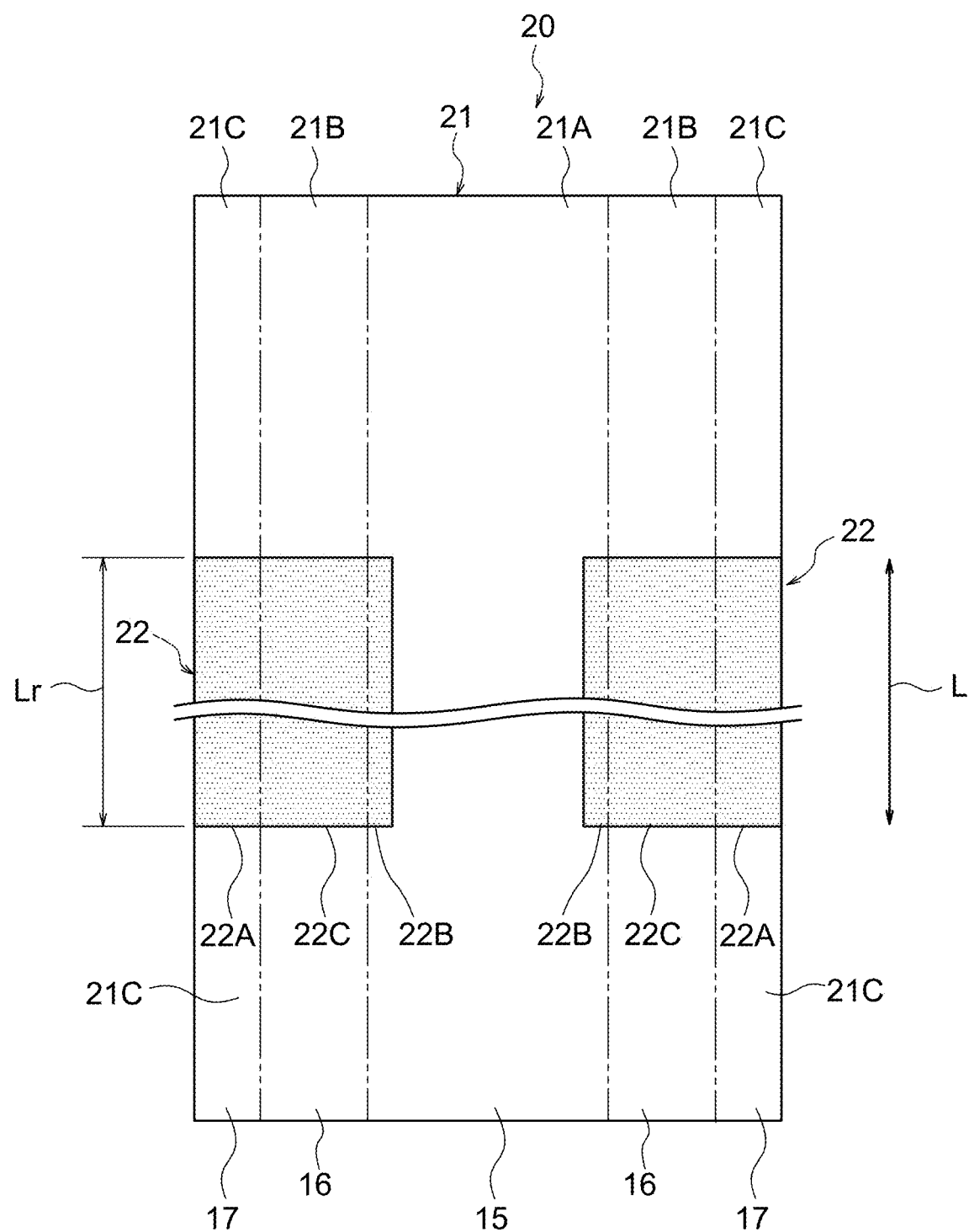
FIG. 14 is a plan view illustrating a second modified example of the tailored blank in FIG. 10.

FIG. 14 is a plan view illustrating a second modified example of the tailored blank 20 illustrated in FIG. 10. The tailored blank 20 illustrated in FIG. 14 is modified from the tailored blank 20 in FIG. 10 in that the central sections of the length direction of the future flange portions 17 are formed from the second steel sheets 22, and sections of the future flange portions 17 other than the central sections of the length direction are formed from the first steel sheet 21. Namely, the central sections of the length direction of the future flange portions 17 correspond to second steel sheet regions 22A formed from the second steel sheets 22, and sections of the future flange portions 17 other than the central sections of the length direction correspond to first steel sheet regions 21C formed from the first steel sheet 21. A central section of the length direction of the first steel sheet region 21A that forms the top plate 25 is positioned within the length direction range Lr of the second steel sheet regions 22A that form the flanges 27. The central section of the length direction of the first steel sheet region 21A corresponds to "one length direction section of the first steel sheet region".

Note that the respective central sections of the length direction of the future top plate portion 15 and the future sidewall portions 16 are also formed with second steel sheet regions 22B, 22C configured by the second steel sheets 22. The second steel sheet regions 22B, 22C are contiguous with respect to the second steel sheet regions 22A. Although the future top plate portion 15 includes the second steel sheet regions 22B on both width direction sides of the central section of the length direction, the first steel sheet 21 forming the future top plate portion 15 is still continuous over the entire length direction of the future top plate portion 15. In this manner, the entire length direction of the future top plate portion 15 being formed from the first steel sheet region 21A also encompasses such cases as long as the first steel sheet 21 forming the future top plate portion 15 is continuous over the entire length direction of the future top plate portion 15.

Figure 15:
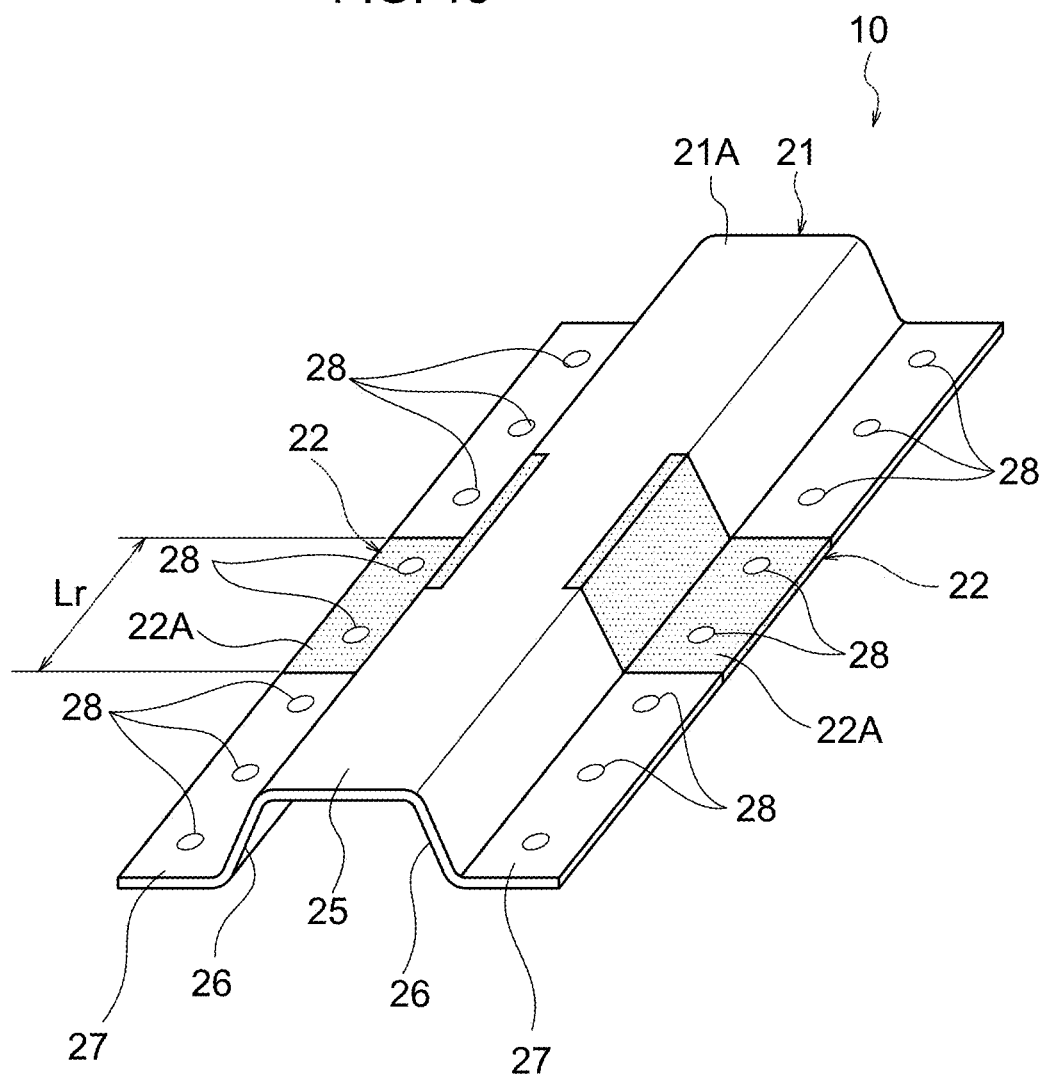
FIG. 15 is a perspective view illustrating a stamped part with a hat-shaped cross-section profile formed from the tailored blank in FIG. 14.

This tailored blank 20 obtains the following operation and advantageous effects. FIG. 15 is a perspective view illustrating the stamped part 10 with a hat-shaped cross-section profile when formed from the tailored blank 20 in FIG. 14. In this stamped part 10, the second steel sheet regions 22A corresponding to the flanges 27 formed from the second steel sheets 22 with a carbon content of 0.20 mass % or less are formed with the spot weld locations 28, enabling the occurrence of fracturing of the flanges 27 originating at the spot weld locations 28 in the second steel sheet regions 22A to be suppressed, even when these spot weld locations 28 in the second steel sheet regions 22A are input with load. Moreover, in the stamped part 10, the first steel sheet 21 with a carbon content of 0.27 mass % or more that forms the top plate 25 is continuous over the entire length direction of the top plate 25, and the central section of the length direction of the first steel sheet region 21A formed from the first steel sheet 21 is positioned within the length direction range Lr of the second steel sheet regions 22A that form the flanges 27. Accordingly, the stamped part 10 is better capable of improving the strength of the top plate 25 within the length direction range Lr of the second steel sheet regions 22A than in cases in which the first steel sheet region 21A corresponding to the top plate 25 is not positioned within the length direction range Lr of the second steel sheet regions 22A, such as in a case in which the stamped part 10 is configured by butt joining the first steel sheet 21 and the second steel sheets 22 together in the length direction of the stamped part 10.

Figure 16:
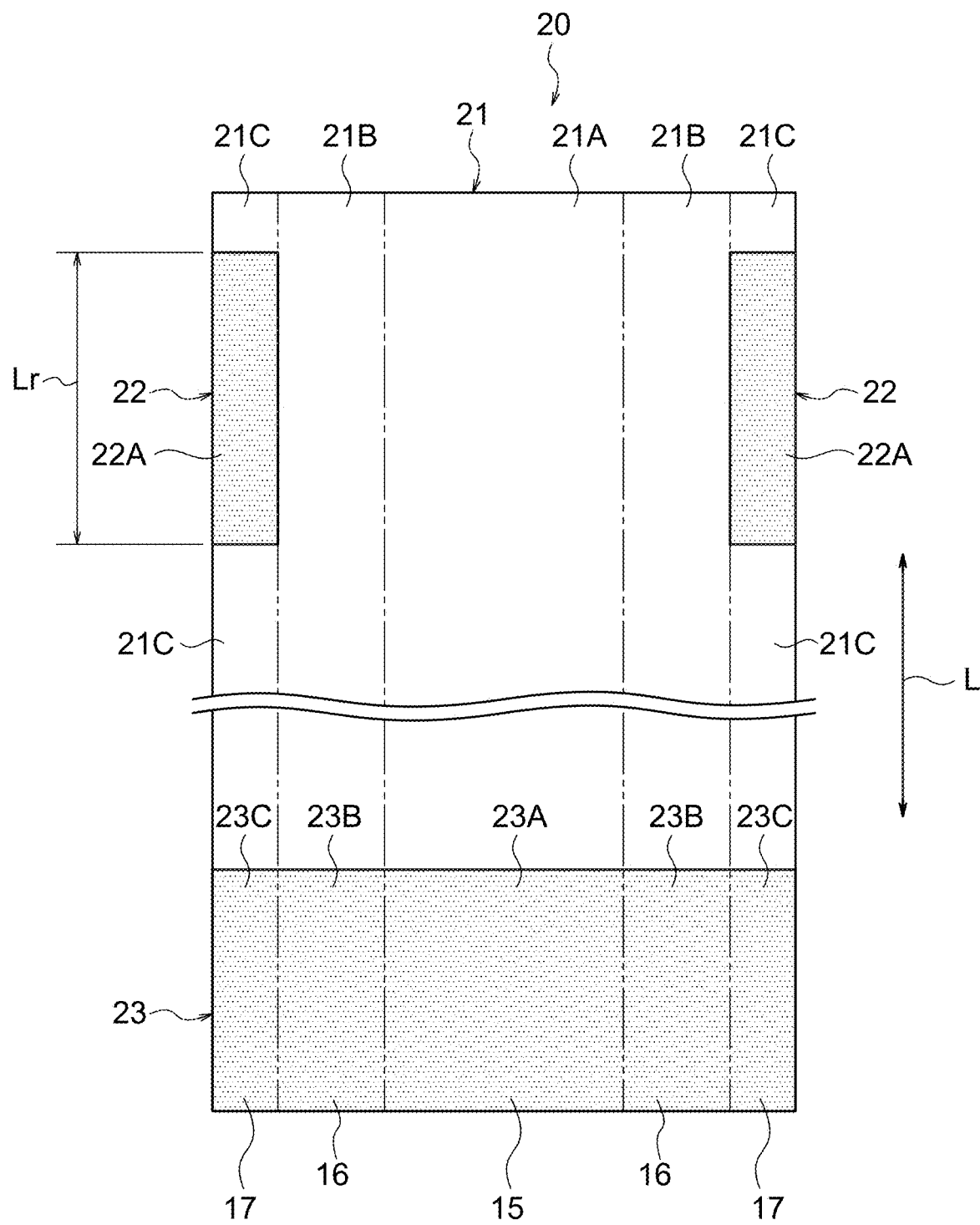
FIG. 16 is a plan view illustrating a third modified example of the tailored blank in FIG. 10.

FIG. 16 is a plan view illustrating a third modified example of the tailored blank 20 illustrated in FIG. 10. The tailored blank 20 illustrated in FIG. 16 is modified from the tailored blank 20 in FIG. 10 in that the tailored blank 20 includes the first steel sheet 21, the second steel sheets 22, and a third steel sheet 23. The third steel sheet 23 is configured of the same steel sheet material as the second steel sheets 22, and configures one length direction end section of the tailored blank 20.

One length direction end section of the future top plate portion 15 corresponds to a third steel sheet region 23A formed from the third steel sheet 23, and sections of the future top plate portion 15 other than one length direction end section correspond to the first steel sheet region 21A formed from the first steel sheet 21. One length direction end sections of the future sidewall portions 16 correspond to third steel sheet regions 23B formed from the third steel sheet 23, and sections of the future sidewall portions 16 other than the one length direction end sections correspond to the first steel sheet regions 21B formed from the first steel sheet 21.

One length direction end sections of the future flange portions 17 correspond to third steel sheet regions 23C formed from the third steel sheet 23, and sections of the future flange portions 17 other than the one length direction end sections correspond to either the second steel sheet regions 22A formed from the second steel sheets 22 or the first steel sheet regions 21C formed from the first steel sheet 21. One length direction section of the first steel sheet region 21A that forms the top plate 25 is positioned within the length direction range Lr of the second steel sheet regions 22A that form the flanges 27.

Figure 17:
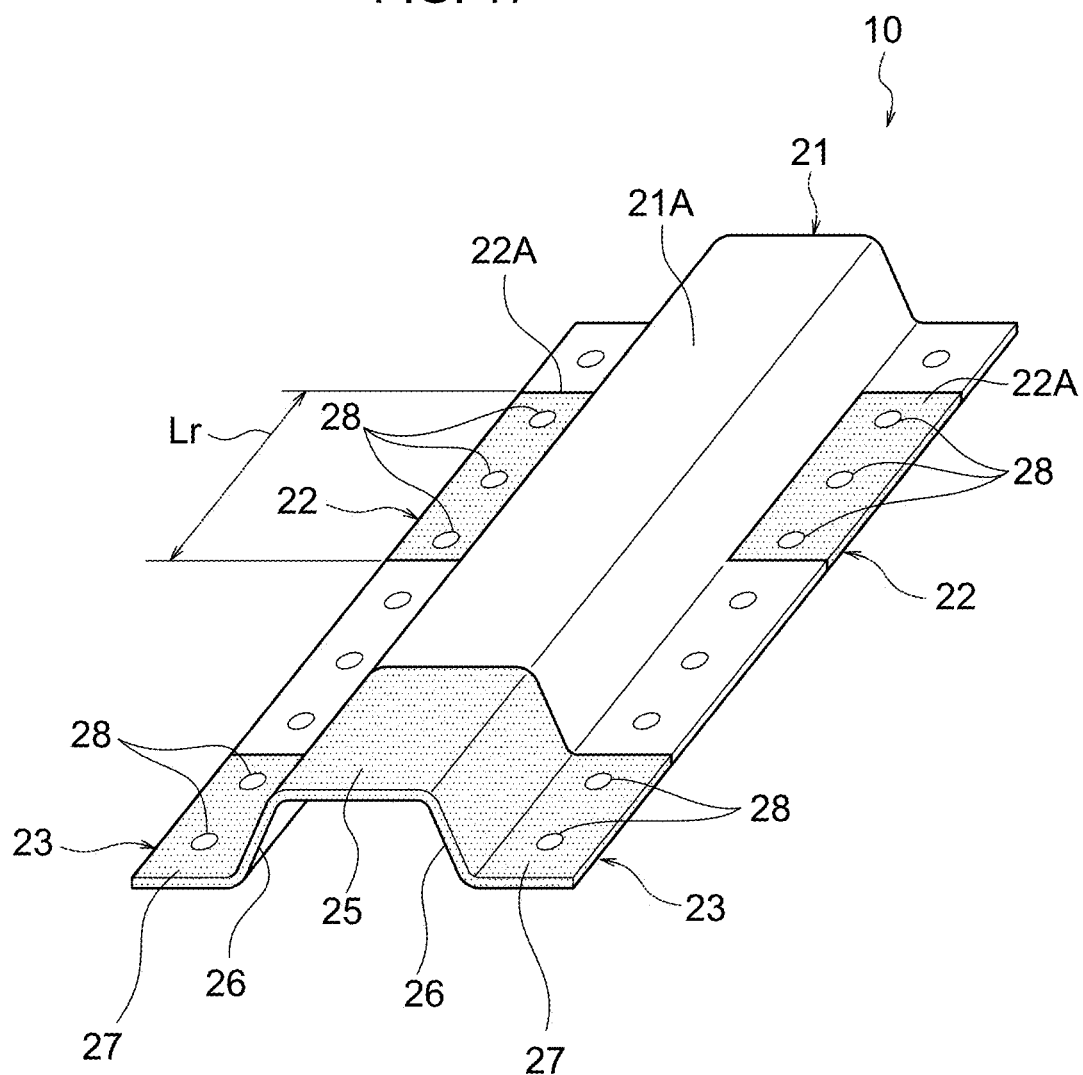
FIG. 17 is a perspective view illustrating a stamped part with a hat-shaped cross-section profile formed from the tailored blank in FIG. 16.

This tailored blank 20 obtains the following operation and advantageous effects. FIG. 17 is a perspective view illustrating the stamped part 10 with a hat-shaped cross-section profile when formed from the tailored blank 20 in FIG. 16. In the stamped part 10, the second steel sheet regions 22A corresponding to the flanges 27 formed from the second steel sheets 22 with a carbon content of 0.20 mass % or less are formed with the spot weld locations 28, enabling the occurrence of fracturing of the flanges 27 originating at the spot weld locations 28 in the second steel sheet regions 22A to be suppressed, even when these spot weld locations 28 in the second steel sheet regions 22A are input with load. Moreover, in the stamped part 10, sections of the top plate 25 other than the one length direction end section are formed from the first steel sheet 21 with a carbon content of 0.27 mass % or more, and one length direction section of the first steel sheet region 21A formed from the first steel sheet 21 is positioned within the length direction range Lr of the second steel sheet regions 22A that form the flanges 27. Accordingly, the strength of the top plate 25 within the length direction range Lr of the second steel sheet regions 22A can be better improved than in cases in which, for example, the first steel sheet region 21A corresponding to the top plate 25 is not positioned within the length direction range Lr of the second steel sheet regions 22A.

Figure 18:
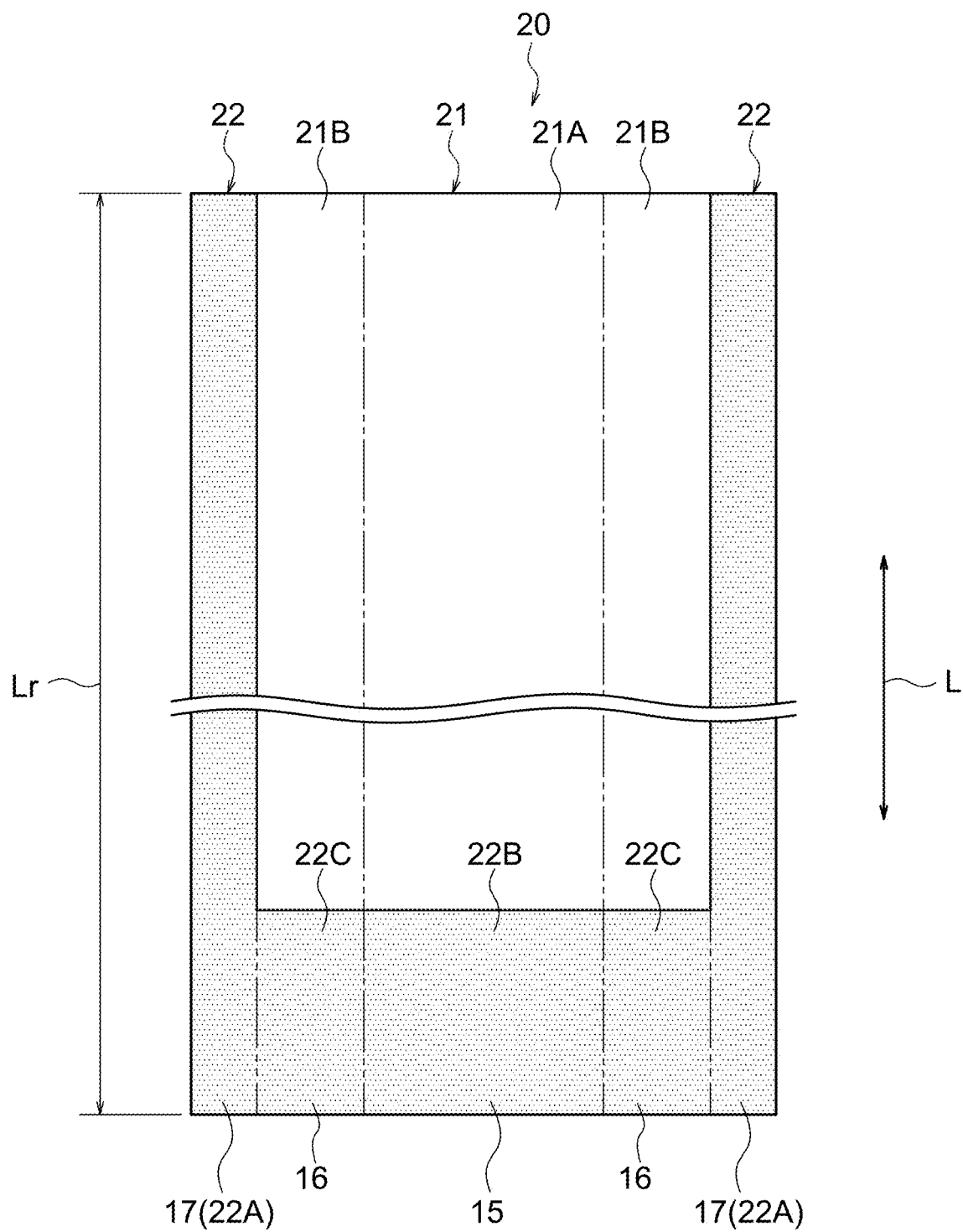
FIG. 18 is a plan view illustrating a fourth modified example of the tailored blank in FIG. 10.

FIG. 18 is a plan view illustrating a fourth modified example of the tailored blank 20 illustrated in FIG. 10. The tailored blank 20 illustrated in FIG. 18 is modified from the tailored blank 20 in FIG. 10 in that the second steel sheet 22 configures one length direction end section of the future top plate portion 15, one length direction end sections of the future sidewall portions 16, and the entire length direction of the future flange portions 17.

The entire length direction of the future flange portions 17 corresponds to the second steel sheet regions 22A formed from the second steel sheet 22. One length direction end section of the future top plate portion 15 corresponds to the second steel sheet region 22B formed from the second steel sheet 22, and sections of the future top plate portion 15 other than the one length direction end section correspond to the first steel sheet region 21A formed from the first steel sheet 21. One length direction end sections of the future sidewall portions 16 correspond to second steel sheet regions 22C formed from the second steel sheet 22, and sections of the future sidewall portions 16 other than the one length direction end sections correspond to the first steel sheet regions 21B formed from the first steel sheet 21. The entire length direction range of the first steel sheet region 21A that forms the top plate 25 is positioned within the length direction range Lr of the second steel sheet regions 22A that form the flanges 27.

Figure 19:
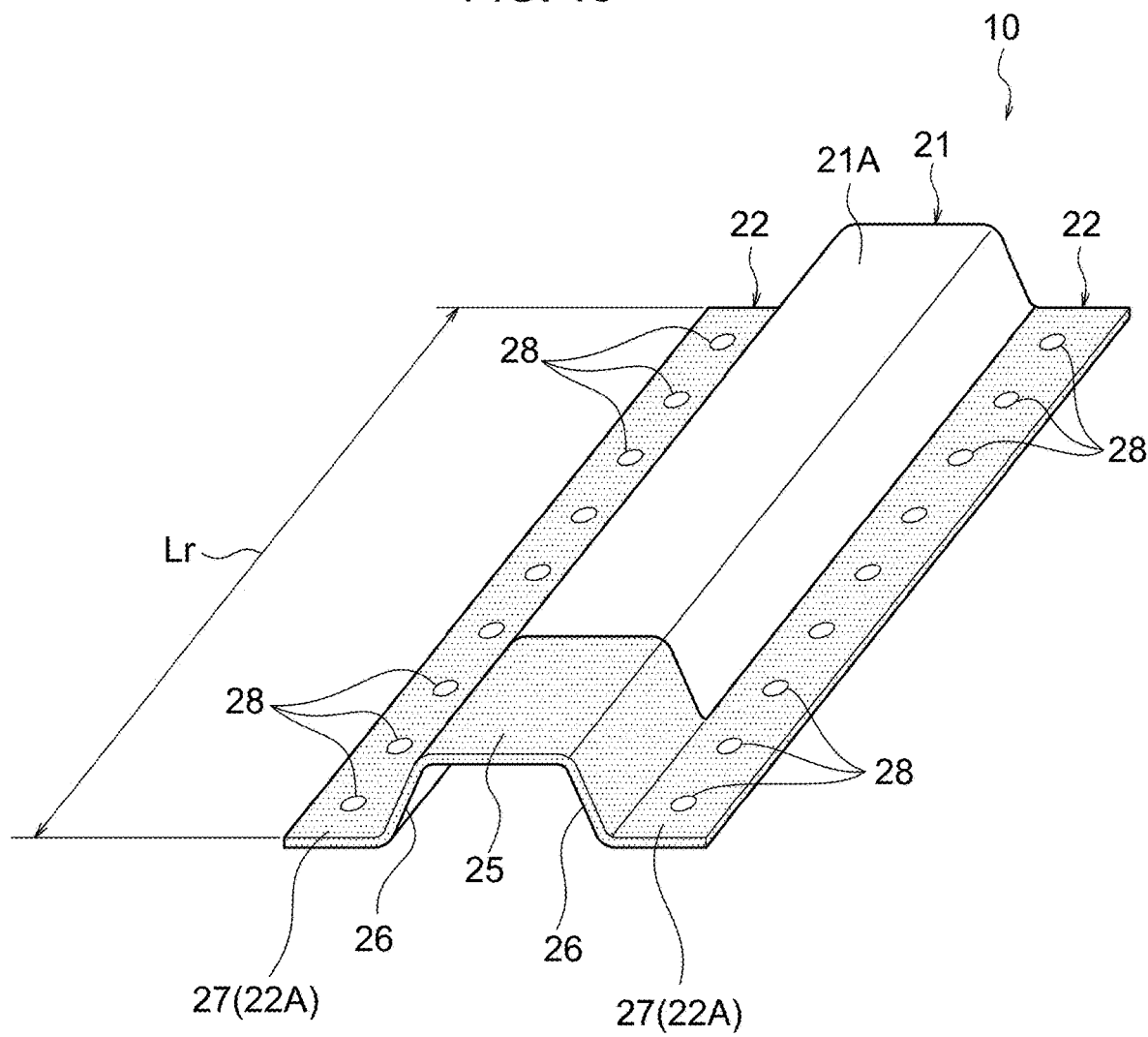
FIG. 19 is a perspective view illustrating a stamped part with a hat-shaped cross-section profile formed from the tailored blank in FIG. 18.

This tailored blank 20 obtains the following operation and advantageous effects. FIG. 19 is a perspective view illustrating the stamped part 10 with a hat-shaped cross-section profile when formed from the tailored blank 20 in FIG. 18. In the stamped part 10, the flanges 27 (second steel sheet regions 22A) formed from the second steel sheet 22 with a carbon content of 0.20 mass % or less are formed with the spot weld locations 28, enabling the occurrence of fracturing of the flanges 27 originating at the spot weld locations 28 when input with load to be suppressed. Moreover, in the stamped part 10, sections of the top plate 25 other than the one length direction end section are formed from the first steel sheet 21 with a carbon content of 0.27 mass % or more, and the entire length direction range of the first steel sheet region 21A formed from the first steel sheet 21 is positioned within the length direction range Lr of the second steel sheet regions 22A that form the flanges 27. Accordingly, the strength of the top plate 25 within the length direction range Lr of the second steel sheet regions 22A can be better improved than in cases in which, for example, the first steel sheet region 21A corresponding to the top plate 25 is not positioned within the length direction range Lr of the second steel sheet regions 22A.

Note that although FIG. 10 to FIG. 19 illustrate examples of the tailored blank 20 and the stamped part 10, configurations of the tailored blank 20 and the stamped part 10 other than those illustrated in FIG. 10 to FIG. 19 may be implemented as long as they are consistent with the insight relating to placement of the first steel sheet 21 and the second steel sheets 22.

Next, explanation follows regarding variations on the stamped part 10 described above, with reference to FIG. 20 to FIG. 30.

In each of FIG. 20 to FIG. 30, the stamped part 10 is formed in an elongated shape with its length direction in the arrow L direction and a short direction in the arrow W direction. The stamped part 10 is formed with a hat-shaped cross-section profile including the top plate 25, the sidewalls 26, and the flanges 27. The top plate 25 and the sidewalls 26 form a main body 24 of the stamped part 10. Only one arrow W direction side of the stamped part 10 is illustrated in each of FIG. 20 to FIG. 30.

Figure 20:
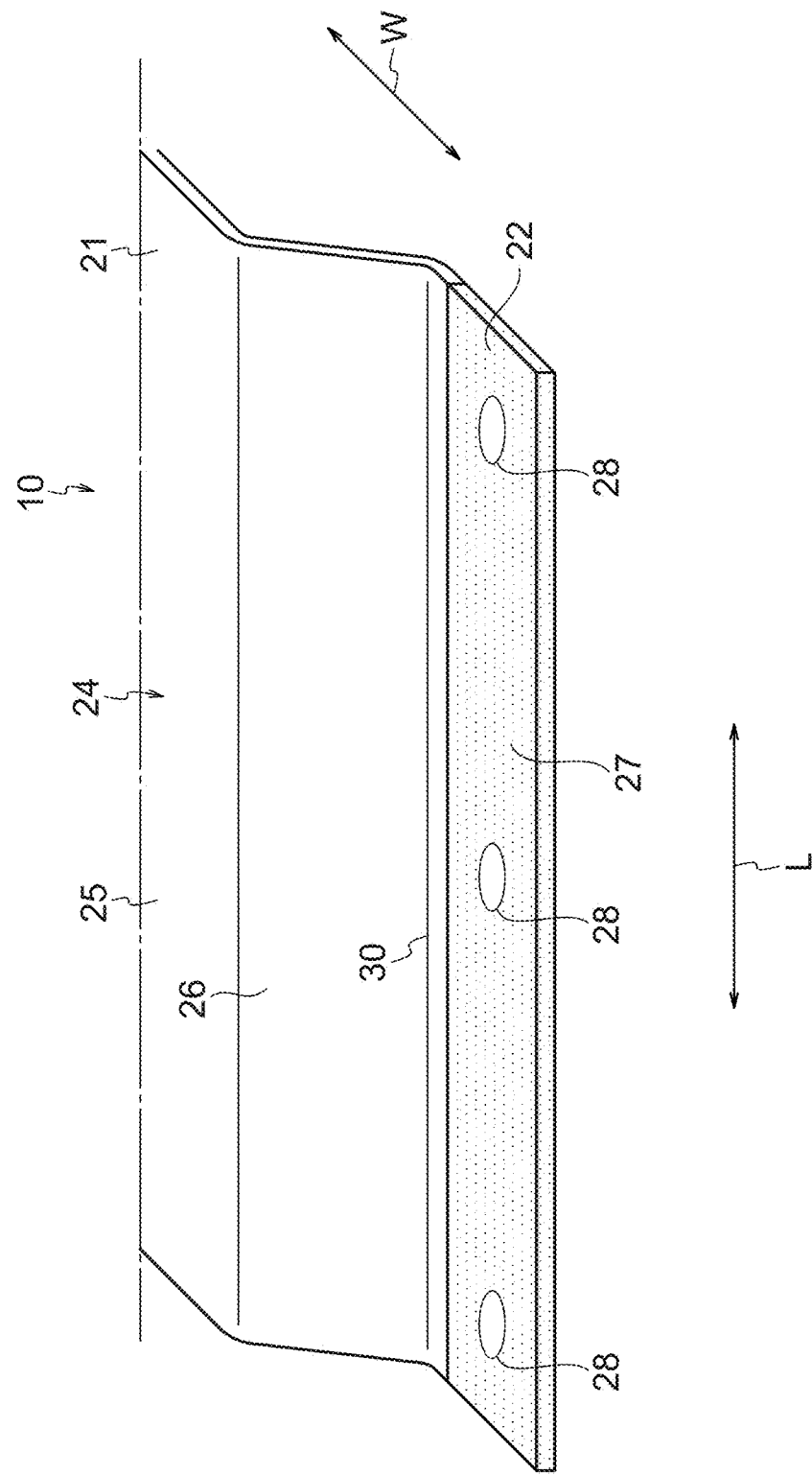
FIG. 20 is a perspective view illustrating a first example of a stamped part according to an exemplary embodiment of the present invention.

FIG. 20 illustrates a first example in which the second steel sheet 22 configures a section further toward a leading end side of the corresponding flange 27 than a bend portion 30 between the sidewall 26 and the flange 27 (specifically, than a boundary between the bend portion 30 and the flange 27). The first steel sheet 21 configures the remaining sections of the stamped part 10, including the top plate 25 and the sidewalls 26. The second steel sheet 22 configures a leading end side section of the flange 27 spanning the entire length direction of the flange 27. The second steel sheet 22 is formed with the same sheet thickness as the first steel sheet 21. The second steel sheet 22 is formed with plural spot weld locations 28 arranged in a row along the length direction of the corresponding flange 27. In the first example, the second steel sheet 22 configures the leading end side section of the flanges 27 spanning the entire length direction of the flange 27, thus enabling the occurrence of fracturing originating at the spot weld locations 28 to be suppressed along the entire length of the flange 27.

Figure 21:
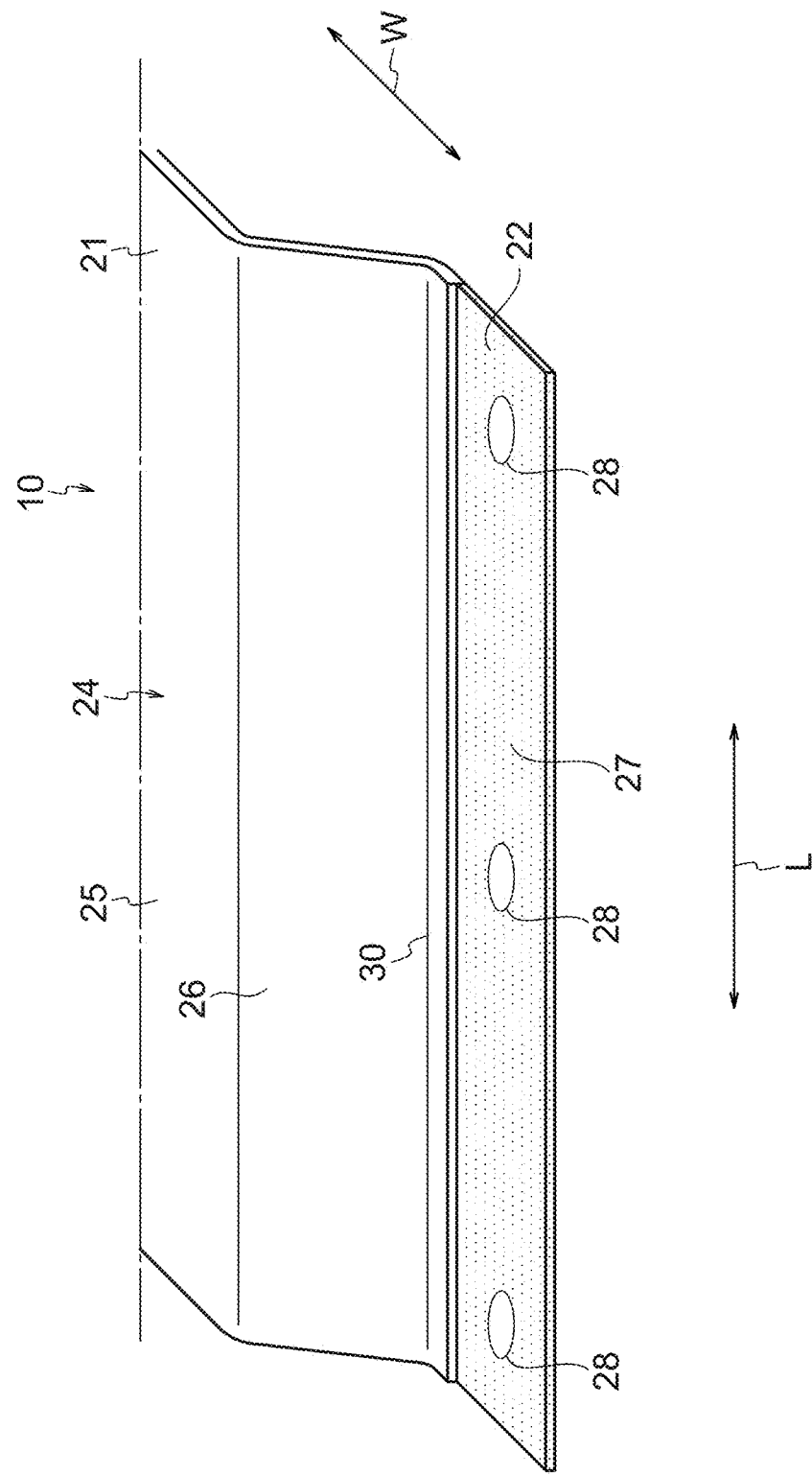
FIG. 21 is a perspective view illustrating a second example of a stamped part.
Figure 22:
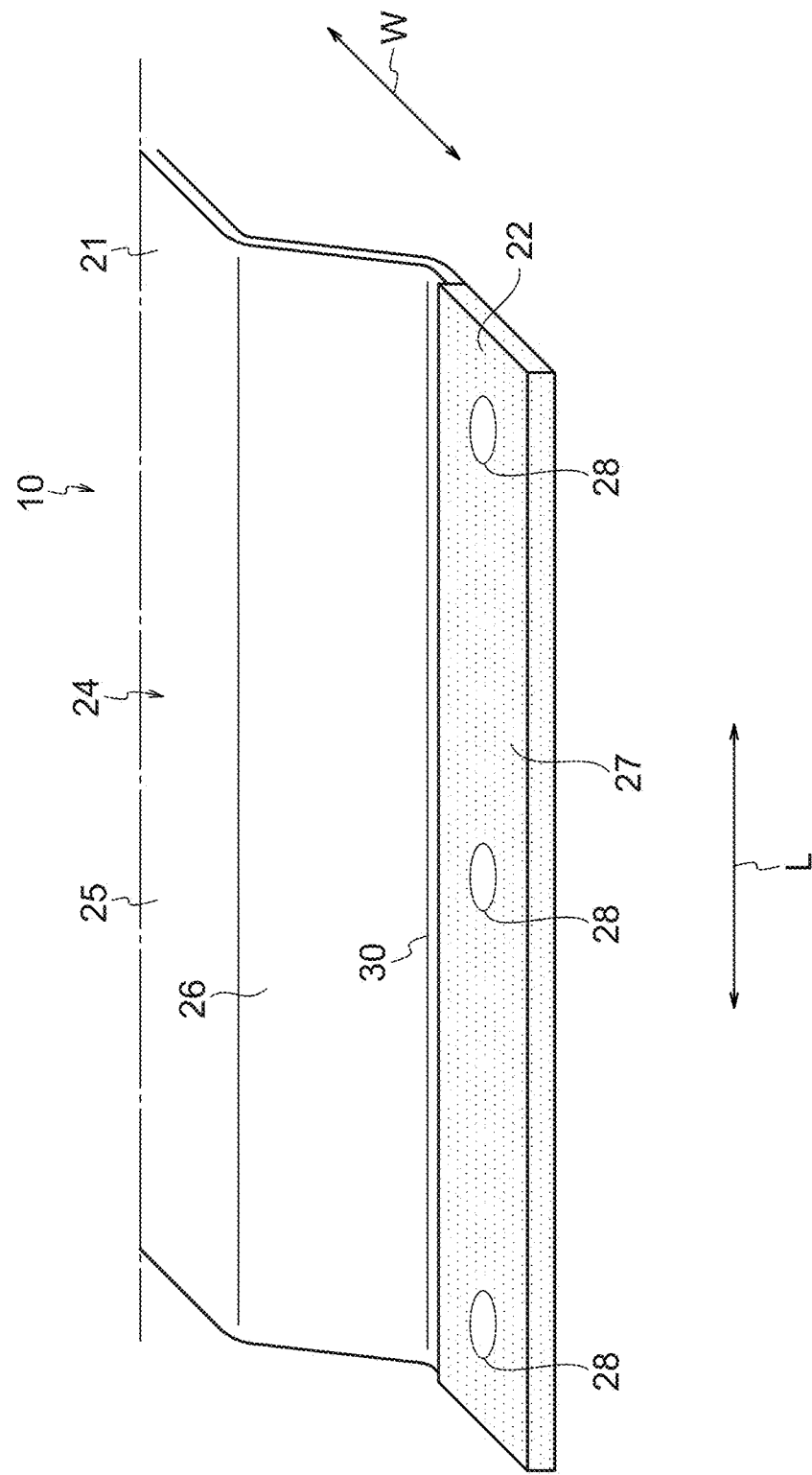
FIG. 22 is a perspective view illustrating a third example of a stamped part.

In the respective examples illustrated in FIG. 21 to FIG. 30, the first example illustrated in FIG. 20 is modified as follows. Namely, FIG. 21 illustrates a second example in which the second steel sheet 22 is formed with a smaller sheet thickness than the first steel sheet 21. In the second example, a reduction in weight can be achieved due to forming the second steel sheet 22 with a smaller sheet thickness than the first steel sheet 21. Since a small sheet thickness ratio (total sheet thickness/smallest sheet thickness) can be set, even in cases in which an outer panel with a small sheet thickness, reinforcement with a large sheet thickness, and an inner panel with a large sheet thickness are to be welded together in a triple-layered superimposed state, the sheet thickness of the reinforcement or the inner panel can be reduced, thus lowering the sheet thickness ratio, and facilitating nugget formation between the outer panel and the reinforcement. On the other hand, in a third example illustrated in FIG. 22, the second steel sheet 22 is formed with a greater sheet thickness than the first steel sheet 21. In the third example, due to forming the second steel sheet 22 with a greater sheet thickness than the first steel sheet 21, fracturing originating at the spot weld locations 28 can be even more effectively suppressed.

FIG. 23 to FIG. 26 illustrate examples in which the second steel sheet 22 is formed in shapes and sizes corresponding to ranges where fracturing originating at the spot weld locations 28 may potentially occur (for example a range in which load is input in cases of application to a vehicle). Namely, in a fourth example illustrated in FIG. 23, and in a fifth example illustrated in FIG. 24, the second steel sheets 22 configure one length direction section of the respective flanges 27.

Figure 23:
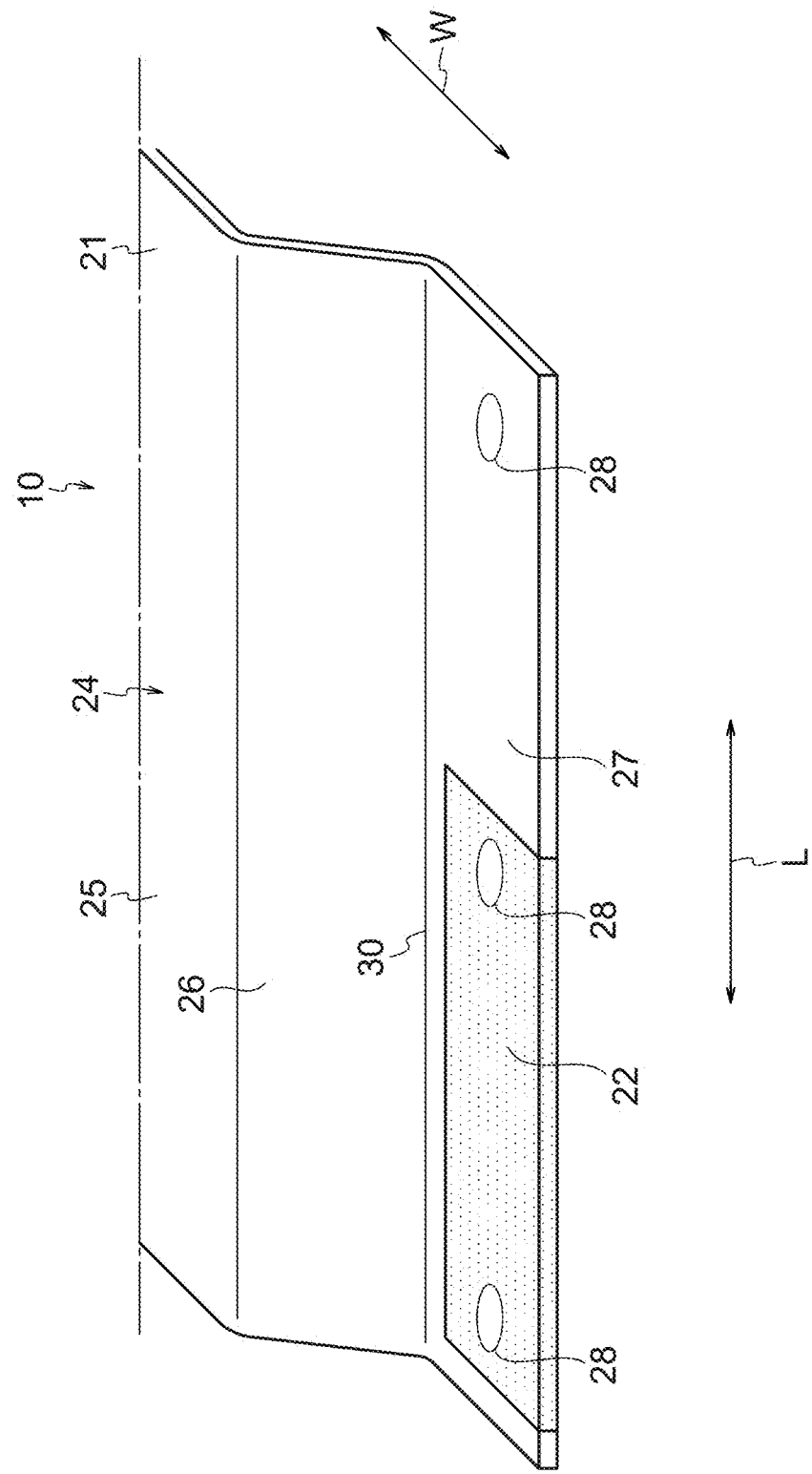
FIG. 23 is a perspective view illustrating a fourth example of a stamped part.
Figure 24:
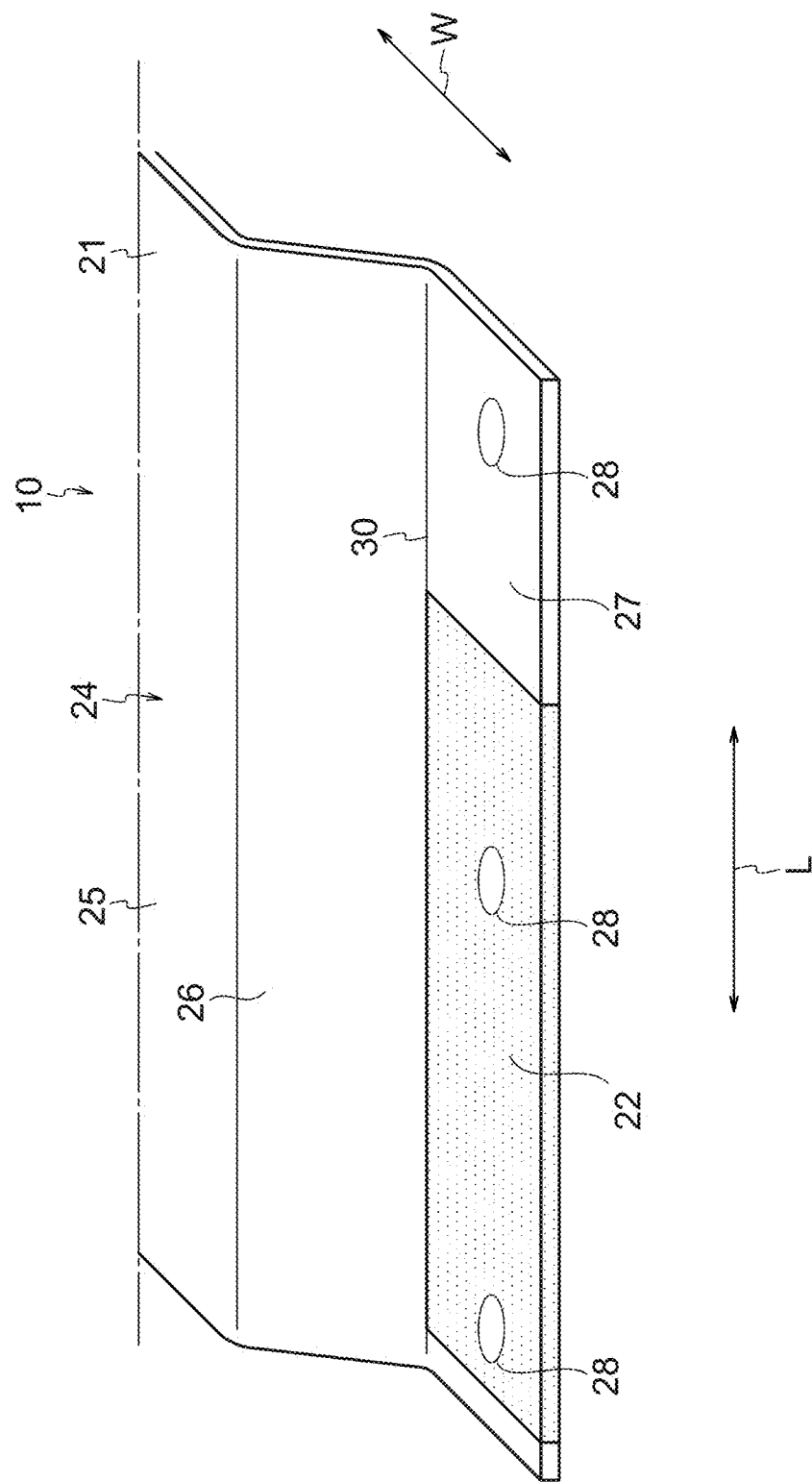
FIG. 24 is a perspective view illustrating a fifth example of a stamped part.
Figure 25:
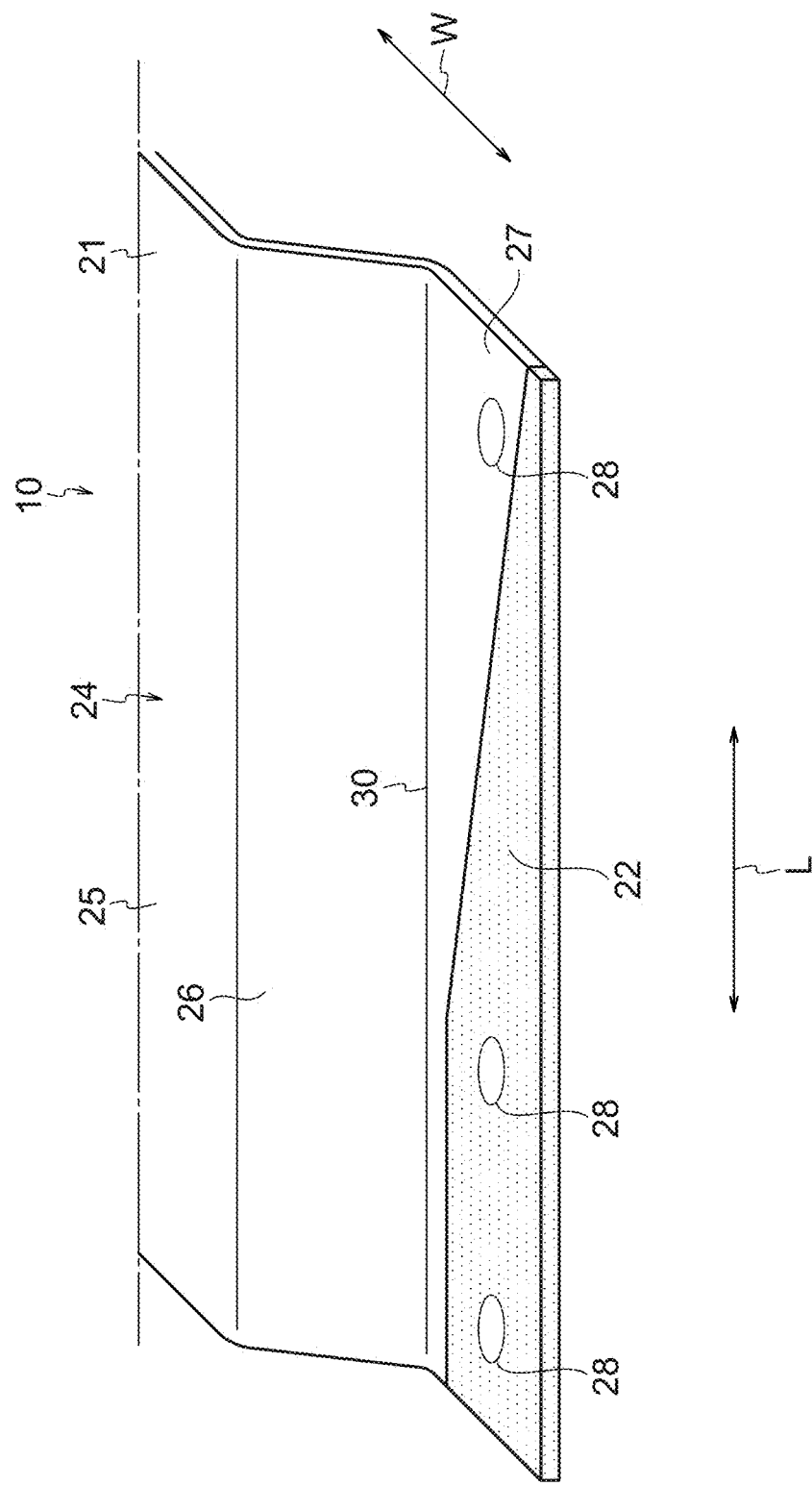
FIG. 25 is a perspective view illustrating a sixth example of a stamped part.
Figure 26:
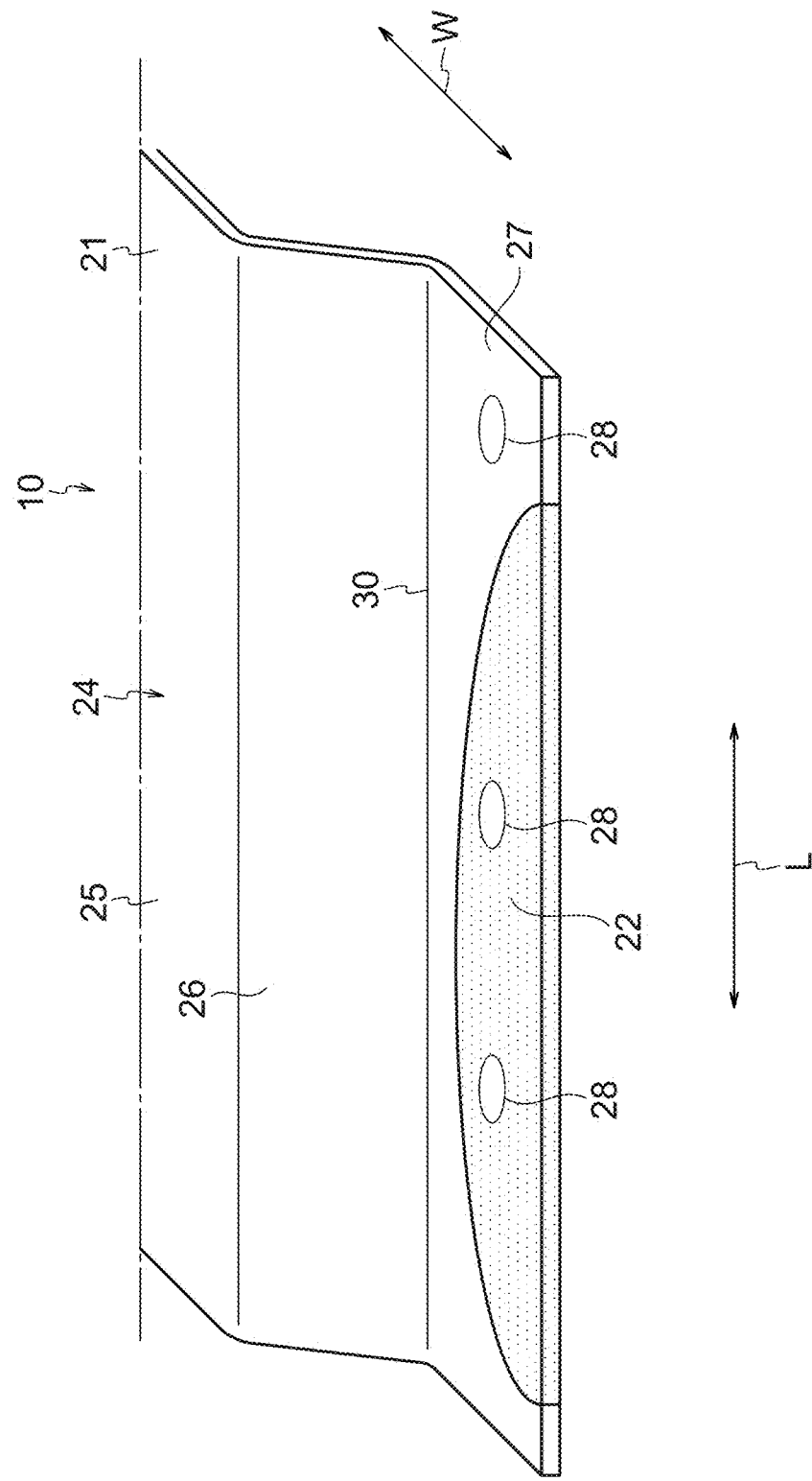
FIG. 26 is a perspective view illustrating a seventh example of a stamped part.

More specifically, in the fourth example illustrated in FIG. 23, the second steel sheet 22 configures a section further toward the leading end side of the corresponding flange 27 than the bend portion 30 between the sidewall 26 and the flange 27 (specifically than the boundary between the bend portion 30 and the flange 27). In the fifth example illustrated in FIG. 24, the second steel sheet 22 configures a section spanning from a base end of the corresponding flange 27 (specifically the center of the bend portion 30) to the leading end side of the flange 27. Moreover, in a sixth example illustrated in FIG. 25, the second steel sheet 22 is formed in a trapezoidal shape as viewed along the sheet thickness direction of the flange 27. In a seventh example illustrated in FIG. 26, the second steel sheet 22 is formed in a half-ellipse shape as viewed along the sheet thickness direction of the flange 27.

In the fourth example to the seventh example, the second steel sheets 22 are formed in shapes and sizes corresponding to the range where fracturing originating at the spot weld locations 28 may potentially occur. The occurrence of fracturing originating at the spot weld locations 28 is therefore suppressed, while increasing the proportion of the first steel sheet 21, configured with a higher carbon content than the second steel sheet 22, relative to the second steel sheet 22. This thereby enables the collision performance of the framework component 12 to be even more effectively secured.

Figure 27:
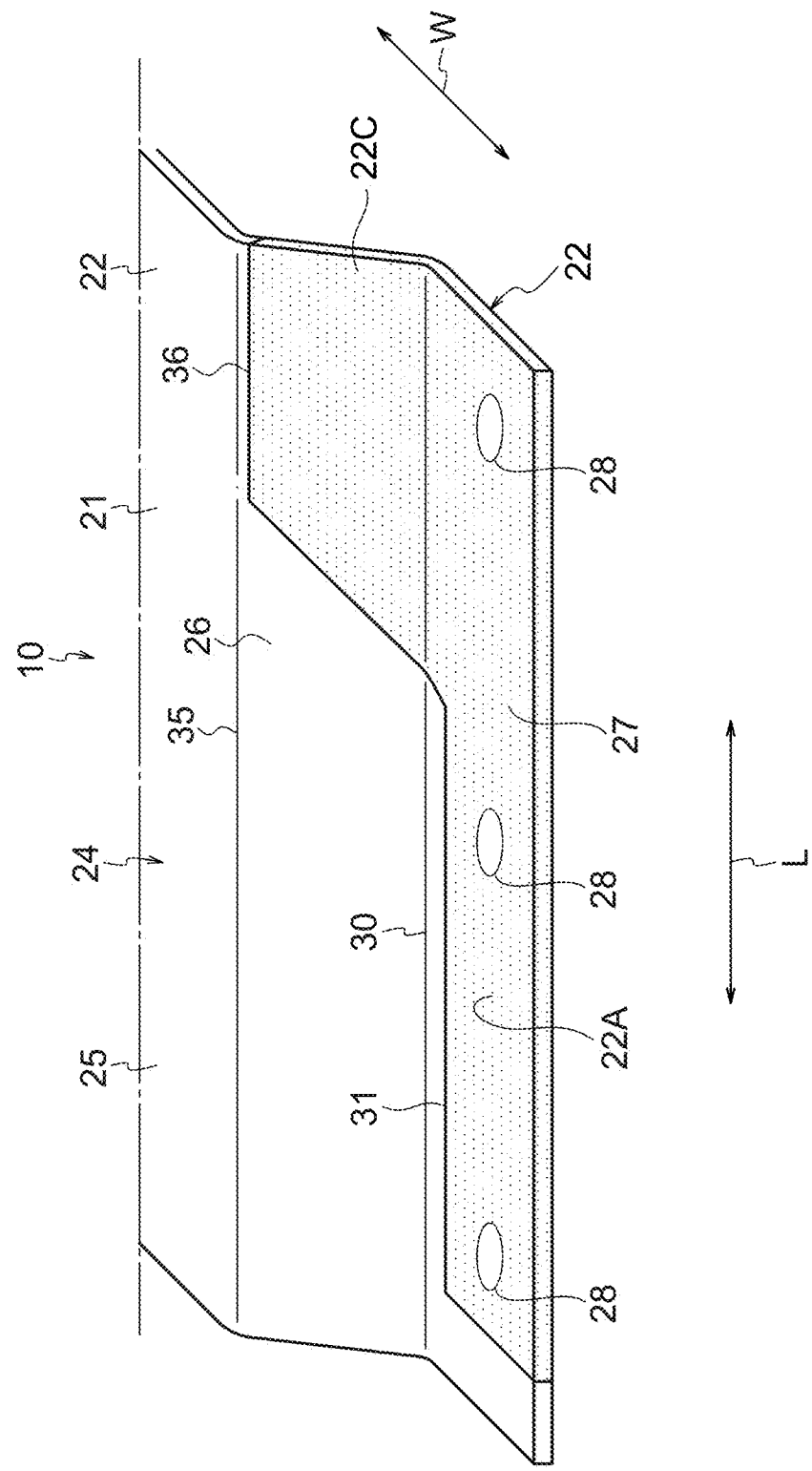
FIG. 27 is a perspective view illustrating an eighth example of a stamped part.
Figure 28:
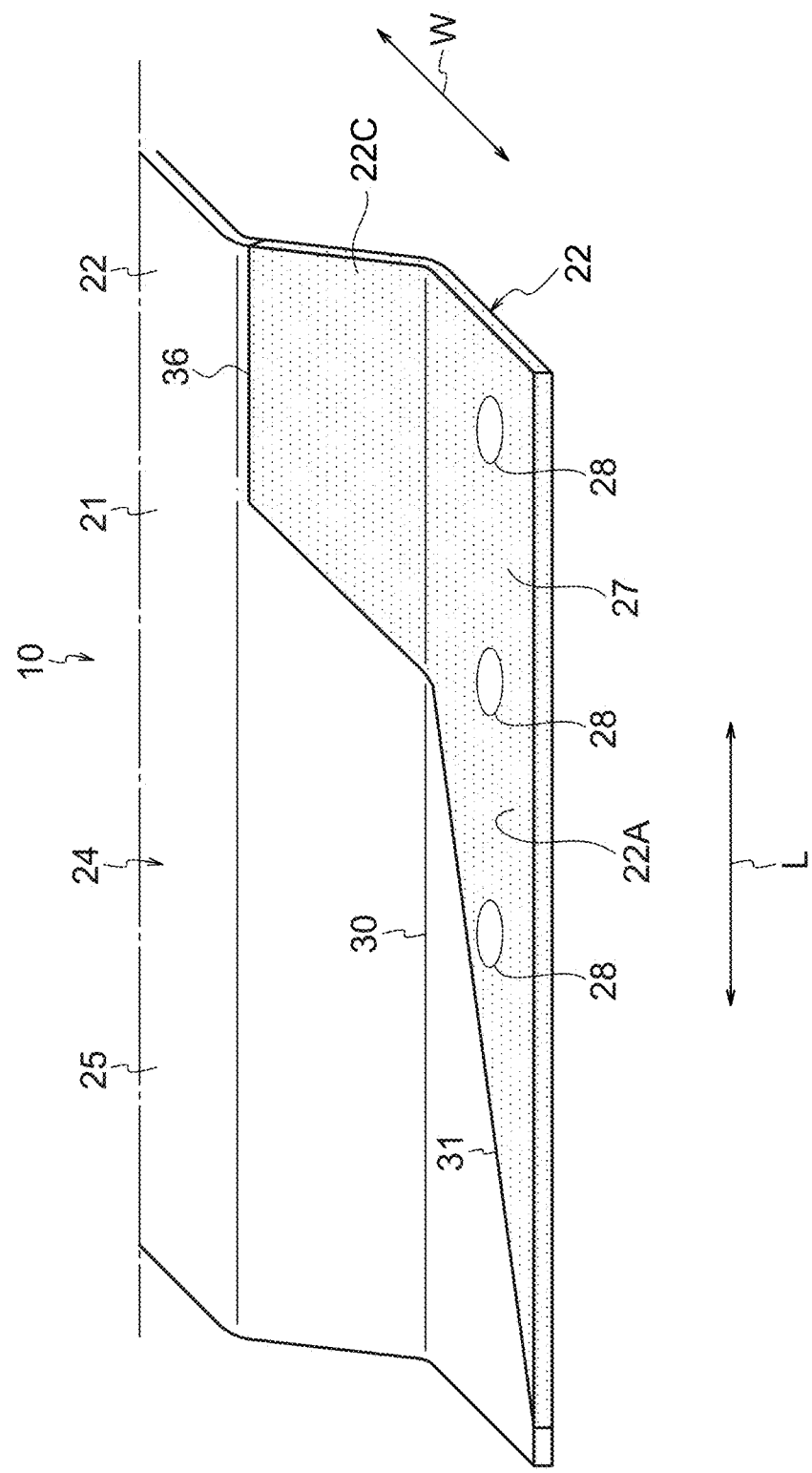
FIG. 28 is a perspective view illustrating a ninth example of a stamped part.

In an eighth example illustrated in FIG. 27 and a ninth example illustrated in FIG. 28, the second steel sheet 22 includes a second steel sheet region 22A forming the flange 27 and a second steel sheet region 22C forming the sidewall 26. In the eighth example illustrated in FIG. 27, an edge 31 on the bend portion 30-side of the second steel sheet region 22A is positioned at the boundary between the bend portion 30 and the flange 27, and extends parallel to the bend portion 30. A bend portion 35 is formed between the top plate 25 and the sidewall 26, and an edge 36 on the bend portion 35-side of the second steel sheet region 22C is positioned at a boundary between the bend portion 35 and the sidewall 26, and extends parallel to the bend portion 35. In the ninth example illustrated in FIG. 28, the eighth example illustrated in FIG. 27 is modified such that the bend portion 30-side edge 31 of the second steel sheet region 22A is angled with respect to the bend portion 30 as viewed along the sheet thickness direction of the flange 27.

In the eighth example and the ninth example, since the second steel sheet 22 configures at least one section of the flange 27, the occurrence of fracturing of the flange 27 originating at the spot weld locations 28 can be suppressed at this section. Moreover, since the first steel sheet 21 configures a section of the sidewall 26, the strength of this section can be secured.

Figure 29:
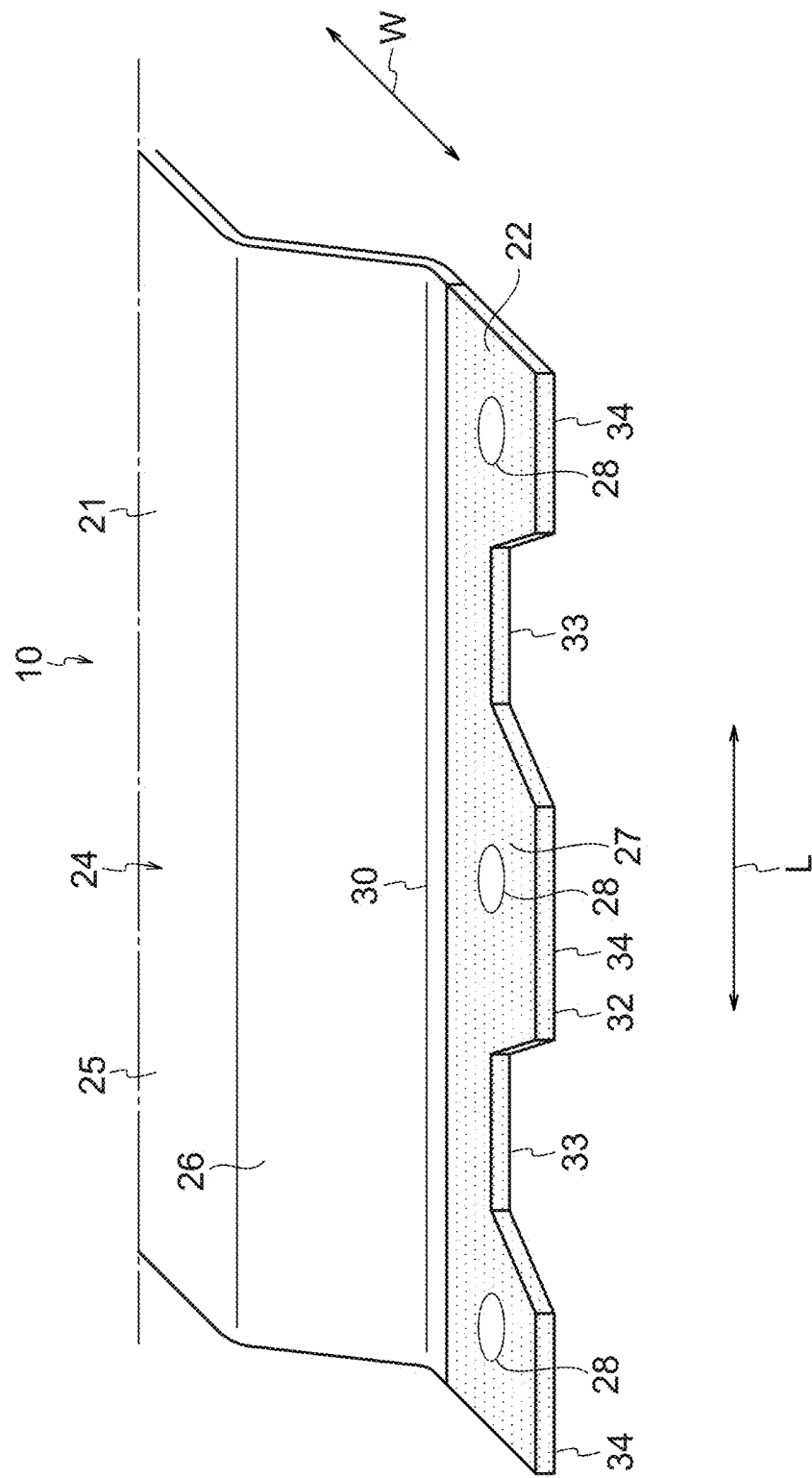
FIG. 29 is a perspective view illustrating a tenth example of a stamped part.
Figure 30:
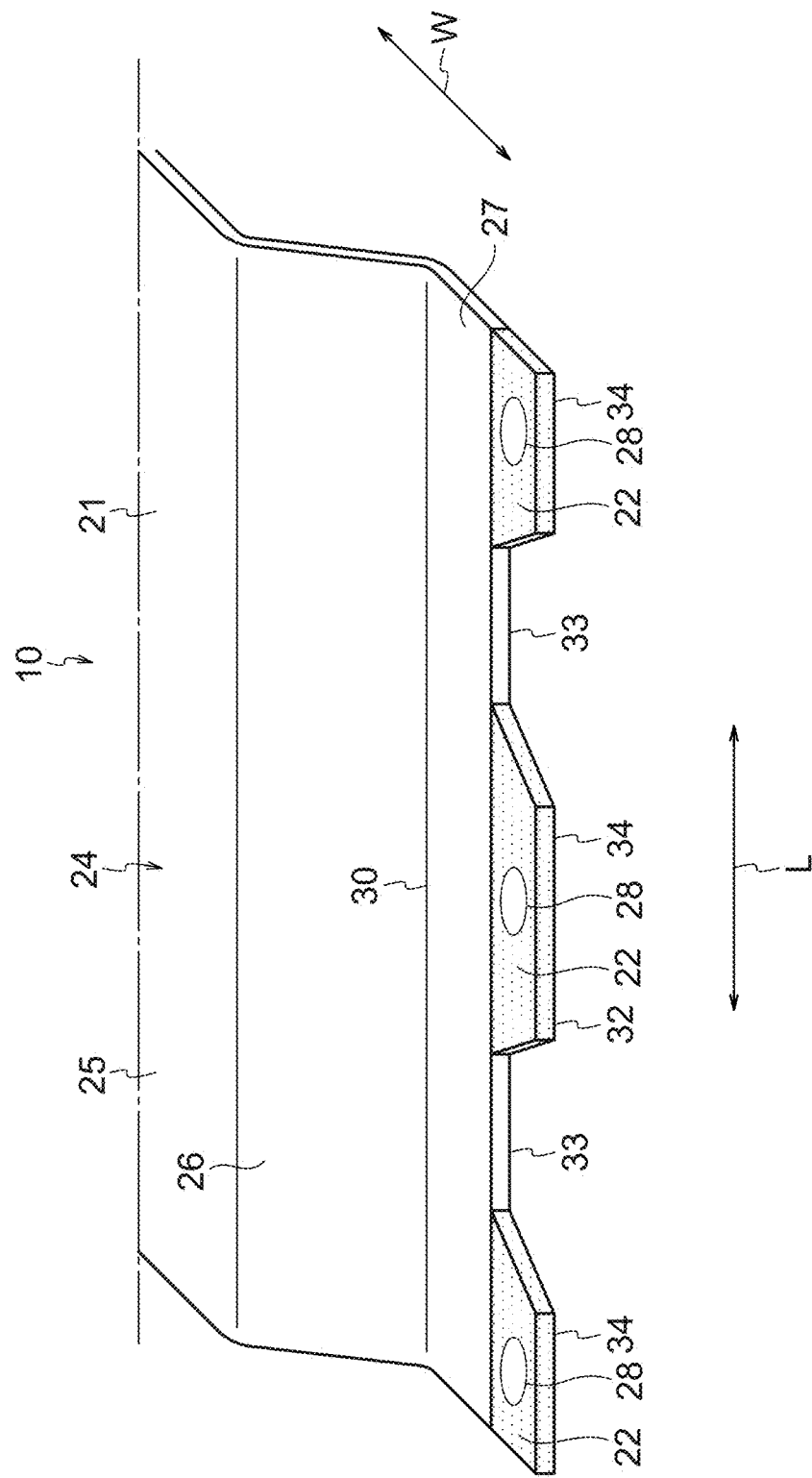
FIG. 30 is a perspective view illustrating an eleventh example of a stamped part.

In a tenth example illustrated in FIG. 29 and an eleventh example illustrated in FIG. 30, a leading end side section 32 of the flange 27 has a profile configured by alternate indentations 33 and protrusions 34 arrayed along the length direction of the flange 27. In the tenth example illustrated in FIG. 29, the second steel sheet 22 is formed continuously in the length direction of the flange 27, such that the indentations 33 and protrusions 34 are both formed from the second steel sheet 22. On the other hand, in the eleventh example illustrated in FIG. 30, plural of the second steel sheets 22 are disposed intermittently along the length direction of the flange 27, such that the protrusions 34 are formed from the second steel sheets 22 while the indentations 33 are formed between the neighboring second steel sheets 22. The protrusions 34 are formed with the spot weld locations 28.

In the tenth example and the eleventh example, the leading end side section 32 of the flange 27 is formed with the alternate indentations 33 and protrusions 34 along the length direction of the flange 27. This enables a reduction in weight commensurate with the indentations 33 (missing sections).

Note that the first example to the eleventh example of the stamped part 10 described above are merely examples, and the first steel sheet 21 and the second steel sheet 22 used to configure the stamped part 10 may be formed in other shapes.

Moreover, although in the first example to the eleventh example described above the stamped part 10 is configured by the first steel sheet 21 and the second steel sheet 22, the stamped part 10 may also be configured including steel sheets other than the first steel sheet 21 and the second steel sheet 22. Where practical, the first example to the eleventh example described above may also be implemented in appropriate combinations.

Figure 31:
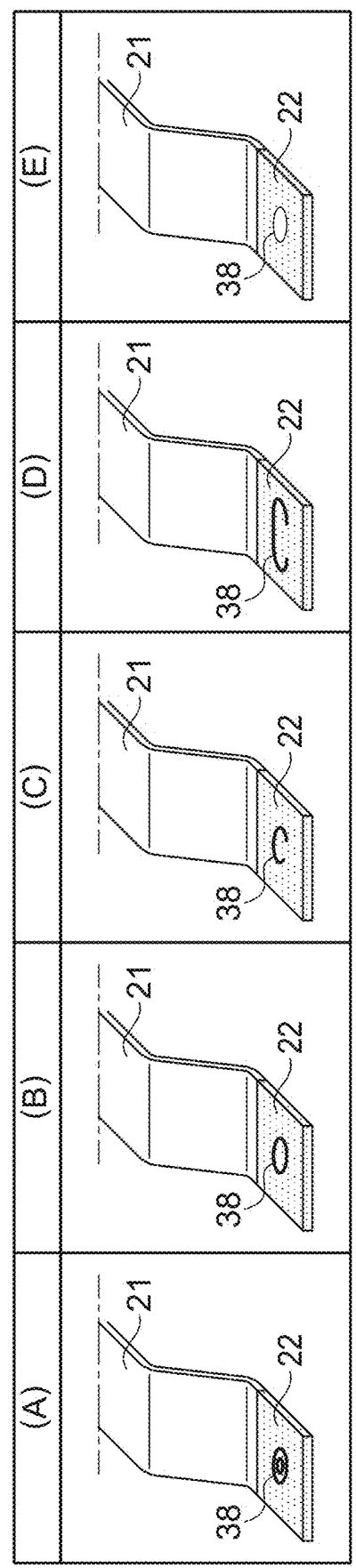
FIG. 31 are diagrams illustrating examples of weld locations that may be applied in an exemplary embodiment of the present invention.

Next, explanation follows regarding variations of weld locations that may be applied in the place of the spot weld locations 28 described above, with reference to FIG. 31.

FIG. 31A to FIG. 31E illustrate examples of laser weld locations 38 as examples of weld locations that may be applied in the place of the spot weld locations 28 described above. In a first example illustrated in FIG. 31A, the laser weld location 38 is formed in the shape of two concentric rings. In a second example illustrated in FIG. 31B, the laser weld location 38 is formed in a ring shape.

In the third example illustrated in FIG. 31C, the laser weld location 38 is formed in a C-shape, and in a fourth example illustrated in FIG. 31D, the laser weld location 38 is formed in a C-shape that is elongated in the arrow L direction, this being the length direction of the flange 27. In a fifth example illustrated in FIG. 31E, the laser weld location 38 is formed in a circular shape (spot shape).

Note that the laser weld location 38 may also be formed in other shapes, such as spirals, lines, or zigzags. Weld locations other than the spot weld locations 28 and the laser weld locations 38 may also be applied. Alternatively, for example, weld-bonds in which an adhesive is employed in conjunction with the spot weld locations 28 may be applied, the laser weld locations 38 and the spot weld locations 28 may be employed in conjunction with each other, or arc welding may be employed.

Next, explanation follows regarding examples of application of the stamped part according to the first exemplary embodiment of the present invention to outer reinforcement configuring a center pillar of a vehicle, with reference to FIG. 32 to FIG. 40.

Figure 32:
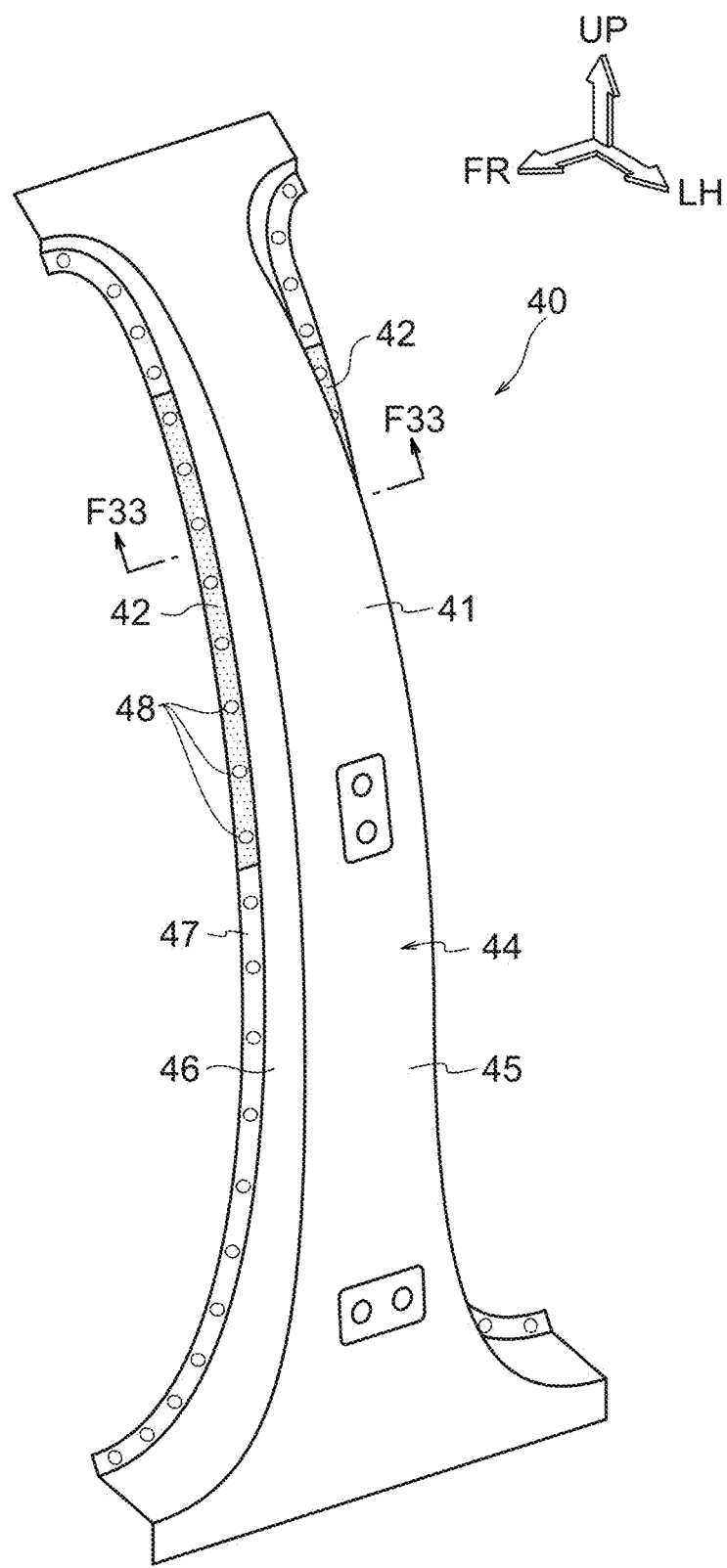
FIG. 32 is a perspective view illustrating a first example of a stamped part according to an exemplary embodiment of the present invention when applied in outer reinforcement configuring a center pillar of a vehicle.
Figure 33:
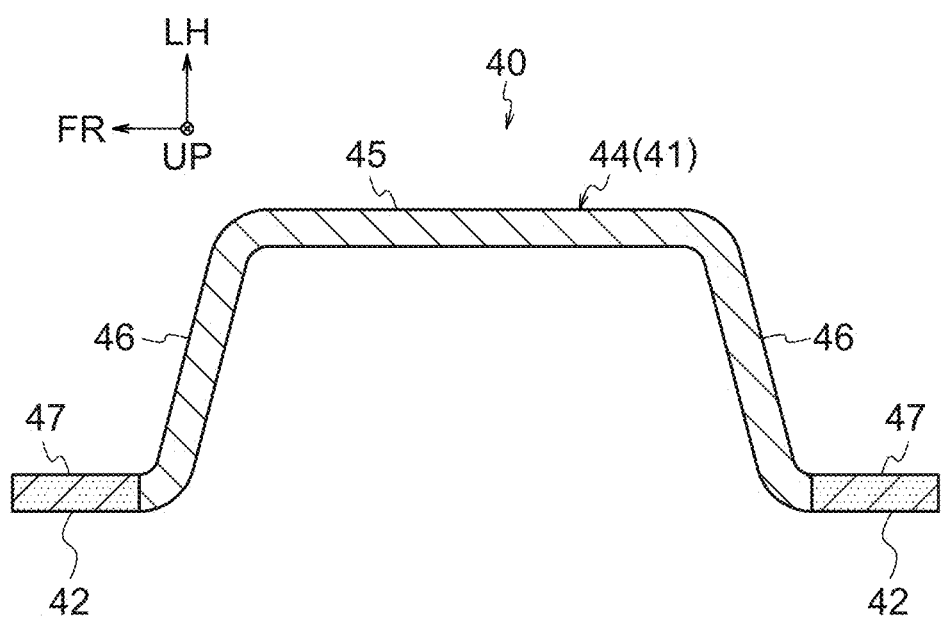
FIG. 33 is a cross-section as sectioned along line F33-F33 in FIG. 32.

FIG. 32 is a perspective view illustrating a first example of outer reinforcement 40 configuring a center pillar. FIG. 33 is a cross-section as sectioned along line F33-F33 in FIG. 32. Note that in the drawings referred to in the following explanation, the arrow UP indicates an upper side in a vehicle up-down direction, the arrow LH indicates a left side in a vehicle width direction, and the arrow FR indicates a front side in a vehicle front-rear direction.

The outer reinforcement 40 is formed with an elongated profile, having a length direction running in the vehicle up-down direction and a short direction running in the vehicle front-rear direction. The outer reinforcement 40 is formed with a hat-shaped cross-section profile and includes a main body 44 configured from a top plate 45 and a pair of sidewalls 46, and a pair of flanges 47 jutting out from the main body 44.

The outer reinforcement 40 is a stamped part manufactured from a tailored blank, and is configured by a first steel sheet 41 and a pair of second steel sheets 42. The flanges 47 extend in the vehicle up-down direction, and the second steel sheets 42 configure central sections of the vehicle up-down direction (for example, a section spanning from the centers to slightly above the centers) of the respective flanges 47.

Figure 34:
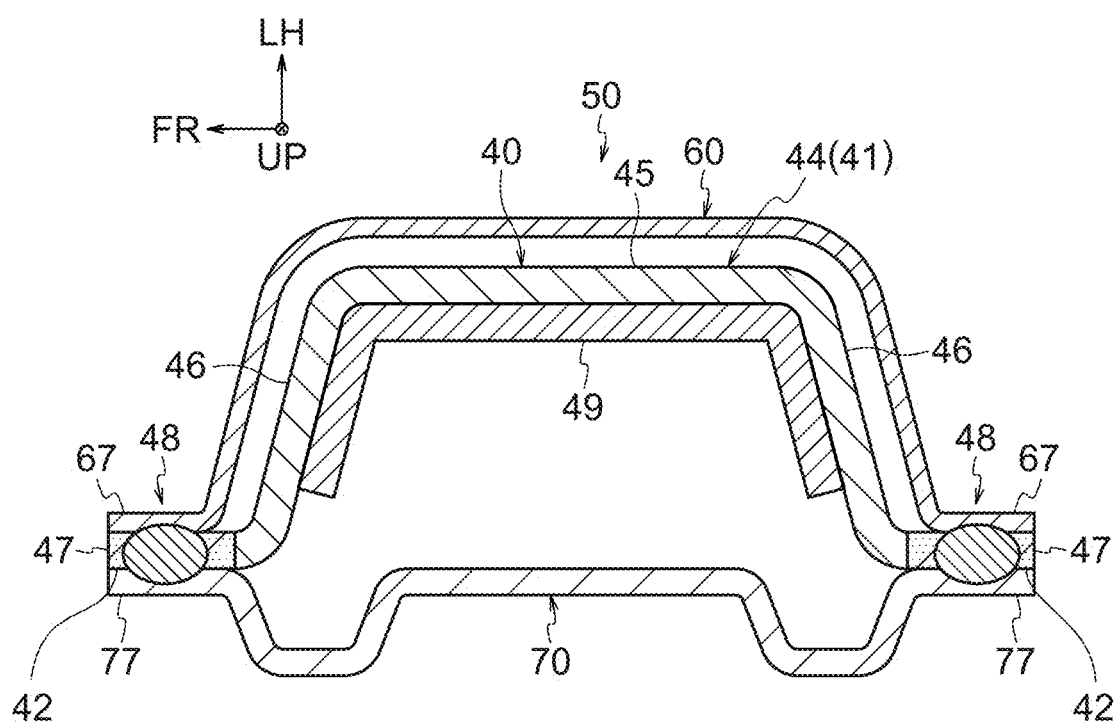
FIG. 34 is a cross-section illustrating a center pillar applied with the outer reinforcement in FIG. 32.

FIG. 34 illustrates a cross-section of a center pillar 50 applied with the outer reinforcement 40. A side panel outer 60 is disposed at the vehicle width direction outside of the outer reinforcement 40, and inner reinforcement 70 is disposed at the vehicle width direction inside of the outer reinforcement 40.

Hinge reinforcement 49 is joined to a vehicle width direction inside face of the outer reinforcement 40 at a location corresponding to a hinge. The side panel outer 60 is formed with a pair of flanges 67, and the inner reinforcement 70 is formed with a pair of flanges 77. The flanges 47, the flanges 67, and the flanges 77 are spot welded together in a superimposed state, thus forming spot weld locations 48.

The side panel outer 60 is, for example, configured from a galvannealed steel sheet with a sheet thickness of 0.75 mm and tensile strength grade of 270 MPa. The first steel sheet 41 of the outer reinforcement 40 is, for example, configured from an aluminized hot stamped steel sheet with a sheet thickness of 1.60 mm and a tensile strength grade of 2000 MPa (and a carbon content of 0.33 mass % and carbon equivalent of 0.38 mass %).

The second steel sheets 42 of the outer reinforcement 40 are, for example, configured from an aluminized hot stamped steel sheet with a sheet thickness of 1.4 mm and a tensile strength grade of 1200 MPa (and a carbon content of 0.13 mass % and carbon equivalent of 0.19 mass %). The hinge reinforcement 49 is, for example, configured from an aluminized hot stamped steel sheet with a sheet thickness of 1.6 mm and a tensile strength grade of 2000 MPa. The inner reinforcement 70 for example includes an upper section and a lower section, the upper section being configured from a steel sheet with a sheet thickness of 1.2 mm and a tensile strength grade of 1180 MPa, and the lower section being configured from a tailored blank of a steel sheet having a sheet thickness of 1.4 mm and a tensile strength grade of 590 MPa in the vicinity of a seatbelt retractor.

In the first example, since the central sections of the vehicle up-down direction of the respective flanges 47 are configured from the second steel sheets 42, the occurrence of fracturing of these locations originating at the spot weld locations 48 can be suppressed even if, for example, load is directly input to the central sections of the vehicle up-down direction of the flanges 47 in a side-on vehicle collision. Moreover, since the remaining sections of the outer reinforcement 40 are configured from the first steel sheet 41, the strength of these remaining sections can be secured, thus enabling collision performance of the center pillar 50 (outer reinforcement 40) to be secured.

FIG. 35 to FIG. 40 illustrate examples of the outer reinforcement 40 that have the same external profile as that of the first example, but in which the configuration of the outer reinforcement 40 has been modified in the following manners with respect to the first example.

Figure 35:
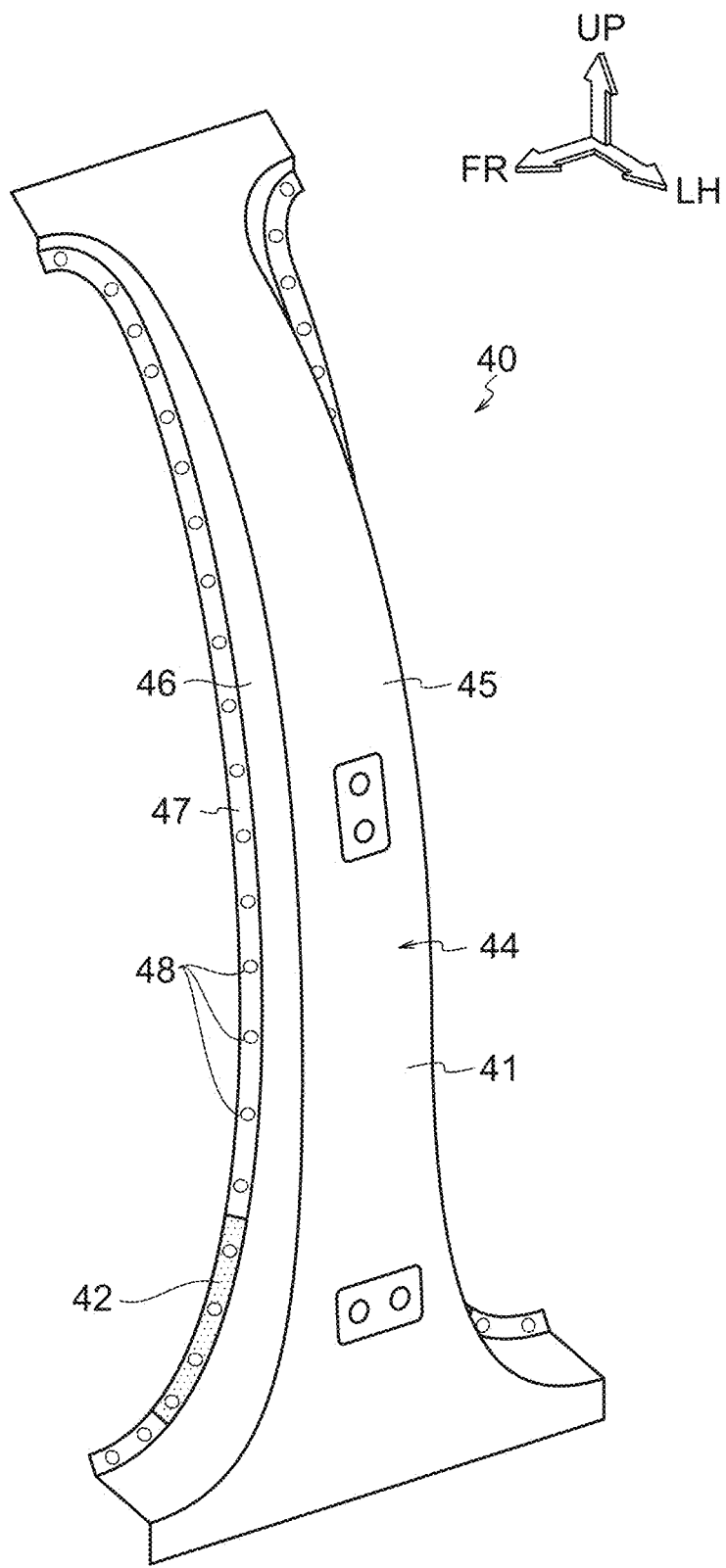
FIG. 35 is a perspective view illustrating a second example of outer reinforcement.

In a second example illustrated in FIG. 35, the second steel sheets 42 configure lower sections of the flanges 47. The flanges 47 are formed with overall curving profiles as viewed along the sheet thickness direction of the flanges 47 (the vehicle width direction), and the lower sections of the flanges 47 configured by the second steel sheets 42 have a greater curvature than the central sections of the vehicle up-down direction of the flanges 47. The lower sections of the flanges 47 correspond to locations having a profile where stress concentrates, since stress concentrates on these locations in a side-on vehicle collision. In the second example, since the lower sections of the flanges 47 are configured by the second steel sheets 42, the occurrence of fracturing originating at the spot weld locations 48 can be suppressed at these sections, even when stress concentrates on the lower sections of the flanges 47, for example in a side-on vehicle collision.

Figure 36:
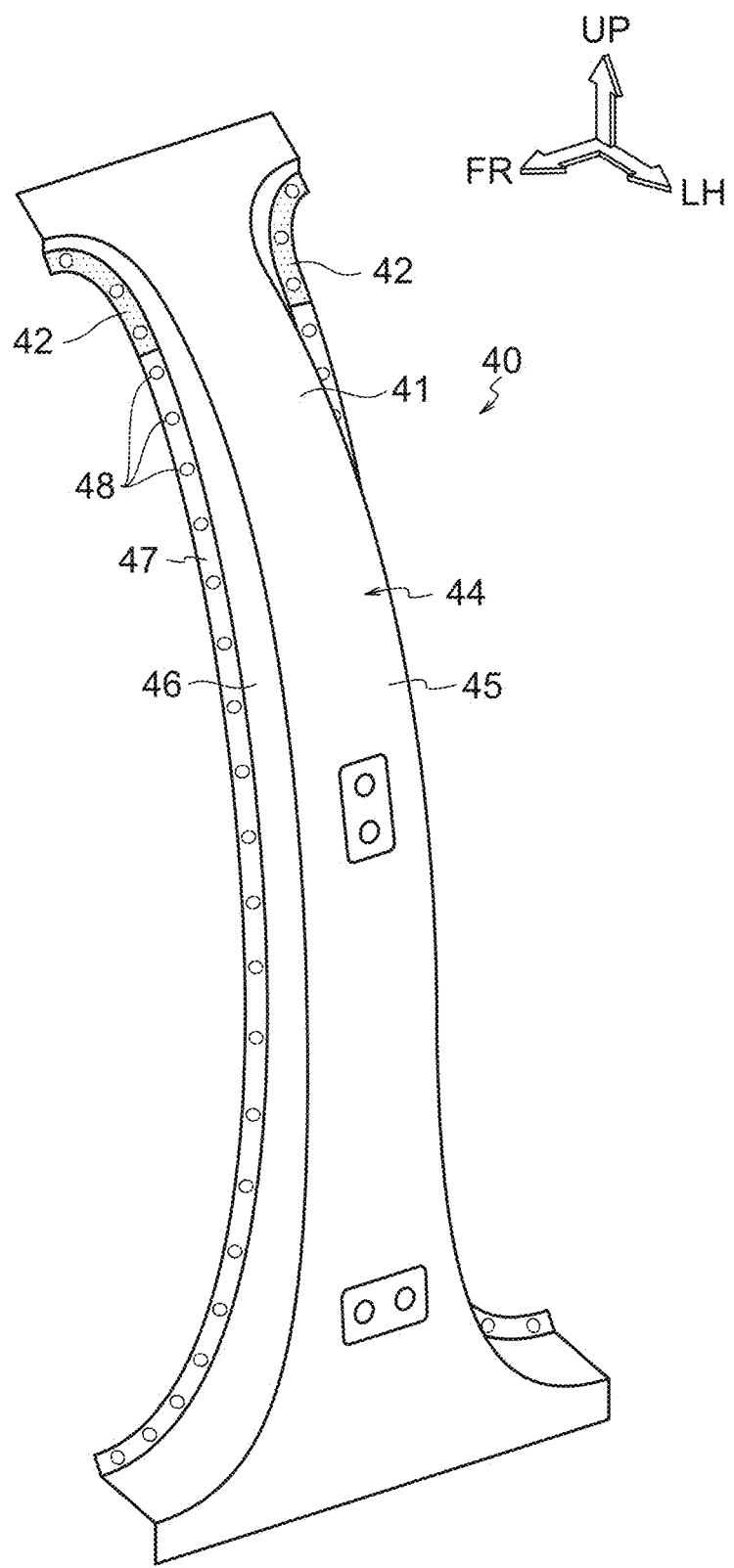
FIG. 36 is a perspective view illustrating a third example of outer reinforcement.

In a third example illustrated in FIG. 36, the second steel sheets 42 configure upper sections of the flanges 47. The upper sections of the flanges 47 configured by the second steel sheets 42 have a greater curvature than the central sections of the vehicle up-down direction of the flanges 47. The upper sections of the flanges 47 correspond to locations having a profile where stress concentrates, since stress concentrates on these locations in a side-on vehicle collision. In the third example, since the upper sections of the flanges 47 are configured by the second steel sheets 42, the occurrence of fracturing originating at the spot weld locations 48 can be suppressed at these sections, even when stress concentrates on the upper sections of the flanges 47, for example in a side-on vehicle collision.

Note that the locations such as those described above that have profiles where stress concentrates include not only locations with greater curvature but also locations that are bent or locations formed with holes. Namely, such locations encompass any locations where stress concentrates as a result of their profile, regardless of the specific profile.

Figure 37:
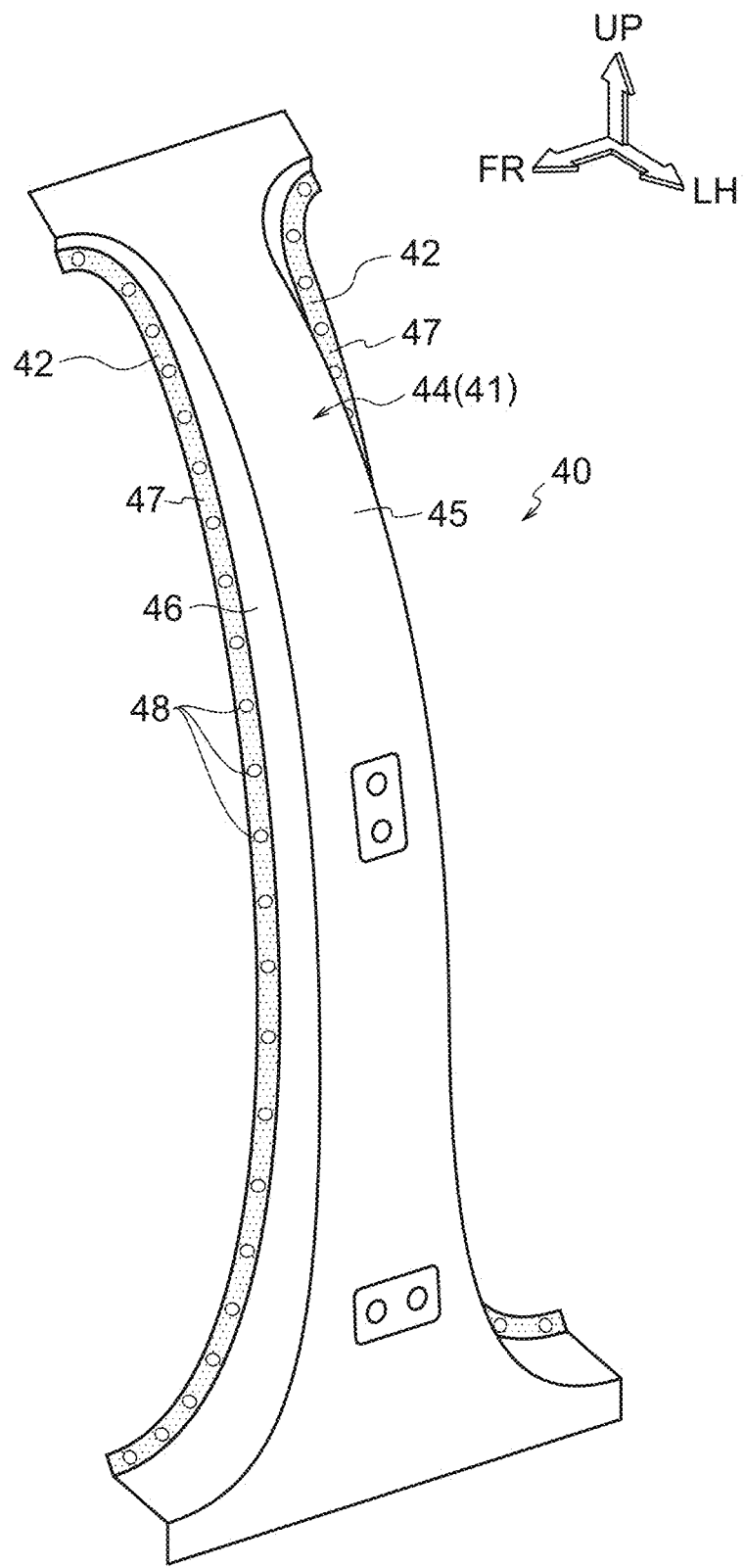
FIG. 37 is a perspective view illustrating a fourth example of outer reinforcement.

In a fourth example illustrated in FIG. 37, the second steel sheets 42 span the entire length of the vehicle up-down direction of the flanges 47. In the fourth example, since the second steel sheets 42 span the entire length of the vehicle up-down direction of the flanges 47, the occurrence of fracturing originating at the spot weld locations 48 can be suppressed over the entire length of the vehicle up-down direction of the flanges 47.

Figure 38:
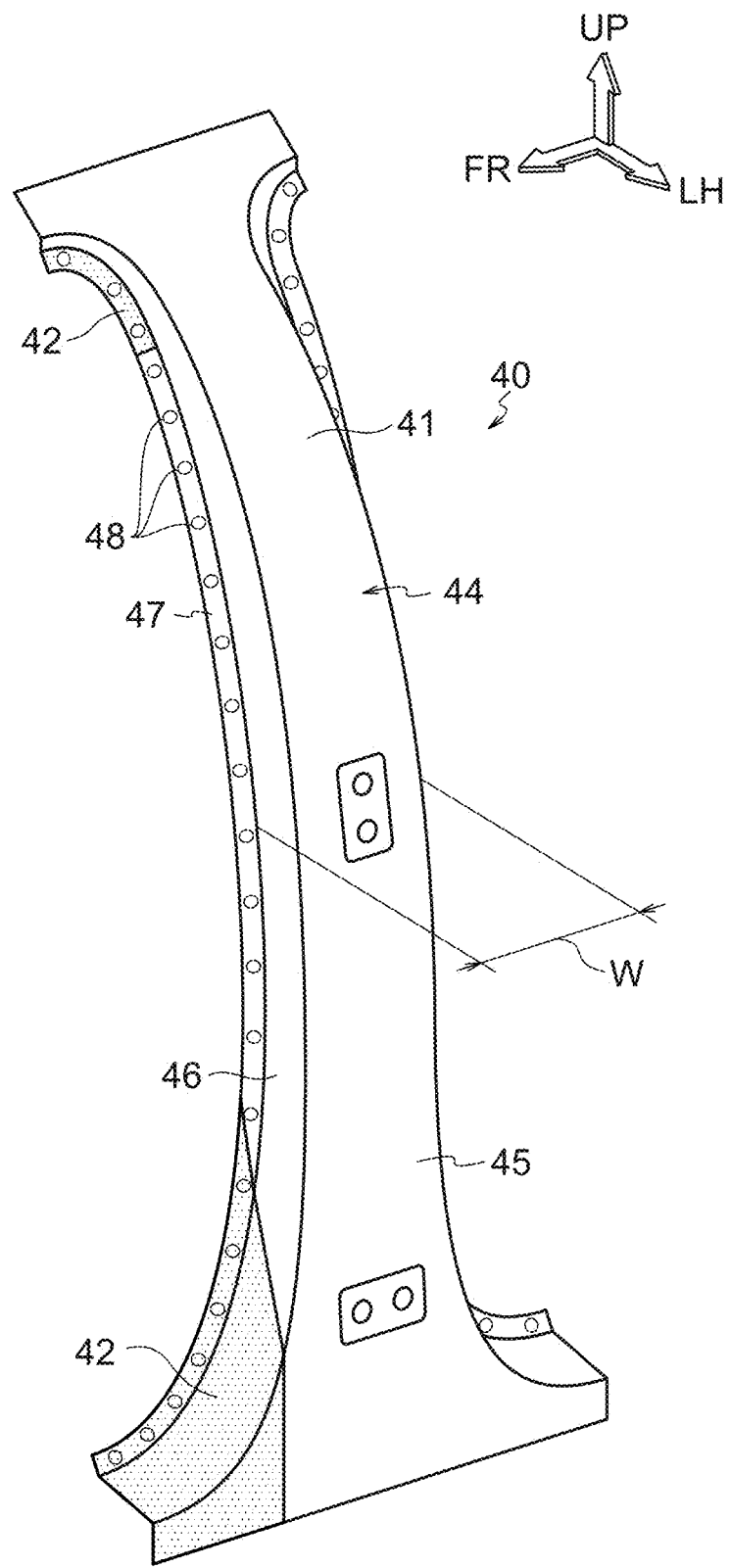
FIG. 38 is a perspective view illustrating a fifth example of outer reinforcement.

In a fifth example illustrated in FIG. 38, plural of the second steel sheets 42 are employed. The second steel sheet 42 employed at an upper section of the outer reinforcement 40 configures an upper section of the flange 47 positioned at the vehicle front-rear direction front side. The second steel sheet 42 employed at a lower section of the outer reinforcement 40 configures a lower section of the flange 47 positioned at the vehicle front-rear direction front side as well as a peripheral section thereto configuring part of the main body 44 (top plate 45 and sidewall 46).

In the fifth example, since the upper section of the flange 47 positioned at the vehicle front-rear direction front side is configured by the second steel sheet 42, the occurrence of fracturing originating at the spot weld locations 48 in this section can be suppressed, even when stress concentrates on the upper section of the flange 47, for example in a side-on vehicle collision. Moreover, since the lower section of the flange 47 positioned on the vehicle front-rear direction front side and the section peripheral thereto are configured by the second steel sheet 42, the occurrence of fracturing originating at the spot weld locations 48 in this section can be even more effectively suppressed, even when stress concentrates on the lower section of the flange 47.

Note that as illustrated in FIG. 38, the second steel sheet 42 configuring the lower section of the flange 47 positioned at the vehicle front-rear direction front side is preferably disposed at the outside of a width W range of the main body 44 at a central section of the vehicle up-down direction of the outer reinforcement 40. Adopting such a configuration enables the strength of the main body 44, configured from the top plate 45 and the pair of sidewalls 46, to be secured.

Figure 39:
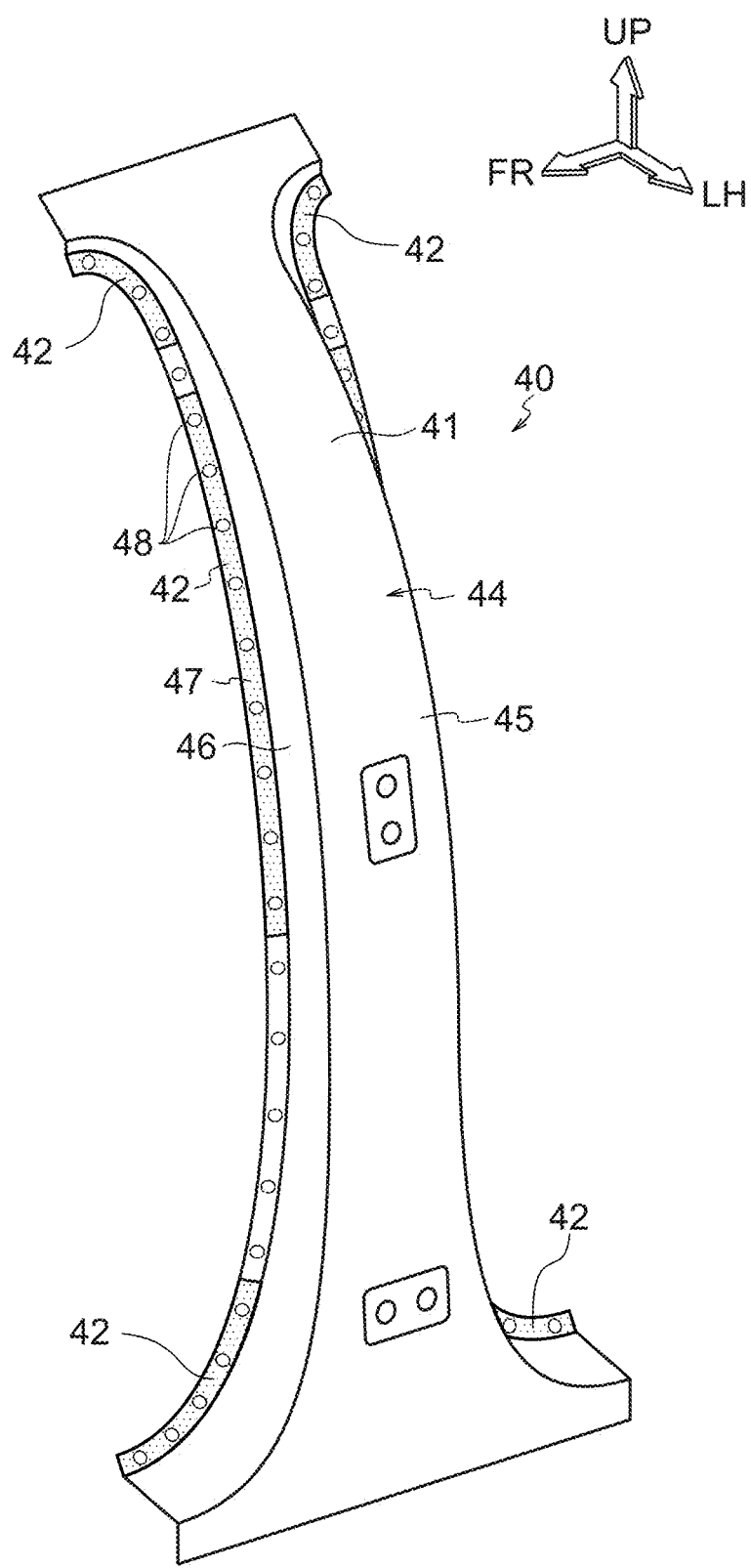
FIG. 39 is a perspective view illustrating a sixth example of outer reinforcement.

In a sixth example illustrated in FIG. 39, plural of the second steel sheets 42 are employed. The second steel sheets 42 employed in an upper section of the outer reinforcement 40 configure upper sections of the flanges 47. The second steel sheets 42 employed in a central section of the vehicle up-down direction of the outer reinforcement 40 configure the central sections of the vehicle up-down direction of the flanges 47. The second steel sheets 42 employed in a lower section of the outer reinforcement 40 configure lower sections of the flanges 47. The second steel sheets 42 employed in the upper section of the outer reinforcement 40 and the second steel sheets 42 employed in the lower section of the outer reinforcement 40 may have the same carbon content as each other, or may have different carbon contents to each other. Note that in the case of a center pillar, since the lower section of the vehicle up-down direction tends to undergo heavier deformation, the second steel sheets 42 employed in the lower section of the outer reinforcement 40 preferably have a lower carbon content than the second steel sheets 42 employed in the upper section of the outer reinforcement 40.

In the sixth example, the upper sections of the flanges 47 are configured by the second steel sheets 42. Accordingly, the occurrence of fracturing originating at the spot weld locations 48 in these sections can be suppressed, even when stress concentrates on the upper sections of the flanges 47, for example in a side-on vehicle collision. Similarly, since the lower sections of the flanges 47 are also configured by the second steel sheets 42, the occurrence of fracturing originating at the spot weld locations 48 in these sections can be suppressed, even when stress concentrates on these lower sections of the flanges 47, for example in a side-on vehicle collision. Moreover, the central sections of the vehicle up-down direction of the flanges 47 are also configured by the second steel sheets 42. Accordingly, the occurrence of fracturing originating at the spot weld locations 48 in these sections can be suppressed, even in cases in which load is input directly to the central sections of the vehicle up-down direction of the flanges 47, for example in a side-on vehicle collision.

Figure 40:
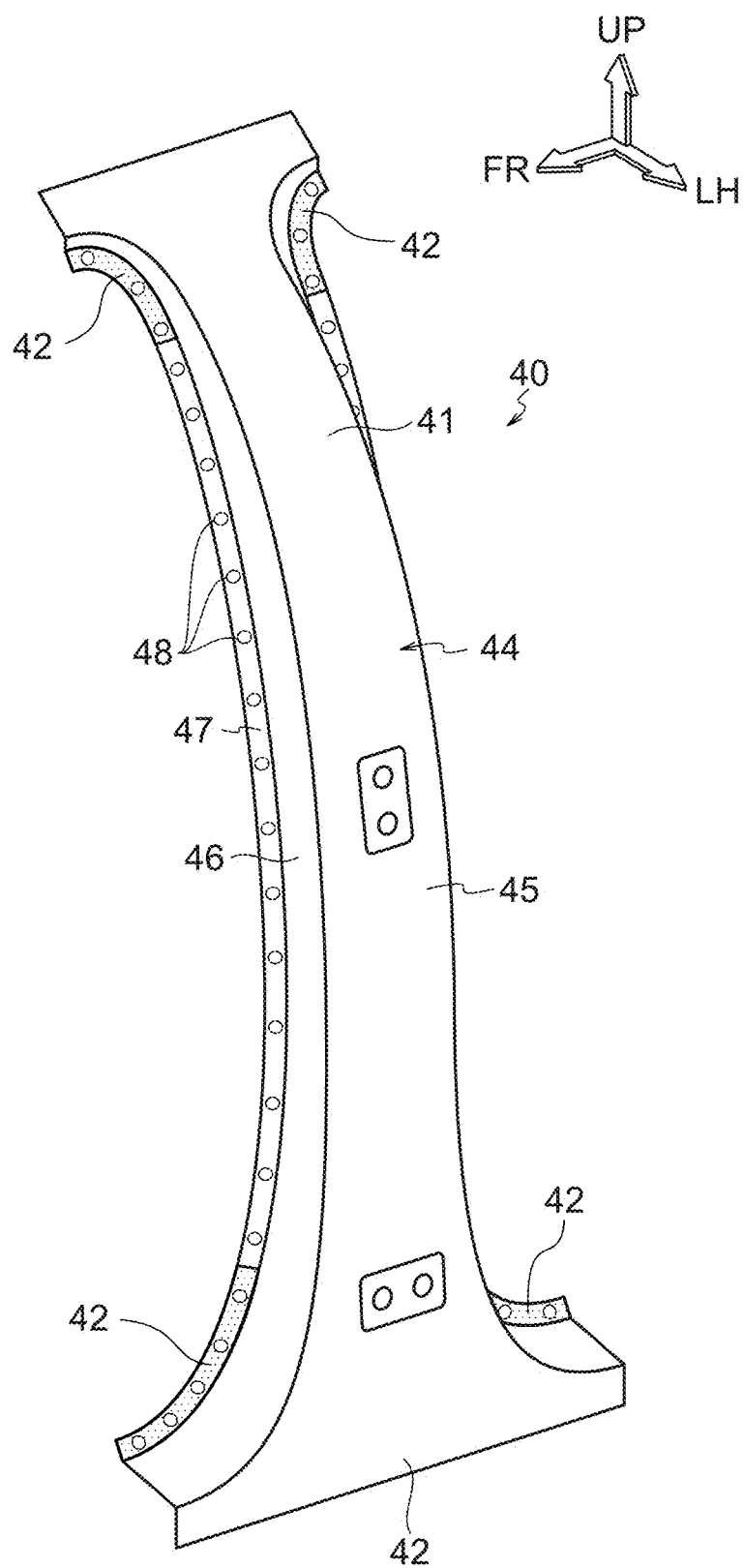
FIG. 40 is a perspective view illustrating a seventh example of outer reinforcement.

In a seventh example illustrated in FIG. 40, plural of the second steel sheets 42 are employed. The second steel sheets 42 employed in an upper section of the outer reinforcement 40 configure upper sections of the flanges 47. The second steel sheets 42 employed in a lower section of the outer reinforcement 40 configure lower sections of the flanges 47.

In the seventh example, since the upper sections of the flanges 47 are configured by the second steel sheets 42, the occurrence of fracturing originating at the spot weld locations 48 in these sections can be suppressed, even when stress concentrates on the upper sections of the flanges 47. Similarly, since the lower sections of the flanges 47 are configured by the second steel sheets 42, the occurrence of fracturing originating at the spot weld locations 48 in these sections can be suppressed, even when stress concentrates on the lower sections of the flanges 47.

Figure 41:
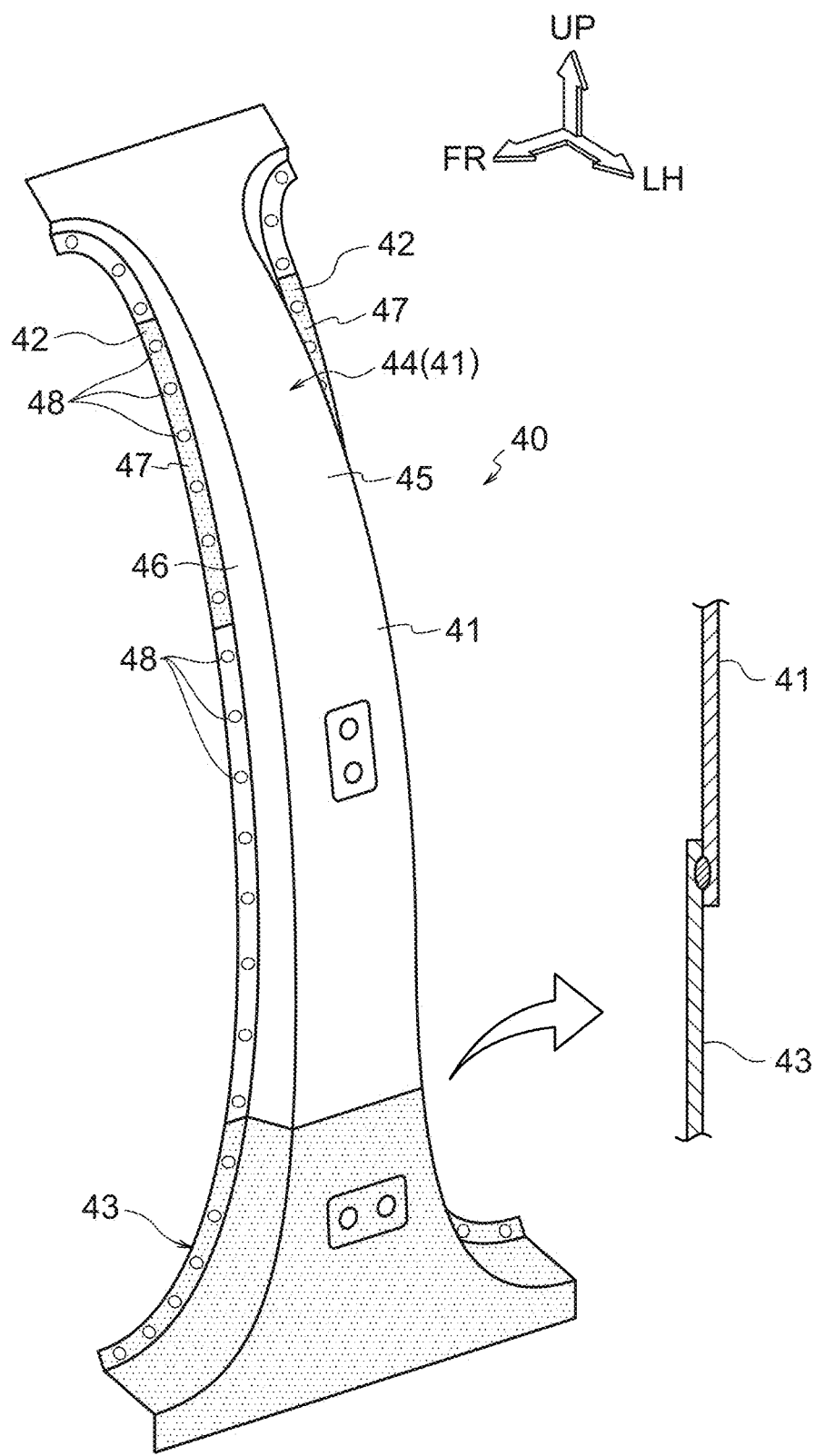
FIG. 41 is a perspective view illustrating an eighth example of outer reinforcement.
Figure 42:
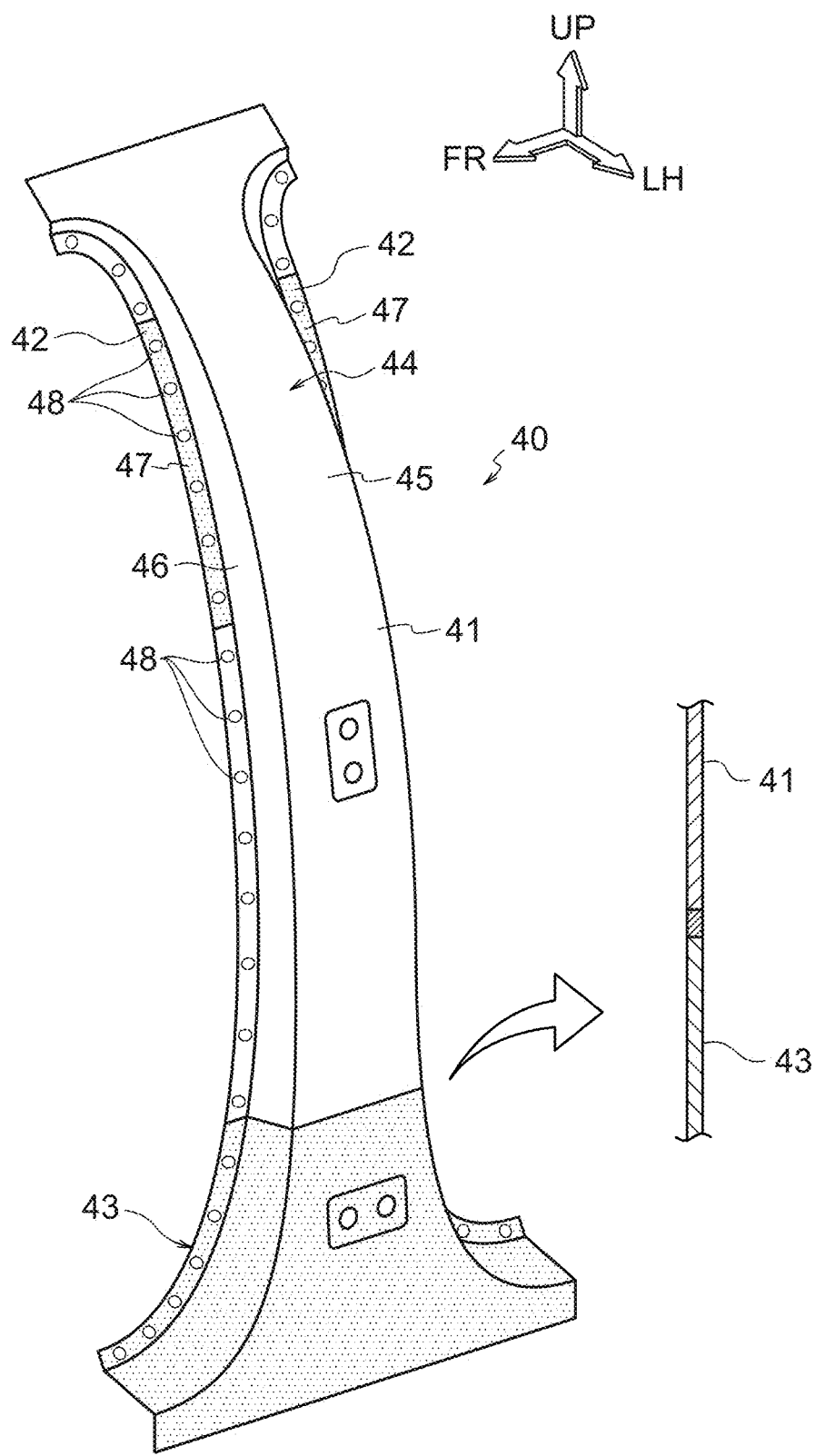
FIG. 42 is a perspective view illustrating a ninth example of outer reinforcement.

In an eighth example illustrated in FIG. 41, plural of the second steel sheets 42 and a third steel sheet 43 are employed. The second steel sheets 42 configure central sections of the vehicle up-down direction (for example, sections spanning from the center to slightly above the center) of the respective flanges 47. The third steel sheet 43 configures a lower section of the outer reinforcement 40. The third steel sheet 43 may be lap-welded to the first steel sheet 41, or may be butt-welded to the first steel sheet 41 as illustrated in a ninth example in FIG. 42. The third steel sheet 43 is configured from a steel sheet with a lower carbon content than the first steel sheet 41.

Note that the second steel sheets 42 and the third steel sheet 43 may have the same carbon content as each other, or may have different carbon content to each other. In the case of a center pillar, since the lower section of the vehicle up-down direction tends to undergo heavier deformation, the third steel sheet 43 employed in the lower section of the outer reinforcement 40 preferably has a lower carbon content than the second steel sheets 42 employed in the upper section of the outer reinforcement 40.

In the eighth example and the ninth example, since the central sections of the vehicle up-down direction of the flanges 47 are configured from the second steel sheets 42, the occurrence of fracturing originating at the spot weld locations 48 in these sections can be suppressed, even when load is directly input to the central sections of the vehicle up-down direction of the flanges 47, for example in a side-on vehicle collision. Moreover, since the third steel sheet 43 is set with a lower carbon content than the first steel sheet 41 so as to impart lower strength and greater ductility, energy can be more efficiently absorbed by the lower section of the outer reinforcement 40 when collision load is input to the lower section of the outer reinforcement 40.

Note that the first example to the ninth example of the outer reinforcement 40 described above are merely examples, and the second steel sheets 42 configuring the outer reinforcement 40 may be formed in other shapes.

Moreover, in addition to the upper sections and lower sections of the flanges 47, in cases in which the flanges 47 are formed with other locations having a profile where stress concentrates, at least these locations may be configured by the second steel sheets 42. Furthermore, where practical, the first example to the ninth example described above may also be implemented in appropriate combinations.

Figure 43:
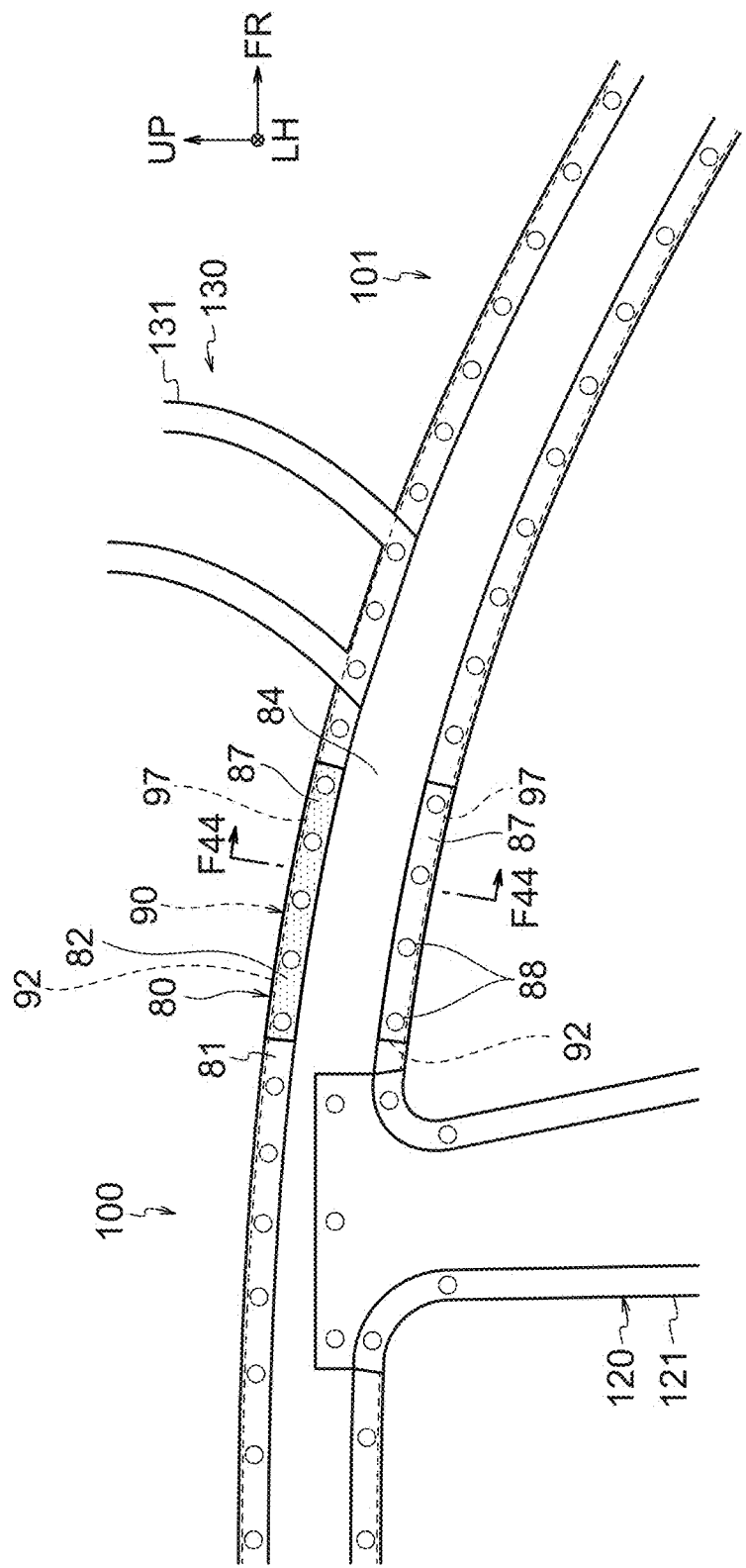
FIG. 43 is a side view illustrating an example of application of a stamped part according to an exemplary embodiment of the present invention to outer reinforcement and inner reinforcement configuring a roof rail and a front pillar of a vehicle.
Figure 44:
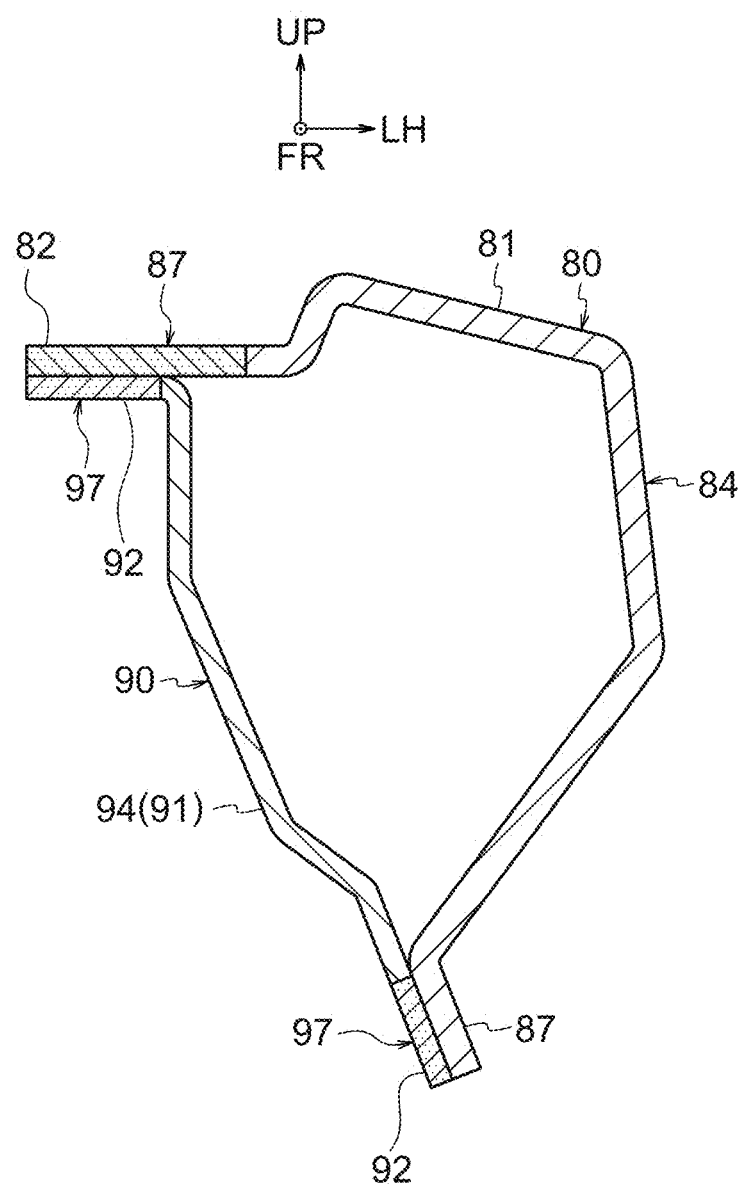
FIG. 44 is a cross-section illustrating the outer reinforcement and the inner reinforcement in FIG. 43 as sectioned along line F44-F44 in FIG. 43.
Figure 45:
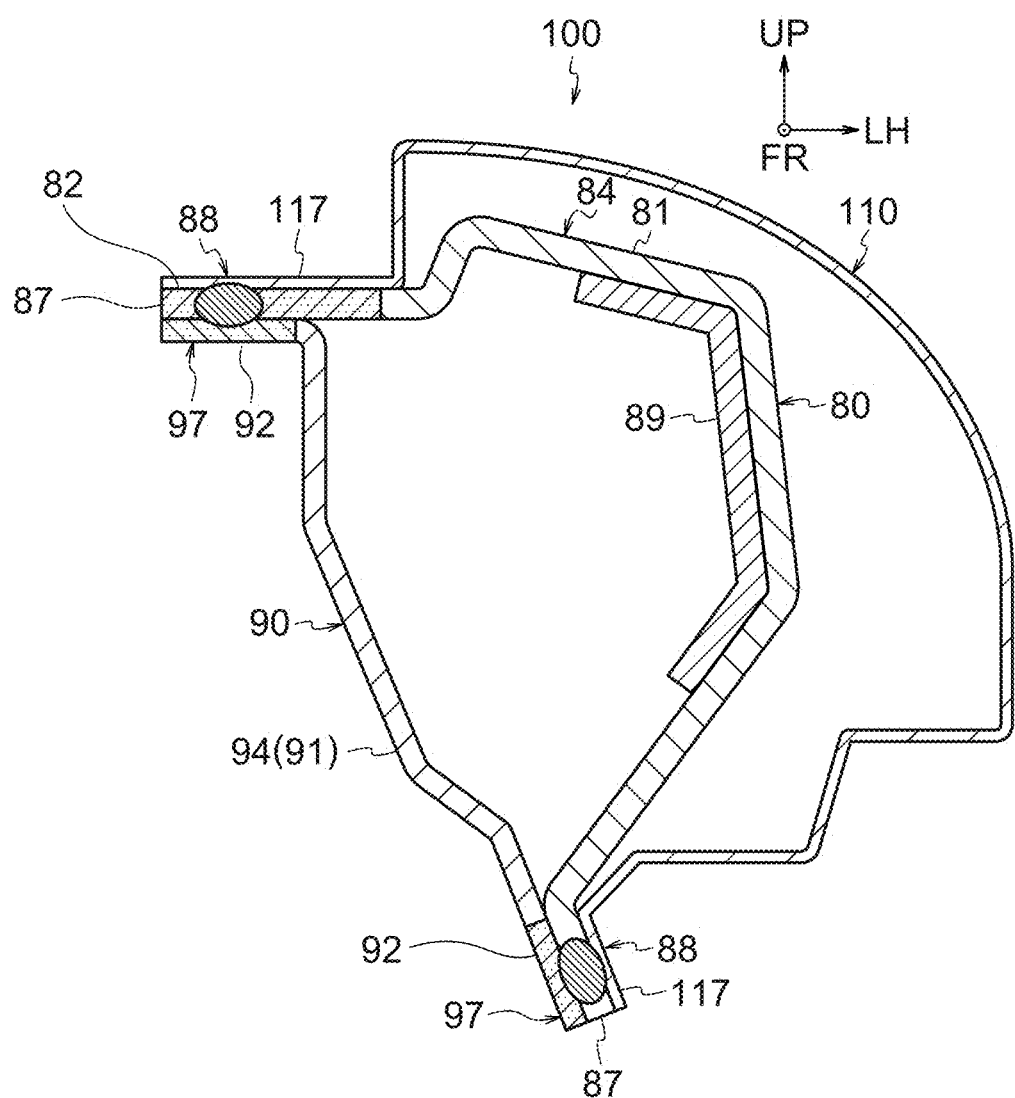
FIG. 45 is a cross-section illustrating a front end section of a roof rail applied with the outer reinforcement and the inner reinforcement in FIG. 43.

Next, explanation follows regarding examples of application of the stamped part according to the present exemplary embodiment of the present invention to outer reinforcement and inner reinforcement configuring a roof rail and a front pillar of a vehicle, with reference to FIG. 43 to FIG. 45.

FIG. 43 is a side view illustrating outer reinforcement 80 and inner reinforcement 90 configuring a roof rail 100 and a front pillar 101 of a vehicle. The outer reinforcement 80 and the inner reinforcement 90 are formed with elongated profiles, having a length direction running in the vehicle front-rear direction and a short direction running in the vehicle up-down direction.

The outer reinforcement 80 is disposed at the vehicle width direction outside of the inner reinforcement 90. Outer reinforcement 121 configuring a center pillar 120 and a roof front cross member 131 provided to a front end section of a roof 130 are joined to the outer reinforcement 80.

FIG. 44 is a cross-section as sectioned along line F44-F44 in FIG. 43. The outer reinforcement 80 includes a recessed main body 84 opening toward the inner reinforcement 90, and a pair of flanges 87 jutting out from the main body 84. In FIG. 44, for ease of comprehension one of the pair of flanges 87 is illustrated as if jutting out from the main body 84 in the vehicle up-down direction. The outer reinforcement 80 is a stamped part configured from a tailored blank, and is configured from a first steel sheet 81 and a second steel sheet 82. The pair of flanges 87 extend in the vehicle front-rear direction, and the second steel sheet 82 configures a central section of the vehicle front-rear direction of the upper side flange 87 (as an example, a section positioned at a front end section of the roof rail 100) (see FIG. 43).

The inner reinforcement 90 includes a flat plate shaped main body 94 that closes off the opening of the outer reinforcement 80, and a pair of flanges 97 jutting out from the main body 94. In FIG. 44, for ease of comprehension one of the pair of flanges 97 is illustrated as if jutting out from the main body 94 in the vehicle up-down direction. The inner reinforcement 90 is likewise a stamped part configured from a tailored blank, and is configured from a first steel sheet 91 and a pair of second steel sheets 92. The pair of flanges 97 extend along the vehicle front-rear direction, and the pair of second steel sheets 92 are provided spanning the same vehicle front-rear direction range as the second steel sheet 82 of the outer reinforcement 80 described above.

FIG. 45 is a cross-section illustrating the front end section of the roof rail 100 employing the outer reinforcement 80 and the inner reinforcement 90. A side panel outer 110 is disposed at the vehicle width direction outside of the outer reinforcement 80, and a patch reinforcement 89 is joined to a vehicle width direction inside face of the outer reinforcement 80. The side panel outer 110 is formed with a pair of flanges 117. The flanges 87, the flanges 97, and the flanges 117 are spot welded together in a superimposed state, thus forming spot weld locations 88.

The side panel outer 110 is, for example, configured from a galvannealed steel sheet with a sheet thickness of 0.75 mm and a tensile strength grade of 270 MPa. The first steel sheet 81 of the outer reinforcement 80 is, for example, configured from an uncoated hot stamped steel sheet with a sheet thickness of 1.2 mm and a tensile strength grade of 1800 MPa (a carbon content of 0.30 mass % and carbon equivalent of 0.34 mass %).

The second steel sheet 82 of the outer reinforcement 80 is, for example, configured from an uncoated hot stamped steel sheet with a sheet thickness of 1.2 mm and a tensile strength grade of 1200 MPa (a carbon content of 0.13 mass % and carbon equivalent of 0.19 mass %). The patch reinforcement 89 is, for example, configured from an uncoated hot stamped steel sheet with a sheet thickness of 1.4 mm and a tensile strength grade of 2000 MPa.

The first steel sheet 91 of the inner reinforcement 90 is, for example, configured from an uncoated hot stamped steel sheet with a sheet thickness of 1.2 mm and a tensile strength grade of 2000 MPa (a carbon content of 0.34 mass % and carbon equivalent of 0.38 mass %). The second steel sheets 92 of the inner reinforcement 90 are, for example, configured from an uncoated hot stamped steel sheet with a sheet thickness of 1.2 mm and a tensile strength grade of 1200 MPa.

Note that the first steel sheet 91 of the inner reinforcement 90 may, for example, be configured from an uncoated TRIP steel sheet with a sheet thickness of 1.6 mm and a tensile strength grade of 1500 MPa (a carbon content of 0.37 mass % and carbon equivalent of 0.44 mass %). The second steel sheets 92 of the inner reinforcement 90 may, for example, be configured from an uncoated DP steel sheet with a sheet thickness of 1.6 mm and a tensile strength grade of 980 MPa (a carbon content of 0.15 mass % and carbon equivalent of 0.20 mass %).

In this example, since central sections of the vehicle front-rear direction of the flanges 87, 97 (as an example, sections positioned at the front end section of the roof rail 100) are respectively configured from the second steel sheets 82, 92, the occurrence of fracturing originating at the spot weld locations 88 in these sections can be suppressed even when stress concentrates on the spot weld locations 88 of the flanges 87, 97, for example in a side-on pole collision. Since the remaining sections of the outer reinforcement 80 and the inner reinforcement 90 are respectively configured from the first steel sheets 81, 91, the strength of these remaining sections can be secured, thereby enabling the collision performance of the roof rail 100 and the front pillar 101 (outer reinforcement 80 and inner reinforcement 90) to be secured.

Note that although the second steel sheet 82 of the outer reinforcement 80 and the second steel sheets 92 of the inner reinforcement 90 configure sections of the flanges 87, 97 positioned at the front end section of the roof rail 100 as an example, the second steel sheets 82, 92 may configure other sections thereof. Namely, the second steel sheets 82, 92 may configure any sections of the flanges 87, 97 as long as they configure at least some section of the flanges 87, 97 in the vehicle front-rear direction.

The second steel sheet 82 of the outer reinforcement 80 may configure at least one section of the main body 84 as well as at least one section of the flanges 87. Similarly, the second steel sheets 92 of the inner reinforcement 90 may configure at least one section of the main body 94 as well as at least one section of the flanges 97.

Figure 46:
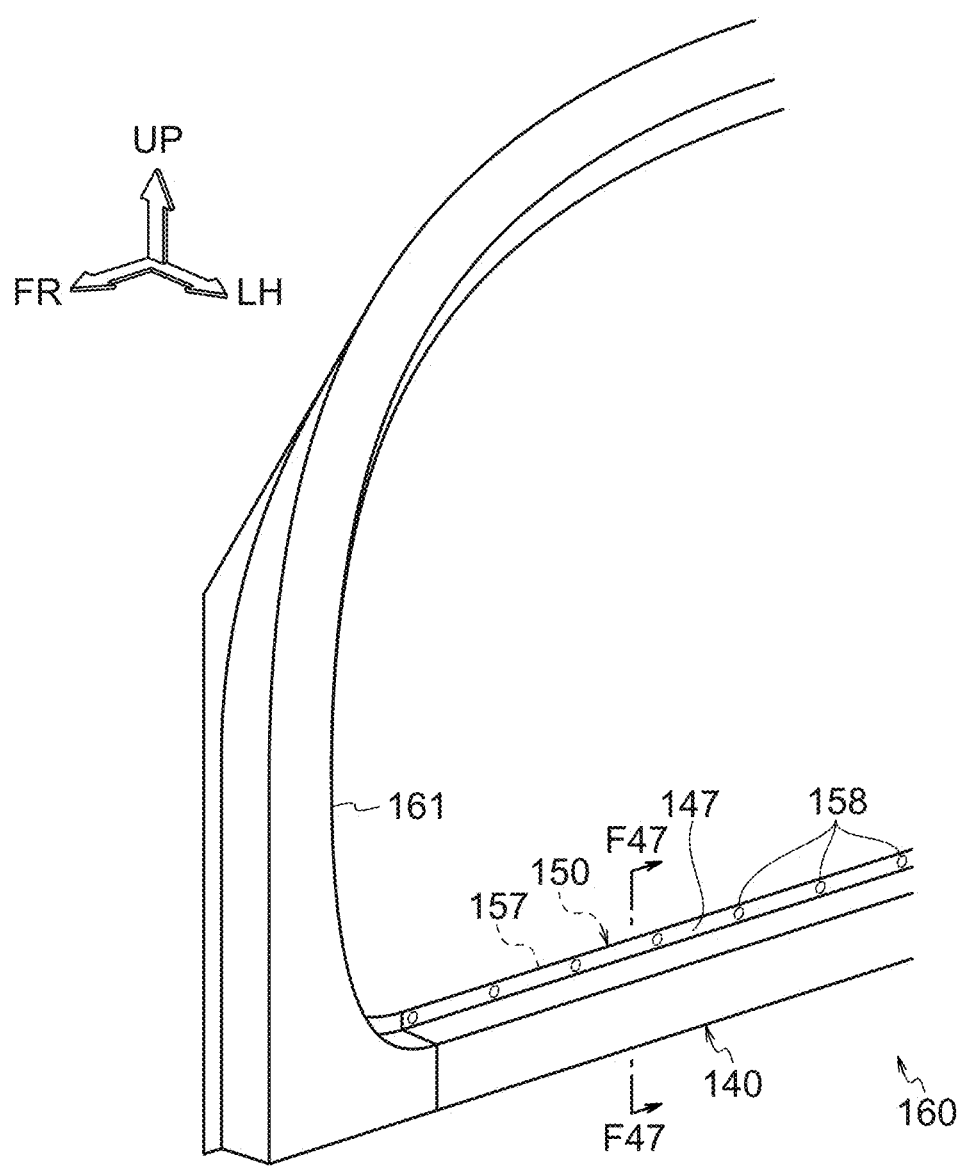
FIG. 46 is a perspective view illustrating an example of application of a stamped part according to an exemplary embodiment of the present invention to inner reinforcement configuring a side sill of a vehicle.
Figure 47:
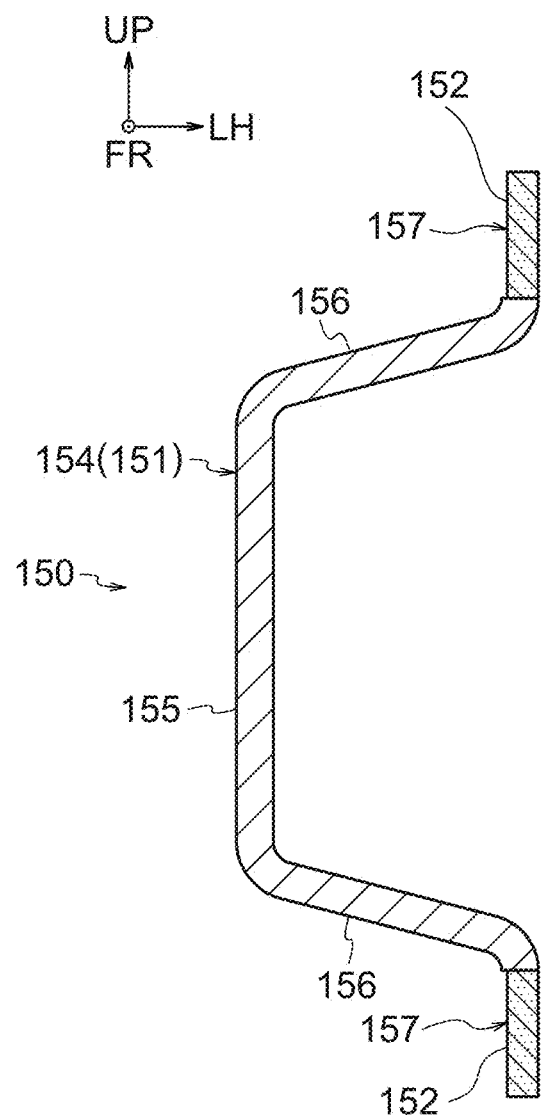
FIG. 47 is a cross-section illustrating the inner reinforcement in FIG. 46 as sectioned along line F47-F47 in FIG. 46.
Figure 48:
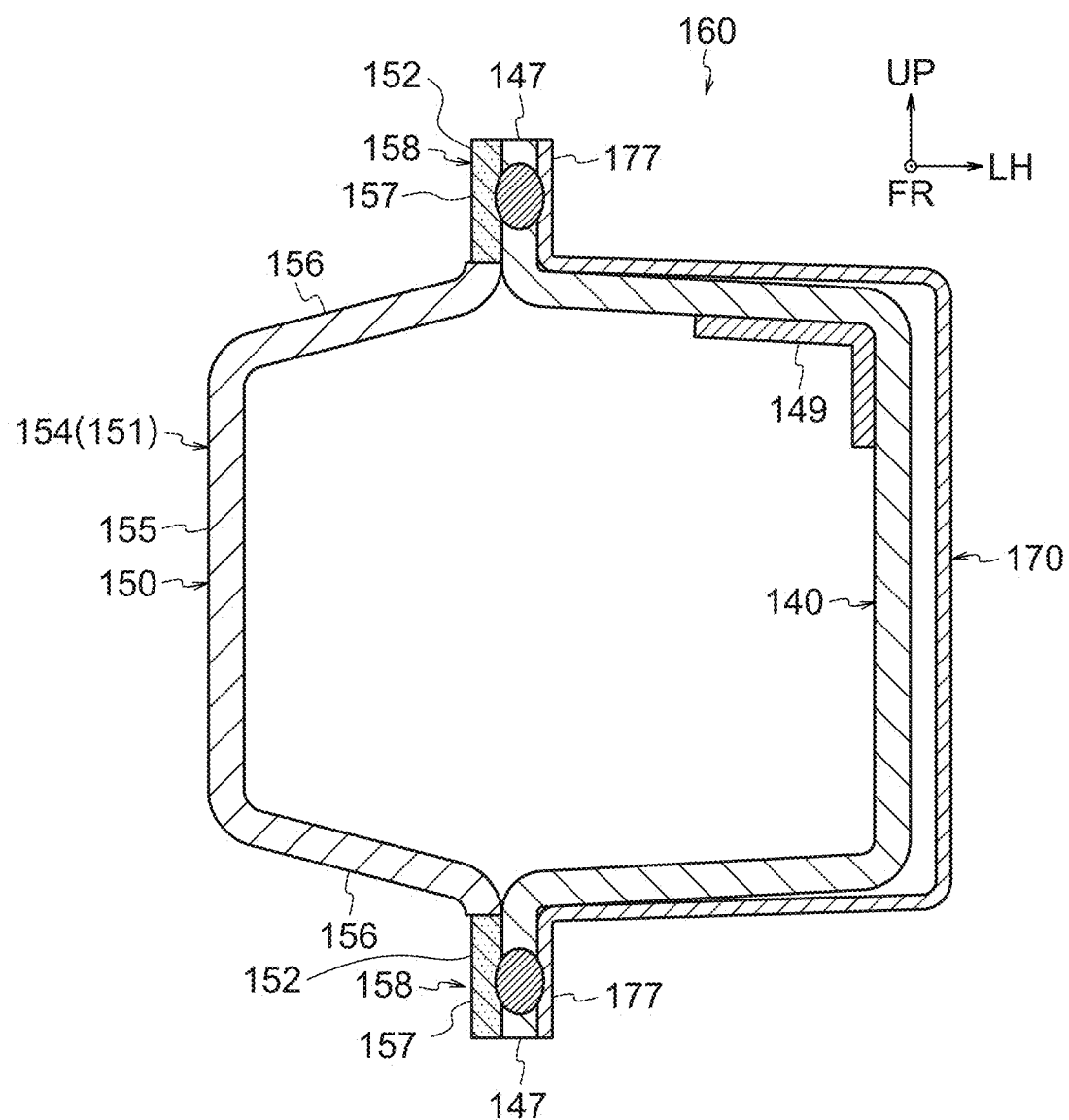
FIG. 48 is a cross-section illustrating a side sill applied with the outer reinforcement and inner reinforcement in FIG. 46.

Next, explanation follows regarding examples of application of the stamped part according to the present exemplary embodiment of the present invention to inner reinforcement configuring a side sill of a vehicle, with reference to FIG. 46 to FIG. 48.

FIG. 46 is a perspective view illustrating an outer reinforcement 140 and an inner reinforcement 150 configuring a side sill 160. The outer reinforcement 140 and the inner reinforcement 150 are each formed with an elongated profile, having a length direction running in the vehicle front-rear direction and a short direction running in the vehicle up-down direction. The inner reinforcement 150 is disposed at the vehicle width direction inside of the outer reinforcement 140. A front pillar 161 is fixed to a front end section of the side sill 160.

FIG. 47 is a cross-section illustrating the inner reinforcement 150 as sectioned along line F47-F47 in FIG. 46. The inner reinforcement 150 is formed with a hat-shaped cross-section profile including a top plate 155, a pair of sidewalls 156, and a pair of flanges 157 jutting out from the pair of sidewalls 156. The inner reinforcement 150 is a stamped part configured from a tailored blank, and is configured from a first steel sheet 151 and a pair of second steel sheets 152. The pair of flanges 157 extend along the vehicle front-rear direction, and the pair of second steel sheets 152 configure at least one section of the vehicle front-rear direction of the respective flanges 157. The pair of second steel sheets 152 are, as an example, formed with a smaller sheet thickness than the first steel sheet 151.

FIG. 48 is a cross-section illustrating the side sill 160 employing the outer reinforcement 140 and the inner reinforcement 150. A side panel outer 170 is disposed at a vehicle width direction outside of the outer reinforcement 140, and patch reinforcement 149 is joined to a vehicle width direction inside face of the outer reinforcement 140.

The outer reinforcement 140 and the side panel outer 170 are each formed with a hat-shaped cross-section profile opening in the vehicle width direction. The outer reinforcement 140 is formed with a pair of flanges 147, and the side panel outer 170 is formed with a pair of flanges 177. The flanges 147, the flanges 157, and the flanges 177 are spot welded together in a superimposed state, thus forming spot weld locations 158.

The side panel outer 170 is, for example, configured from a galvannealed steel sheet with a sheet thickness of 0.7 mm and a tensile strength grade of 270 MPa. The outer reinforcement 140 is, for example, configured from a GA-plated hot stamped steel sheet with a sheet thickness of 1.4 mm and a tensile strength grade of 1500 MPa.

The first steel sheet 151 of the inner reinforcement 150 is, for example, configured from a GA-plated hot stamped steel sheet with a sheet thickness of 1.4 mm and a tensile strength grade of 1900 MPa (a carbon content of 0.31 mass % and carbon equivalent of 0.36 mass %). The second steel sheets 152 of the inner reinforcement 150 are configured from a GA-plated hot stamped steel sheet with a sheet thickness of 1.0 mm and a tensile strength grade of 1300 MPa (a carbon content of 0.15 mass % and carbon equivalent of 0.21 mass %).

In this example, since at least one section of the vehicle front-rear direction of each of the flanges 157 is configured by the second steel sheet 152, the occurrence of fracturing originating at the spot weld locations 158 in these sections can be suppressed, even when stress concentrates on the at least one section of the vehicle front-rear direction section of the flange 157, for example in a side-on vehicle collision or an offset collision. Moreover, since the remaining sections of the inner reinforcement 150 are configured from the first steel sheet 151, the strength of these remaining sections can be secured, thereby enabling the collision performance of the side sill 160 (inner reinforcement 150) to be secured.

Note that the second steel sheets 152 may configure any section of the respective flanges 157 as long as they configure at least one section of the vehicle front-rear direction section of the respective flanges 157. Moreover, the second steel sheets 152 may configure at least one section of a main body 154 (top plate 155 and pair of sidewalls 156) as well as at least one section of the flanges 157.

Note that although the outer reinforcement 140 illustrated in FIG. 48 is configured from a GA-plated hot stamped steel sheet with a sheet thickness of 1.4 mm and a tensile strength grade of 1500 MPa as an example, other configurations may be adopted. For example, the stamped part according to the present exemplary embodiment of the present invention may be applied to the outer reinforcement of a side sill of a vehicle. Namely, as an example, the outer reinforcement 140 may be configured by a stamped part from a tailored blank formed from a first steel sheet and a pair of second steel sheets. The pair of second steel sheets configure at least one section of the vehicle front-rear direction section of the respective flanges. The first steel sheet of the outer reinforcement 140 may, for example, be configured from a GA-plated hot stamped steel sheet with a sheet thickness of 1.4 mm and a tensile strength grade of 1900 MPa (a carbon content of 0.31 mass % and carbon equivalent of 0.36 mass %). The second steel sheets of the outer reinforcement 140 may, for example, be configured from a GA-plated hot stamped steel sheet with a sheet thickness of 1.4 mm and a tensile strength grade of 1300 MPa (a carbon content of 0.15 mass % and carbon equivalent of 0.21 mass %).

Figure 49:
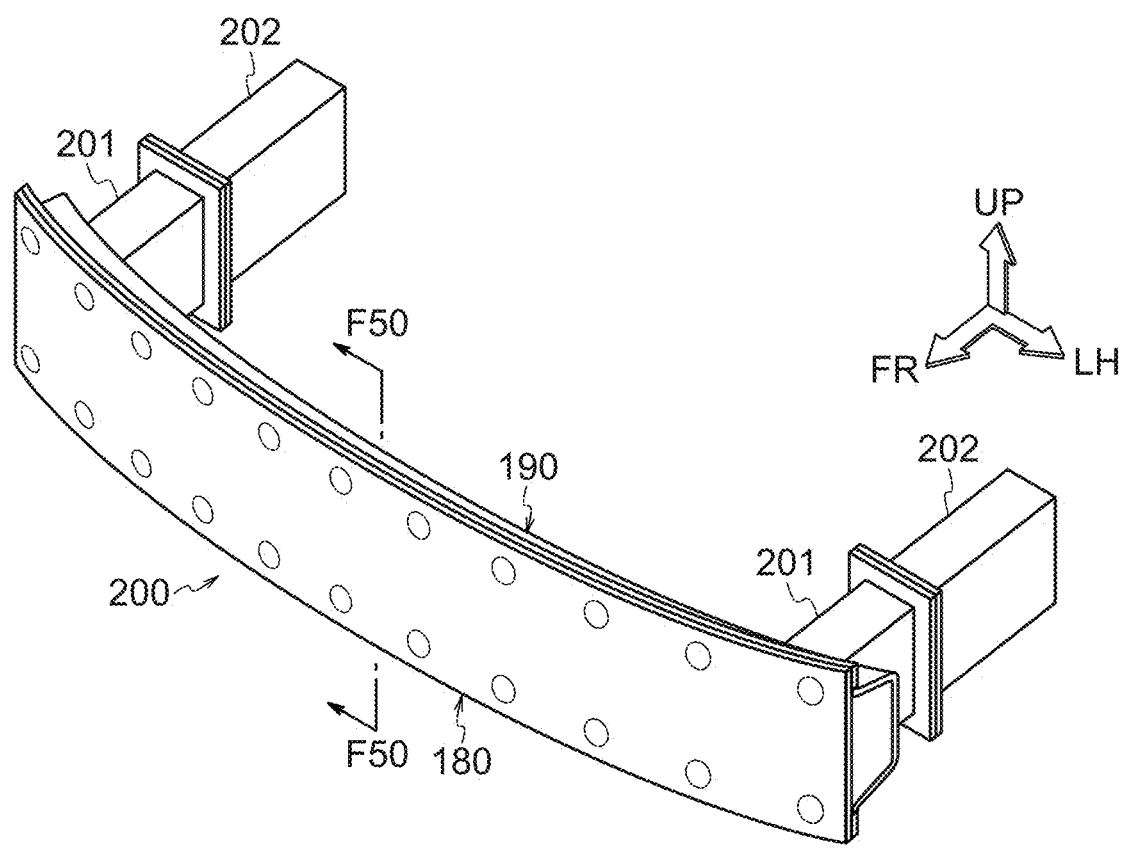
FIG. 49 is a perspective view illustrating an example of application of a stamped part according to an exemplary embodiment of the present invention to inner reinforcement configuring bumper reinforcement of a vehicle.
Figure 50:
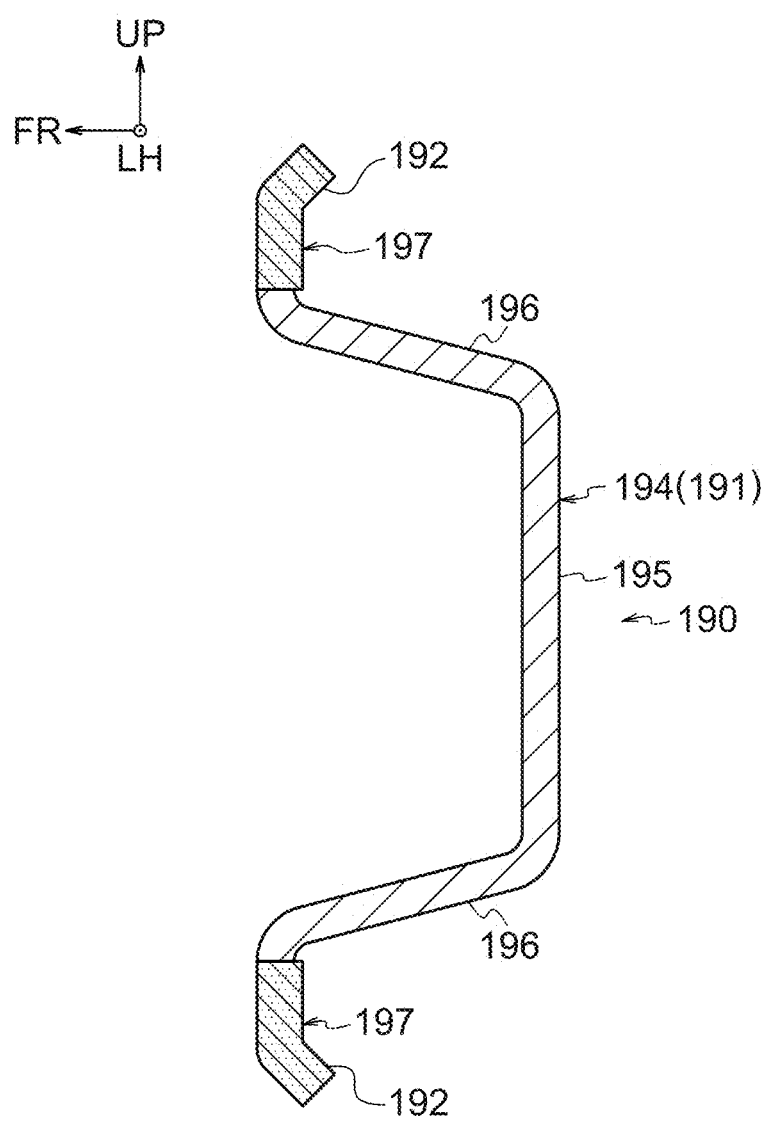
FIG. 50 is a cross-section illustrating the inner reinforcement in FIG. 49 as sectioned along line F50-F50 in FIG. 49.
Figure 51:
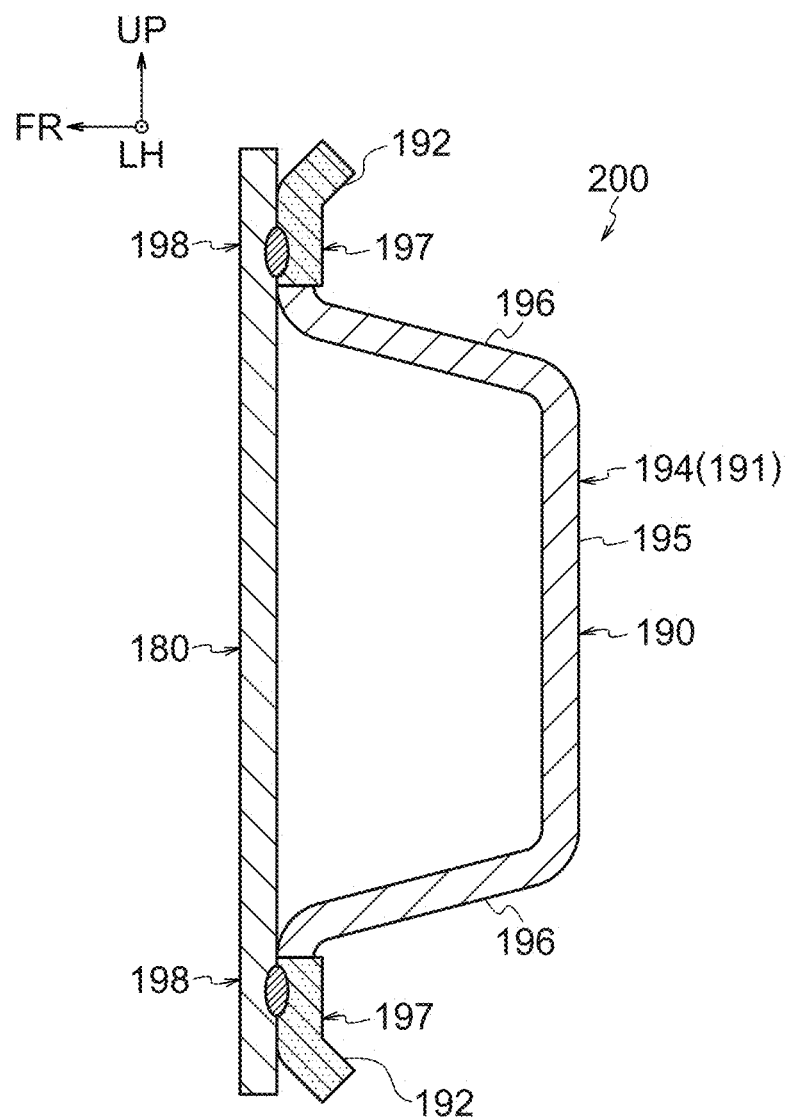
FIG. 51 is a cross-section illustrating bumper reinforcement applied with the outer reinforcement and inner reinforcement in FIG. 49.

Next, explanation follows regarding an example in which a stamped part according to the present exemplary embodiment of the present invention is applied to inner reinforcement configuring bumper reinforcement of a vehicle, with reference to FIG. 49 to FIG. 51.

FIG. 49 is a perspective view illustrating outer reinforcement 180 and inner reinforcement 190 configuring bumper reinforcement 200. The outer reinforcement 180 and the inner reinforcement 190 are each formed with an elongated profile, having a length direction running in the vehicle width direction and a short direction running in the vehicle up-down direction. The inner reinforcement 190 is disposed at the vehicle front-rear direction rear side of the outer reinforcement 180. Front side members 202 are fixed to vehicle width direction outside end sections of the bumper reinforcement 200 through crash boxes 201.

FIG. 50 is a cross-section illustrating the inner reinforcement 190 as sectioned along line F50-F50 in FIG. 49. The inner reinforcement 190 is formed with a hat-shaped cross-section profile opening toward the vehicle front-rear direction front side. Namely, the inner reinforcement 190 includes a top plate 195, a pair of sidewalls 196, and a pair of flanges 197 jutting out from the pair of sidewalls 196.

The inner reinforcement 190 is a stamped part from a tailored blank, and is configured from a first steel sheet 191 and a pair of second steel sheets 192. The pair of flanges 197 extend along the vehicle width direction, and the pair of second steel sheets 192 configure at least one section of the vehicle width direction of the respective flanges 197. The pair of second steel sheets 192 are, as an example, formed with a thicker sheet thickness than the first steel sheet 191.

FIG. 51 is a cross-section illustrating the bumper reinforcement 200 employing the outer reinforcement 180 and the inner reinforcement 190. The outer reinforcement 180 is formed in a flat plate shape that closes off the opening of the inner reinforcement 190. The pair of flanges 197 are superimposed on and spot welded to an upper section and a lower section of the outer reinforcement 180, thus forming spot weld locations 198.

The outer reinforcement 180 is, for example, configured from an uncoated steel sheet with a sheet thickness of 1.4 mm and a tensile strength grade of 780 MPa. The first steel sheet 191 of the inner reinforcement 190 is, for example, configured from an uncoated hot stamped steel sheet with a sheet thickness of 1.6 mm and a tensile strength grade of 2000 MPa (a carbon content of 0.34 mass % and carbon equivalent of 0.38 mass %). The second steel sheets 192 of the inner reinforcement 190 are, for example, configured from an uncoated hot stamped steel sheet with a sheet thickness of 1.6 mm and a tensile strength grade of 1500 MPa (a carbon content of 0.20 mass % and carbon equivalent of 0.25 mass %).

In this example, since at least one section of the vehicle width direction of the respective flanges 197 is configured by the second steel sheets 192, the occurrence of fracturing originating at the spot weld locations 198 in these sections can be suppressed, even when stress concentrates on the at least one section of the vehicle width direction of the respective flanges 197, for example in a front-on vehicle collision. Moreover, since the remaining sections of the inner reinforcement 190 are configured from the first steel sheet 191, the strength of these remaining sections can be secured, and collision performance of the bumper reinforcement 200 (inner reinforcement 190) can thus also be secured.

Note that any section of the flanges 197 may be configured by the second steel sheets 192 as long as at least one section of the vehicle width direction of the flanges 197 is configured by the second steel sheets 192. Moreover, the second steel sheets 192 may configure at least one section of a main body 194 (top plate 195 and pair of sidewalls 196) as well as at least one section of the flanges 197.

Although the outer reinforcement 180 illustrated in FIG. 51 is configured from an uncoated steel sheet formed in a flat plate shape with a sheet thickness of 1.4 mm and a tensile strength grade of 780 MPa as an example, other configurations may be adopted. For example, a stamped part according to the present exemplary embodiment of the present invention may be applied to outer reinforcement configuring bumper reinforcement of a vehicle. Namely, as an example, the outer reinforcement 180 may be configured with a hat-shaped cross-section profile opening toward the vehicle front-rear direction rear side, such that the outer reinforcement 180 includes a top plate, a pair of sidewalls, and a pair of flanges jutting out from the pair of sidewalls. Such outer reinforcement 180 corresponds to a stamped part formed from a tailored blank, and is configured from a first steel sheet and a pair of second steel sheets. The pair of flanges extend in the vehicle width direction, and the pair of second steel sheets configure at least one section the vehicle width direction of the respective flanges. The first steel sheet of the outer reinforcement 180 is, for example, configured from an uncoated hot stamped steel sheet with a sheet thickness of 1.4 mm and a tensile strength grade of 2000 MPa (carbon content of 0.34 mass % and carbon equivalent of 0.38 mass %). The second steel sheets of the outer reinforcement 180 are, for example, configured from an uncoated hot stamped steel sheet with a sheet thickness of 1.4 mm and a tensile strength grade of 1500 MPa (carbon content of 0.20 mass % and carbon equivalent of 0.25 mass %).

Figure 52:
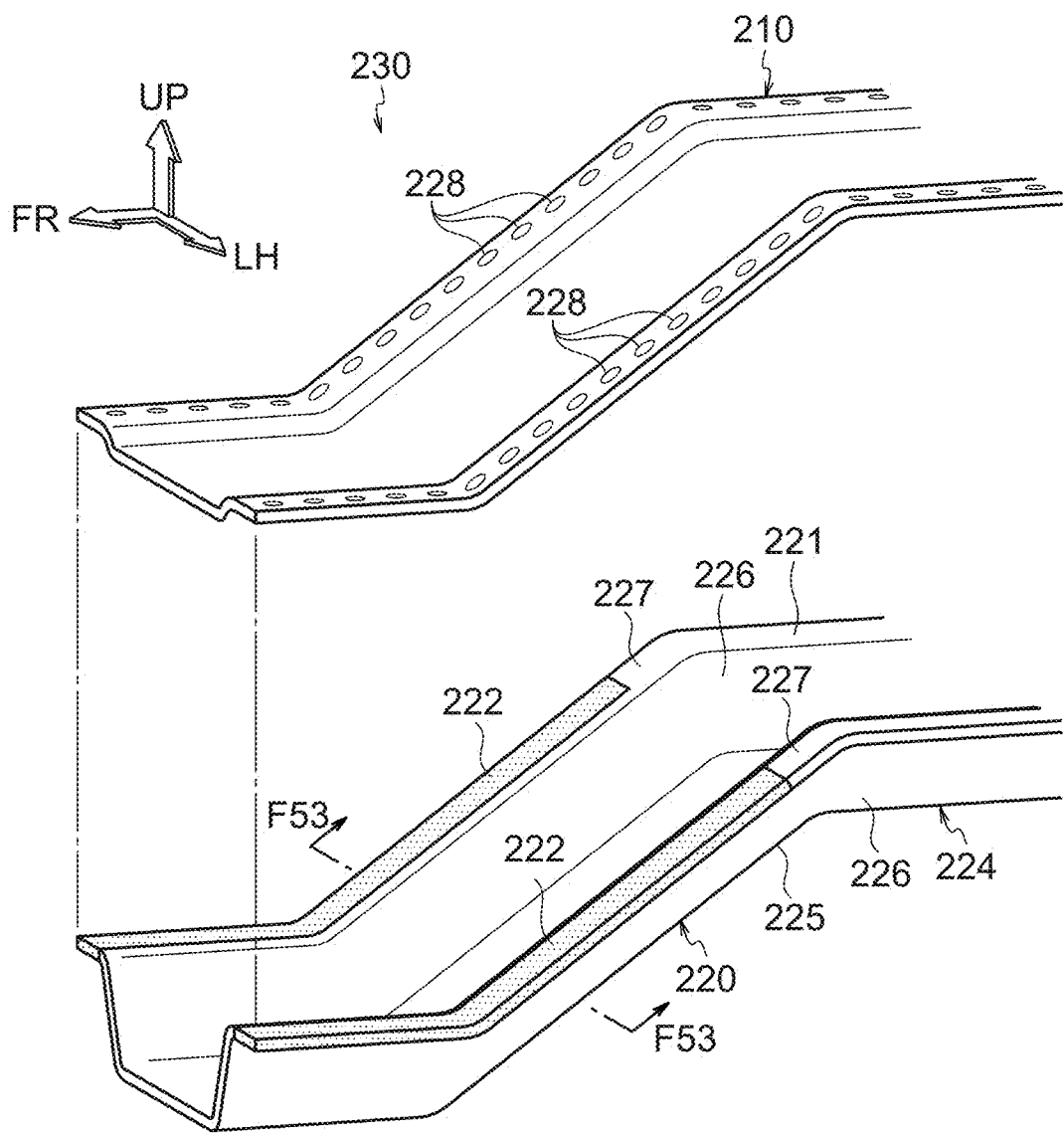
FIG. 52 is a perspective view illustrating an example of application of a stamped part according to an exemplary embodiment of the present invention to a rear side member lower configuring a rear side member of a vehicle.
Figure 53:
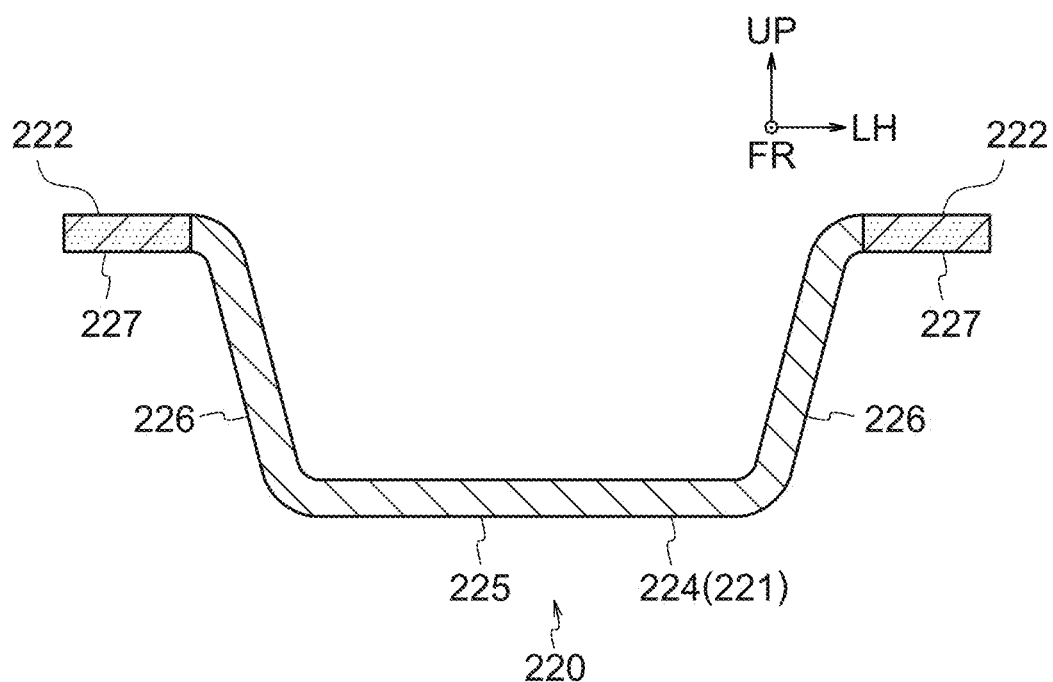
FIG. 53 is a cross-section illustrating the rear side member lower in FIG. 52 as sectioned along line F53-F53 in FIG. 42.

Next, explanation follows regarding an example of application of the stamped part according to the present exemplary embodiment of the present invention to a rear side member lower configuring a rear side member of a vehicle, with reference to FIG. 52 to FIG. 53.

FIG. 52 is an exploded perspective view illustrating a rear side member upper 210 and a rear side member lower 220 configuring a rear side member 230. The rear side member upper 210 and the rear side member lower 220 are each formed with an elongated profile, having a length direction running in the vehicle front-rear direction and a short direction running in the vehicle width direction. The rear side member lower 220 is disposed at lower side of the vehicle up-down direction of the rear side member upper 210.

FIG. 53 is a cross-section illustrating the rear side member lower 220 as sectioned along line F53-F53 in FIG. 52. The rear side member lower 220 is formed with a hat-shaped cross-section profile opening toward upper side of the vehicle up-down direction. Namely, the rear side member lower 220 includes a top plate 225, a pair of sidewalls 226, and a pair of flanges 227 jutting out from the pair of sidewalls 226.

The rear side member lower 220 is a stamped part from a tailored blank, and is configured by a first steel sheet 221 and a pair of second steel sheets 222. The pair of flanges 227 extend along the vehicle front-rear direction, and the pair of second steel sheets 222 configure one sections of the vehicle front-rear direction of the respective flanges 227. As an example, the pair of second steel sheets 222 are formed with a thicker sheet thickness than the first steel sheet 221. The rear side member upper 210 is formed in a flat plate shape that closes off the opening of the rear side member lower 220. The pair of flanges 227 are superimposed on and spot welded to both vehicle width direction sides of the rear side member upper 210, thus forming spot weld locations 228.

The rear side member upper 210 is, for example, configured from a galvannealed steel sheet with a sheet thickness of 1.4 mm and a tensile strength grade of 1180 MPa. The first steel sheet 221 of the rear side member lower 220 is, for example, configured from an aluminized hot stamped steel sheet with a sheet thickness of 1.4 mm and a tensile strength grade of 1900 MPa (carbon content of 0.31 mass % and carbon equivalent of 0.36 mass %). The second steel sheets 222 of the rear side member lower 220 are configured from an aluminized hot stamped steel sheet with a sheet thickness of 1.4 mm and a tensile strength grade of 1200 MPa (carbon content of 0.13 mass % and carbon equivalent of 0.19 mass %).

In this example, since at least one section of the vehicle front-rear direction of the flanges 227 is configured from the second steel sheets 222, the occurrence of fracturing originating at the spot weld locations 228 in these sections can be suppressed, even when stress concentrates on the at least one sections of the vehicle front-rear direction of the flanges 227, for example in a rear-on vehicle collision. Since the remaining sections of the rear side member lower 220 are configured from the first steel sheet 221, the strength of these remaining sections can be secured, thereby enabling the collision performance of the rear side member 230 (rear side member lower 220) to be secured.

Note that although the second steel sheets 222 configure one sections of the vehicle front-rear direction of the respective flanges 227, the second steel sheets 222 may configure the flanges 227 over their entire vehicle front-rear direction length. Moreover, the second steel sheets 222 may configure any section of the flanges 227 as long they configure at least one section of the vehicle front-rear direction of the respective flanges 227. Moreover, the second steel sheets 222 may configure at least one section of a main body 224 (top plate 225 and pair of sidewalls 226) as well as at least one section of the respective flanges 227.

Next, explanation follows regarding Examples.

Figure 54:
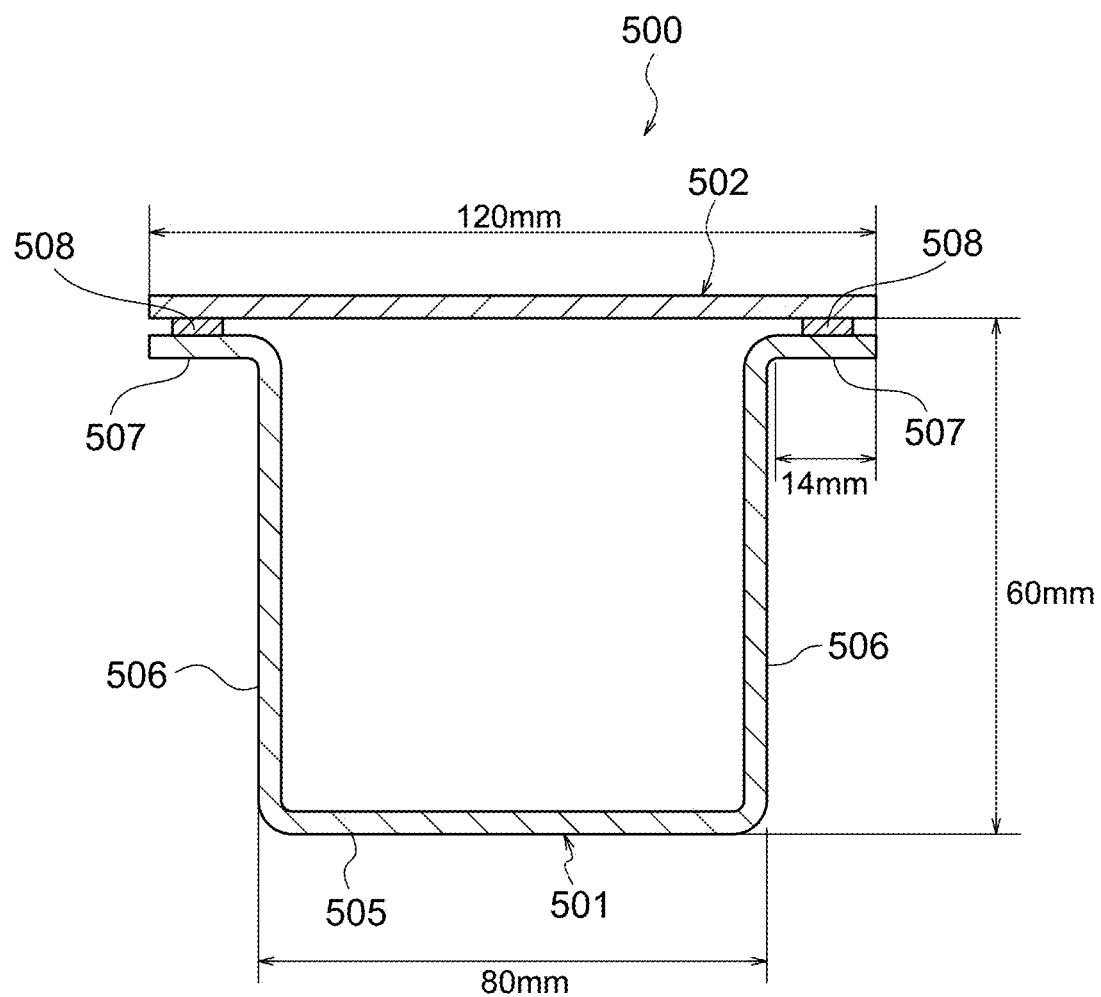
FIG. 54 is a vertical cross-section illustrating a framework component with a closed cross-section profile produced as an Example for the purpose of investigation.

FIG. 54 is a vertical cross-section illustrating a framework component 500 with a closed cross-section profile produced as an Example for investigation. The framework component 500 includes a stamped part 501 and a flat plate member 502. The framework component 500 is elongated, and is formed with a uniform cross-section profile spanning its entire length direction. A top plate 505 has a width of 80 mm, the height of the top plate 505 from the flat plate member 502 is 60 mm, and the width of the flat plate member 502 is 120 mm. Each of the respective flanges 507 includes a section with a width of 14 mm that lies parallel to the flat plate member 502.

A cold-rolled steel sheet with a sheet thickness of 1.6 mm and a tensile strength grade of 980 MPa (carbon content of 0.15 mass % and carbon equivalent of 0.20 mass %) is employed for the flat plate member 502. At least one out of a hot stamped steel sheet with a sheet thickness of 1.6 mm and a tensile strength grade of 1800 MPa (carbon content of 0.30 mass % and carbon equivalent of 0.34 mass %) or a hot stamped steel sheet with a sheet thickness of 1.6 mm and a tensile strength grade of 1200 MPa (carbon content of 0.13 mass % and carbon equivalent of 0.19 mass %) is employed for the stamped part 501 with a hat-shaped cross-section profile.

The hot stamped steel sheet with a sheet thickness of 1.6 mm and a tensile strength grade of 1800 MPa (carbon content of 0.30 mass % and carbon equivalent of 0.34 mass %) corresponds to a first steel sheet, and the hot stamped steel sheet with a sheet thickness of 1.6 mm and a tensile strength grade of 1200 MPa (carbon content of 0.13 mass % and carbon equivalent of 0.19 mass %) corresponds to a second steel sheet.

The stamped part 501 and the flat plate member 502 are welded together by resistance spot welding at a 50 mm pitch to form spot weld locations 508. The nugget diameter of the spot weld locations 508 is 6.3 mm.

Figure 55:
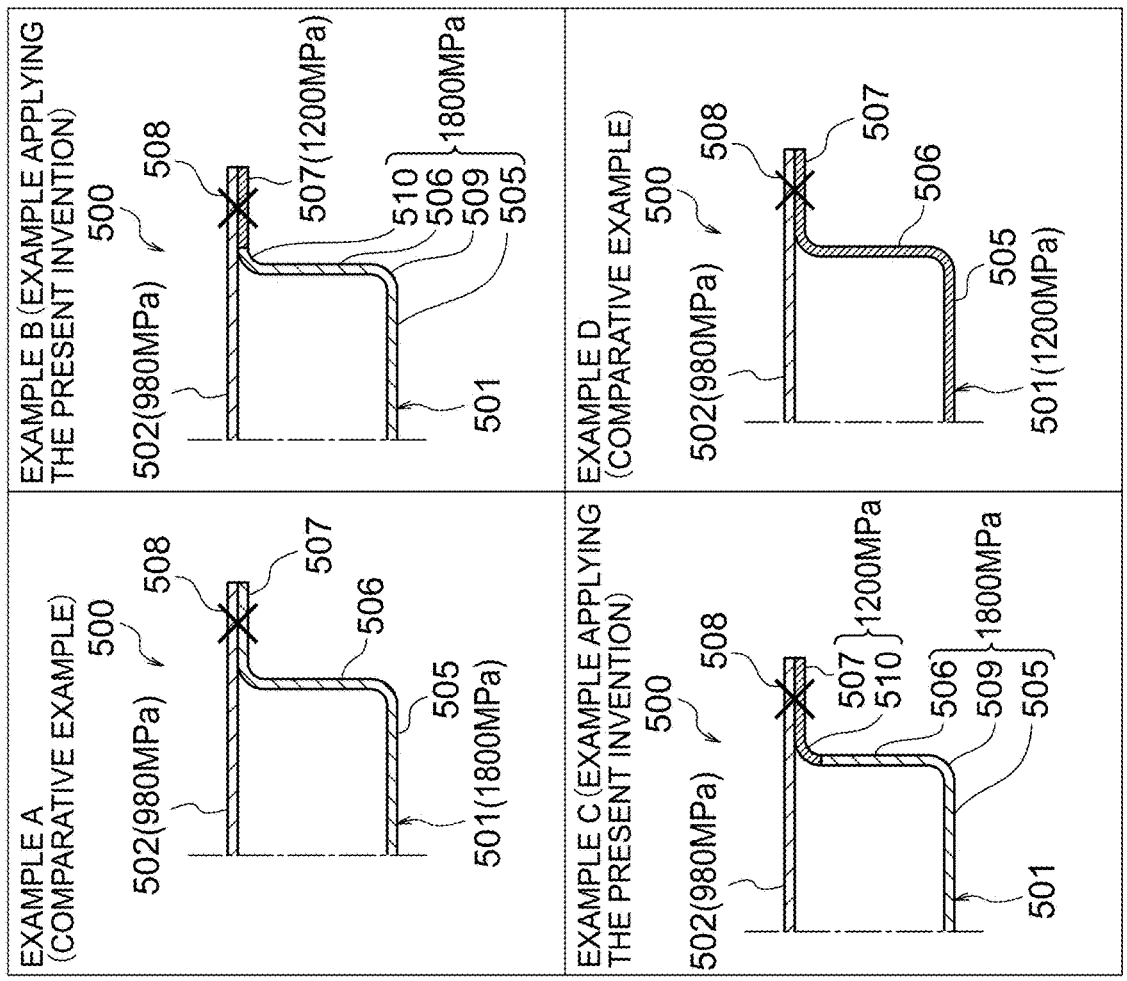
FIG. 55 is a diagram illustrating a comparison between an Example A through to an Example D.

FIG. 55 is a diagram illustrating comparisons between an Example A through to an Example D. The Example A is an example in which the entire stamped part 501 is formed from the hot stamped steel sheet with a tensile strength grade of 1800 MPa. Example A corresponds to a comparative example to the present invention.

Example B is an example in which the top plate 505, sidewalls 506, bend portions 509 between the top plate 505 and the sidewalls 506, and bend portions 510 between the sidewalls 506 and the flanges 507 of the stamped part 501 are formed from the hot stamped steel sheet with a tensile strength grade of 1800 MPa, and the flanges 507 are formed from the hot stamped steel sheet with a tensile strength grade of 1200 MPa. The stamped part 501 of Example B is formed from a tailored blank in which the hot stamped steel sheet with a tensile strength grade of 1800 MPa and the hot stamped steel sheet with a tensile strength grade of 1200 MPa are butt joined together. Example B corresponds to an Example applying the present invention.

Example C is an example in which the top plate 505, the sidewalls 506, and the bend portions 509 between the top plate 505 and the sidewalls 506 of the stamped part 501 are formed from the hot stamped steel sheet with a tensile strength grade of 1800 MPa, and the bend portions 510 between the sidewalls 506 and the flanges 507 and the flanges 507 themselves are respectively formed from the hot stamped steel sheet with a tensile strength grade of 1200 MPa. The stamped part 501 of the Example C is formed from a tailored blank in which the hot stamped steel sheet with a tensile strength grade of 1800 MPa and the hot stamped steel sheet with a tensile strength grade of 1200 MPa are butt joined together. Example C corresponds to an Example applying the present invention.

Example D is an example in which the entire stamped part 501 is formed from the hot stamped steel sheet with a tensile strength grade of 1200 MPa. Example D corresponds to a comparative example to the present invention.

Figure 56:
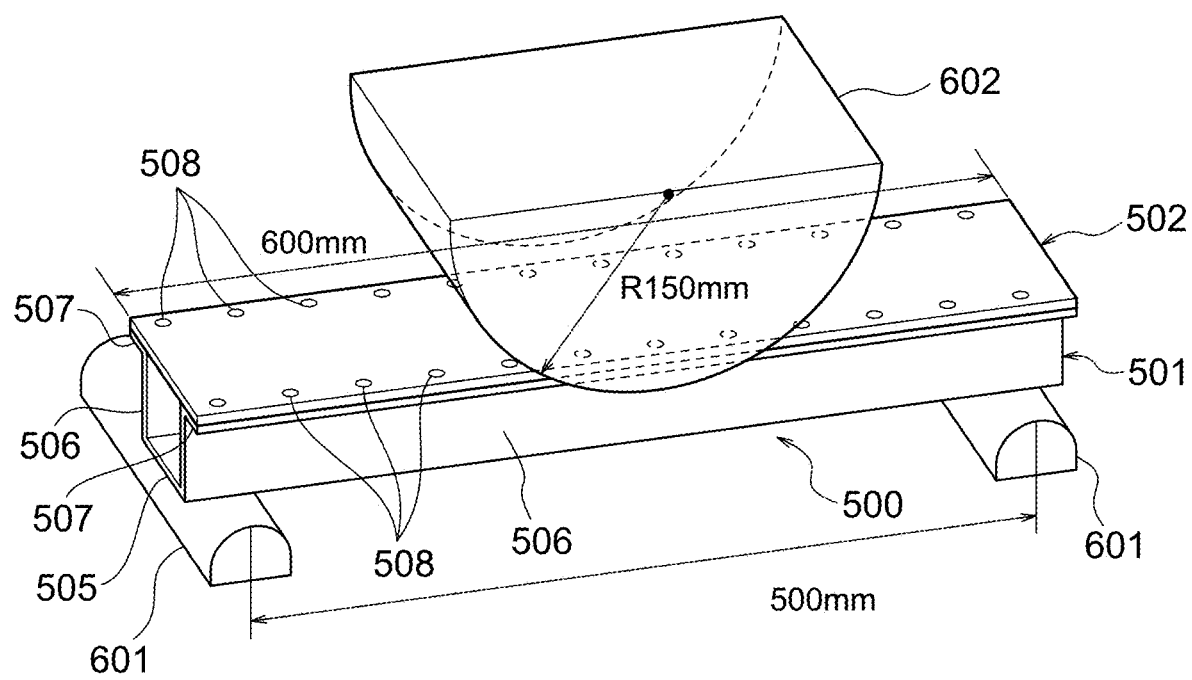
FIG. 56 is a perspective view illustrating an example of a static three-point bending test carried out in order to evaluate load-withstand characteristics of the framework component in FIG. 54.

FIG. 56 is a perspective view illustrating an example of a static three-point bending test carried out to evaluate the load-withstand characteristics of the framework component 500. In this static three-point bending test, the framework component 500 is placed on a pair of support members 601 with the flat plate member 502 facing upward, and a downward load is input to a central section of a length direction of the framework component 500 from above using an impactor 602. The radius of the impactor 602 is 150 mm, the length of the framework component 500 is 600 mm, and the distance between the apexes of the pair of support members 601 is 500 mm. A finite element method (FEM) is employed in this static three-point bending test.

Figure 57:
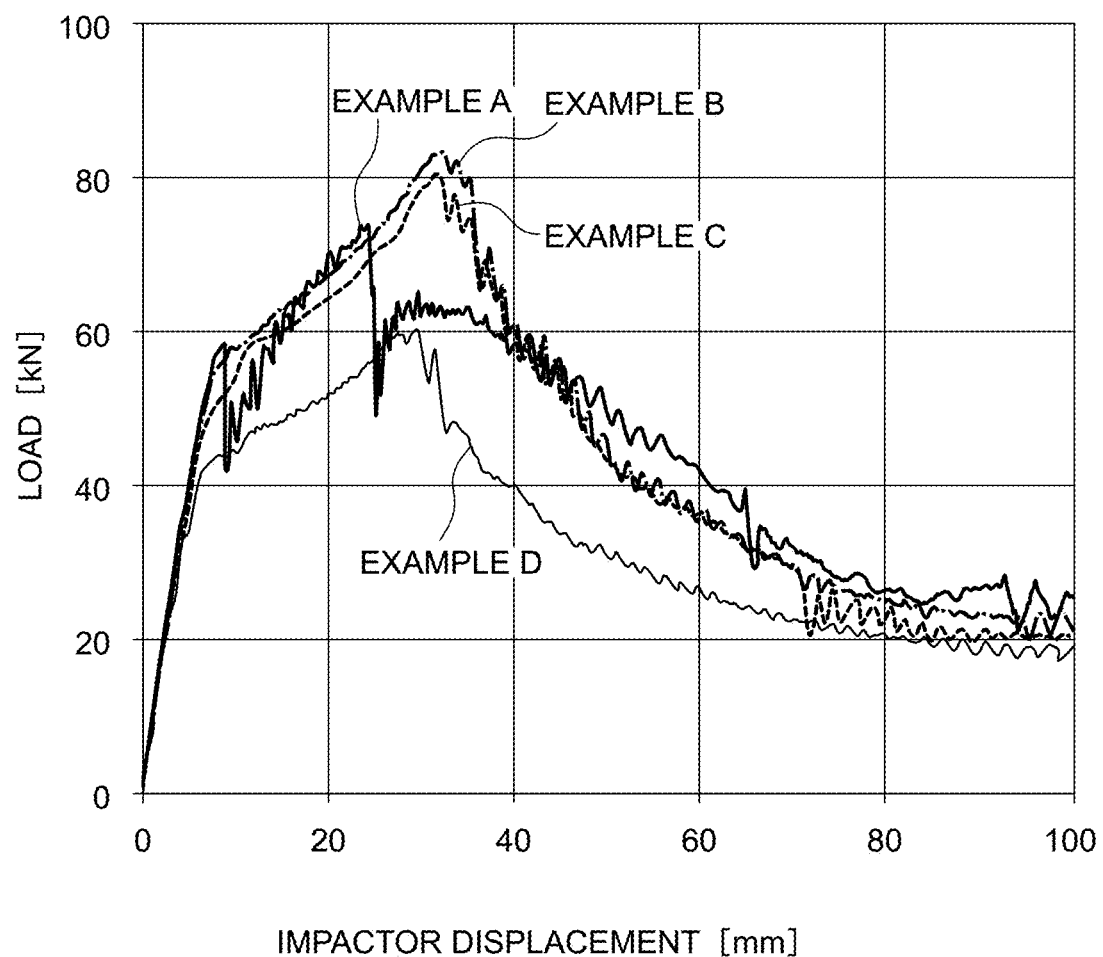
FIG. 57 is a graph illustrating results of the static three-point bending test illustrated in FIG. 56.

FIG. 57 illustrates results of the static three-point bending test illustrated in FIG. 56. The horizontal axis in FIG. 57 represents displacement of the impactor 602 (mm), and the vertical axis in FIG. 57 represents the load of the impactor 602 (kN). Table 2 sets out the steel sheet used to form sections of the stamped part other than the flanges, the steel sheet used to form the flanges, the steel sheet used to form the flat plate member, the maximum load (kN), whether or not spot fracture occurred prior to reaching the maximum load, and other remarks.

TABLE 2

| Example | Steel sheet used to form sections of stamped part other than flanges | Steel sheet used to form flanges | Steel sheet used to form flat plate member | Maximum load (kN) | Fracture at spot weld location prior to reaching maximum load? | Example type |
|---|---|---|---|---|---|---|
| A | Tensile strength: 1800 MPa Sheet thickness: 1.6 mm | | Tensile strength: | 74 | Present | Comparative example |
| B | Tensile strength: 1800 MPa Sheet thickness: 1.6 mm | Tensile strength: 1200 MPa Sheet thickness: 1.6 mm | 980 MPa Sheet thickness: 1.6 mm | 83 | Absent | Example of invention |
| C | | | | 81 | Absent | Example of invention |
| D | Tensile strength: 1200 MPa Sheet thickness: 1.6 mm | | | 60 | Absent | Comparative example |

In Example A, in which the entire stamped part 501 was formed from the hot stamped steel sheet with a tensile strength grade of 1800 MPa, fracturing occurred at the spot weld locations 508 at around 8 mm displacement and around 15 mm displacement during the static three-point bending test, causing a sudden decrease in load to be observed. The maximum load was 74 kN.

In Example B and Example C, in which the stamped part 501 was formed from a tailored blank in which the hot stamped steel sheet with a tensile strength grade of 1800 MPa and the hot stamped steel sheet with a tensile strength grade of 1200 MPa were butt joined together, fracturing did not occur at the spot weld locations 508 prior to reaching the maximum load, and a high maximum load was therefore obtained. In particular, in Example B, in which only the sections of the flanges 507 running parallel to the flat plate member 502 were formed from the hot stamped steel sheet with a tensile strength grade of 1200 MPa, the maximum load was 83 kN, this being the highest maximum load observed for any of Example A to Example D.

In Example D, in which the entire stamped part 501 was formed from the hot stamped steel sheet with a tensile strength grade of 1200 MPa, although fracturing did not readily occur at the spot weld locations 508, due to the increased softness of the stamped part 501 the maximum load was 60 kN, this being the lowest maximum load observed for any of Example A to Example D.

Note that in the static three-point bending test illustrated in FIG. 56, the flat plate member 502 formed with the spot weld locations 508 faces upward and the load is input downward by the impactor 602. Accordingly, in contrast to the component testing illustrated in FIG. 1 and FIG. 2, in which the inner reinforcement 304 corresponding to the flat plate member formed with the spot weld locations 314 faces downward and the load is input downward by the impactor 602, the static three-point bending test illustrated in FIG. 56 creates a smaller radius of curvature in the periphery of the spot weld locations 508, resulting in more marked fracturing of the spot weld locations 508.

Next, explanation follows regarding cross-sectional photography of sample components.

Figure 58:
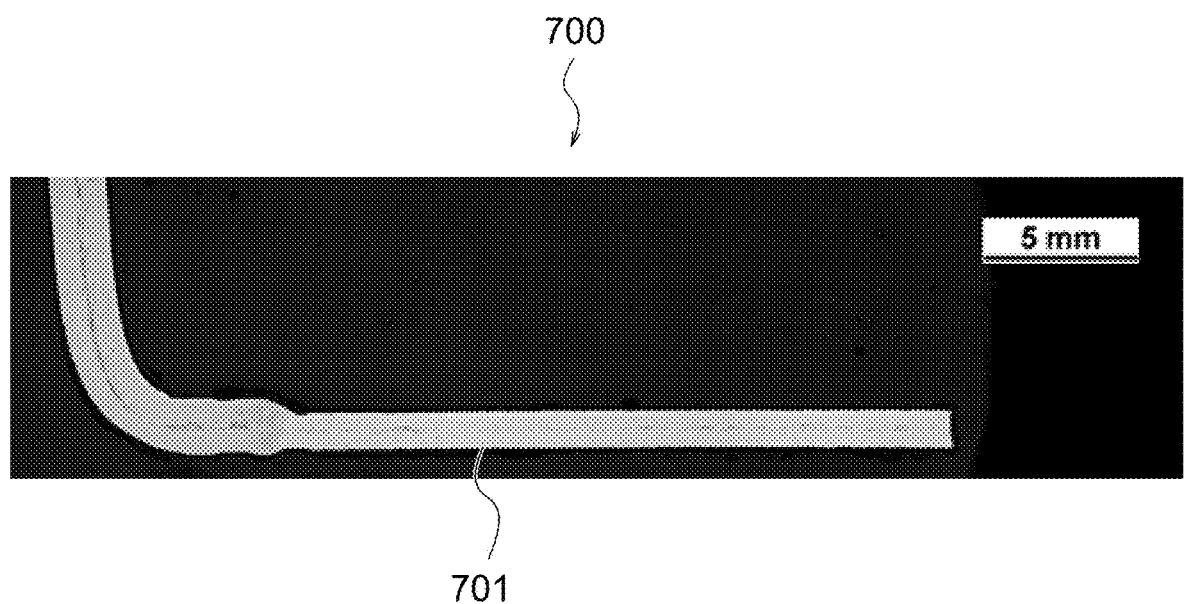
FIG. 58 is a cross-sectional photograph of the vicinity of a flange of a stamped part according to a first sample.

FIG. 58 is a cross-sectional photograph of the vicinity of a flange 701 of a stamped part 700 according to a first sample. The stamped part 700 is formed from a tailored blank in which an aluminized hot stamped steel sheet with a sheet thickness of 1.6 mm and a tensile strength grade of 2.0 GPa and an aluminized hot stamped steel sheet with a sheet thickness of 1.2 mm and a tensile strength grade of 1.3 GPa are butt joined together. A parallel section of the flange 701 is formed from an aluminized hot stamped steel sheet with a sheet thickness of 1.2 mm and a tensile strength grade of 1.3 Gpa, and sections other than the parallel section of the flange 701 are formed from an aluminized hot stamped steel sheet with a sheet thickness of 1.6 mm and a tensile strength grade of 2.0 GPa.

Figure 59:
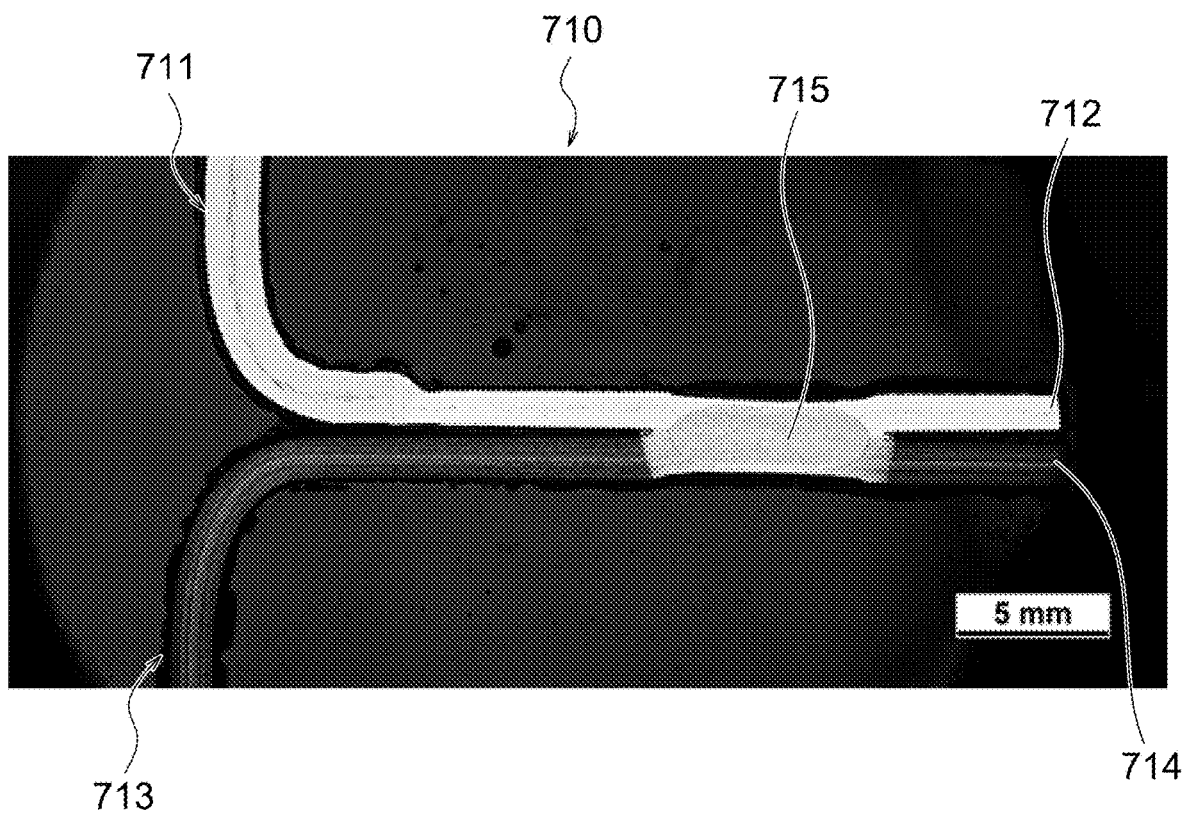
FIG. 59 is a cross-sectional photograph of the vicinity of a second steel sheet region configuring a flange in a structural body according to a second sample.

FIG. 59 is a cross-sectional photograph of the vicinity of a section of a flange formed from a second steel sheet region in a structural body 710 according to a second sample. The structural body 710 is configured by joining together a flange 712 of a stamped part 711 and a flange 714 of a molded member 713 in a two-layer superimposed state at spot weld locations 715. The stamped part 711 is formed from a tailored blank in which an aluminized hot stamped steel sheet with a sheet thickness of 1.6 mm and a tensile strength grade of 2.0 GPa and an aluminized hot stamped steel sheet with a sheet thickness of 1.2 mm and a tensile strength grade of 1.3 GPa are butt joined together. The molded member 713 is formed from a steel sheet with a sheet thickness of 1.4 mm and a tensile strength grade of 590 MPa.

Figure 60:
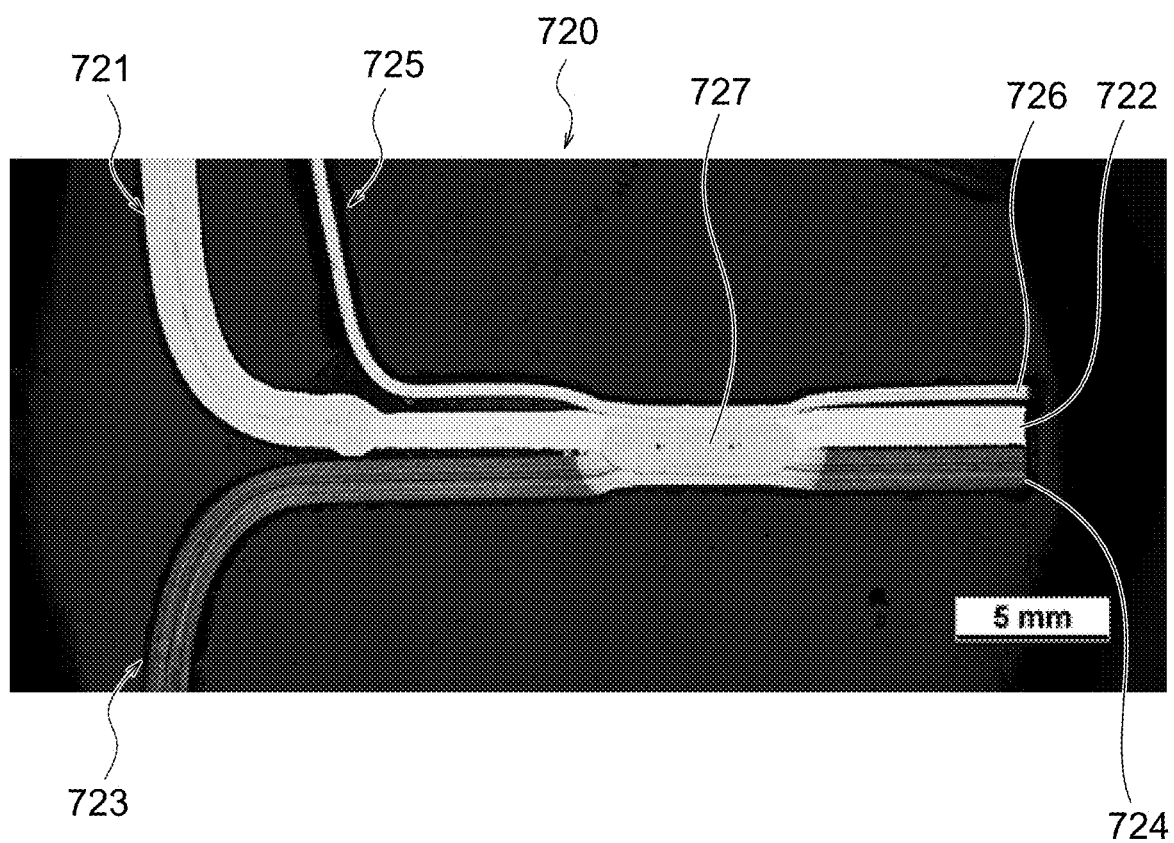
FIG. 60 is a cross-sectional photograph of the vicinity of a second steel sheet region configuring a flange in a structural body according to a third sample.

FIG. 60 is a cross-sectional photograph of the vicinity of a section of a flange formed from a second steel sheet region in a structural body 720 according to a third sample. The structural body 720 is configured by joining together a flange 722 of a stamped part 721, a flange 724 of a molded member 723, and a flange 726 of a panel member 725 in a three-layer superimposed state at spot weld locations 727. The stamped part 721 is formed from a tailored blank in which an aluminized hot stamped steel sheet with a sheet thickness of 1.6 mm and a tensile strength grade of 2.0 GPa and an aluminized hot stamped steel sheet with a sheet thickness of 1.2 mm and a tensile strength grade of 1.3 GPa are butt joined together. The molded member 723 is formed from a steel sheet with a sheet thickness of 1.4 mm and a tensile strength grade of 590 MPa. The panel member 725 is formed from a steel sheet with a sheet thickness of 0.65 mm and a tensile strength grade of 270 MPa.

Although an exemplary embodiment of the present invention has been described above, the present invention is not limited thereto, and obviously various other modifications may be implemented within a range not departing from the spirit of the present invention.

Moreover, where practical plural of the technical configurations described in the exemplary embodiment of the present invention may be implemented in appropriate combinations.

The disclosure of Japanese Patent Application No. 2018-174781 is incorporated in its entirety by reference herein.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A tailored blank configured to be formed into a product having an elongated top plate portion, a sidewall portion positioned at a side of the top plate portion, and a flange portion positioned at a side of the sidewall portion, the tailored blank comprising:
    a first steel sheet having a carbon content of 0.27 mass % or more; and
    a second steel sheet that is butt welded to the first steel sheet and that has a carbon content of 0.20 mass % or less,
    wherein the tailored blank includes:
    a first steel sheet region that is:
        configured by the first steel sheet, and
        configured to be formed spanning part or all of the top plate portion in a length direction; and
    a second steel sheet region that is:
        configured by the second steel sheet, and
        configured to be formed at the flange portion and to be joined by welding to another member,
    wherein part or all of the first steel sheet region is positioned within the second steel sheet region, in a length direction of the tailored blank.

2. The tailored blank of claim 1, wherein a carbon equivalent of the second steel sheet as expressed by the following Equation (1) is 0.25 mass % or less:

$$Ceq=C+Si/90+Mn/100+Cr/100+2P+3S \qquad \text{Equation (1)}.$$

3. The tailored blank of claim 2, wherein:
    the carbon content of the second steel sheet is 0.16 mass % or less, and
    the carbon equivalent of the second steel sheet as expressed by Equation (1) is 0.21 mass % or less.

4. The tailored blank of claim 1, wherein the second steel sheet region is configured to form part of the flange portion.

5. A stamped part comprising the tailored blank of claim 1, wherein the tailored blank is press-formed, such that:
    the top plate portion has been formed into an elongated top plate;
    the sidewall portion has been formed into a sidewall extending along the top plate; and
    the flange portion has been formed into a flange extending along the sidewall,
    wherein the stamped part includes:
    the first steel sheet region, spanning part or all of a length direction of the top plate; and
    the second steel sheet region, formed at the flange, and wherein part or all of the first steel sheet region is positioned within the second steel sheet region in a length direction of the tailored blank.

6. The stamped part of claim 5, wherein a carbon equivalent of the second steel sheet as expressed by the following Equation (1) is 0.25 mass % or less:

$$Ceq=C+Si/90+Mn/100+Cr/100+2P+3Stm \quad \text{Equation (1)}.$$

7. The stamped part of claim 6, wherein:
the carbon content of the second steel sheet is 0.16 mass % or less, and
the carbon equivalent of the second steel sheet as expressed by Equation (1) is 0.21 mass % or less.

8. The stamped part of claim 5, wherein the first steel sheet has a tensile strength of 1470 MPa or more.

9. The stamped part of claim 5, wherein the second steel sheet region configures a section of the flange further toward a leading end side of the flange than a bend portion between the sidewall and the flange.

10. The stamped part of claim 5, wherein the second steel sheet region is formed with a smaller sheet thickness than the first steel sheet region.

11. The stamped part of claim 5, wherein the second steel sheet region is formed with a thicker sheet thickness than the first steel sheet region.

12. The stamped part of claim 5, wherein the second steel sheet region configures the flange at a location having a profile where stress concentrates.

13. The stamped part of claim 5, wherein the stamped part is formed with a hat-shaped cross-section profile including the top plate, a pair of the sidewalls, and a pair of the flanges jutting out from the pair of sidewalls.

14. The stamped part of claim 13, wherein:
the stamped part is an outer reinforcement configuring a center pillar of a vehicle;
the flanges extend in a vehicle up-down direction; and
the second steel sheet region configures one section of the vehicle up-down direction of the flanges.

15. The stamped part of claim 14, wherein the second steel sheet region configures upper sections of the vehicle up-down direction of the flanges.

16. The stamped part of claim 14, wherein the second steel sheet region configures lower sections of the vehicle up-down direction of the flanges.

17. The stamped part of claim 14, wherein a section of the sidewalls and a section of the flanges are formed from the second steel sheet.

18. The stamped part of claim 13, wherein:
the stamped part is a reinforcement configuring a side sill of a vehicle;
the flanges extend in a vehicle front-rear direction; and
the second steel sheet region configures at least one section of the vehicle front-rear direction of the flanges.

19. A method of manufacturing a stamped part comprising the tailored blank of claim 1, the method comprising:
a stamping process of stamping the tailored blank to obtain a stamped part including a top plate formed from the top plate portion, a sidewall formed from the sidewall portion, and a flange formed from the flange portion,
forming the first steel sheet region that is configured by the first steel sheet, and
forming, at the flange portion, the second steel sheet region that is configured by the second steel sheet.

* * * * *